US008254935B2

(12) United States Patent
Tomita et al.

(10) Patent No.: US 8,254,935 B2
(45) Date of Patent: Aug. 28, 2012

(54) PACKET TRANSFERRING/TRANSMITTING METHOD AND MOBILE COMMUNICATION SYSTEM

(75) Inventors: Tetsuo Tomita, Kawasaki (JP); Eiji Ikeda, Kawasaki (JP); Kazunari Kobayashi, Kawasaki (JP); Tomonori Kumagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 684 days.

(21) Appl. No.: 11/057,990

(22) Filed: Feb. 15, 2005

(65) Prior Publication Data

US 2005/0141477 A1 Jun. 30, 2005

Related U.S. Application Data

(63) Continuation of application No. PCT/JP02/09763, filed on Sep. 24, 2002.

(51) Int. Cl.
*H04W 36/00* (2009.01)
*H04W 4/00* (2009.01)

(52) U.S. Cl. ........ 455/442; 455/436; 455/438; 455/439; 370/331

(58) Field of Classification Search .......... 455/436–444; 370/237, 229, 238, 238.1, 236, 310.1, 310.2, 370/312, 331–333
See application file for complete search history.

(56) References Cited

U.S. PATENT DOCUMENTS

| 5,896,373 | A  | * | 4/1999  | Mitts et al. ............ 370/331 |
| 5,940,371 | A  | * | 8/1999  | Mitts et al. ............ 370/236 |
| 6,553,015 | B1 | * | 4/2003  | Sato .................... 370/331 |
| 6,611,547 | B1 | * | 8/2003  | Rauhala ................. 370/331 |
| 6,775,533 | B2 | * | 8/2004  | Kakani et al. ........... 455/403 |
| 6,928,304 | B2 |   | 8/2005  | Wigell |
| 7,333,451 | B1 |   | 2/2008  | Khalil |
| 7,522,560 | B2 | * | 4/2009  | Soderstrom et al. ...... 370/332 |
| 2002/0068588 | A1 |   | 6/2002  | Yoshida et al. |
| 2002/0089952 | A1 |   | 7/2002  | Cao et al. |
| 2002/0141360 | A1 | * | 10/2002 | Baba et al. ............. 370/331 |
| 2004/0019492 | A1 |   | 1/2004  | Tucker |

FOREIGN PATENT DOCUMENTS

| CN | 1356794 A   | 7/2002 |
| EP | 0768806 A2  | 4/1997 |
| EP | 0777396     | 6/1997 |
| EP | 1011243 A1  | 6/2000 |

(Continued)

OTHER PUBLICATIONS

Lee D. et. al. "Performance Enhancement of Mobile IP by Reducing Out-of Sequence Packets Using Priority Scheduling." IEICE Transactions on Communications, Communications Society, Tokyo, JP, vol. E85B, No. 8. Aug. 1, 2002. pp. 1442-1446.*

(Continued)

*Primary Examiner* — George Eng
*Assistant Examiner* — Nam Huynh
(74) *Attorney, Agent, or Firm* — Murphy & King, P.C.

(57) ABSTRACT

A packet transferring/transmitting method is provided for use in a mobile communication system 50. In this packet transferring/transmitting method, an upper node 1 determines the implementation of handover (determination step), and a handover addressing node 2 transfers, of a plurality of packets, a non-transmitted residual packet to a handover addressed node 3, and the upper node 1 transmits a new packet to the handover addressed node 3 (transfer/transmission step). This enables maintaining the number of users to be accommodated while securing a wide bandwidth, sharing a line with high efficiency at soft handover, avoiding data residual in the case of the employment of variable communication rate, and preventing an increase in retransmission.

9 Claims, 36 Drawing Sheets

FOREIGN PATENT DOCUMENTS

| | | |
|---|---|---|
| JP | S64-027342 A | 1/1989 |
| JP | 2063333 | 3/1990 |
| JP | 6-276230 | 9/1994 |
| JP | 8-168071 | 6/1996 |
| JP | 9-186704 | 7/1997 |
| JP | 2000-069522 A | 3/2000 |
| JP | 2000-183975 | 6/2000 |
| JP | 2001-177864 | 6/2001 |
| JP | 2001-268617 | 9/2001 |
| JP | 2002-026919 A | 1/2002 |
| JP | 2002-118568 | 4/2002 |
| JP | 2002-171572 | 6/2002 |
| JP | 2002-204257 | 7/2002 |
| WO | 9731499 | 8/1997 |
| WO | 0105121 | 1/2001 |
| WO | WO 01/05121 A1 | 1/2001 |
| WO | 02065797 | 8/2002 |
| WO | WO 02/065797 A1 | 8/2002 |
| WO | 02071718 A2 | 9/2002 |
| WO | 2006075663 A1 | 7/2006 |

OTHER PUBLICATIONS

Ken Igarashi et al. Suspend-Resume Handover Control. The Institute of Electronics, Information and Communication Engineers Tsushin Society Taikai B-6-94, Aug. 29, 2001.

Mainak Chatterjee et al. Fast ARQ in High Speed Downlink Packet Access for WCDMA Systems. Center for Research in Wireless Mobility and Networking (CreWMaN).

Shin-Ichi Isobe et al. A Proposal of Lossless-Fast HO With Buffering Scheme at Cross. Network Laboratories, NYY DoCoMo, Inc. Aug. 29, 2001.

HS-DSCH Simulation Results. TSG-RAN Working Group 1 Meeting#17.

International Search Report dated Jan. 14, 2003.

English Translation of Japanese Office Action Mailed May 27, 2008 for Patent Application No. JP2008-086037.

English Translation of Japanese Office Action Mailed May 27, 2008 for Patent Application No. JP2008-086038.

H. Mitts et al.; "Lossless Handover for Wireless ATM"; Journal of Special Topics in Mobile Networks and Applications, Baltzer Science Publishers, Amsterdam, NL, vol. 1, No. 3, Dec. 1996; pp. 299-312; XP-002120628.

European Search Report; dated Mar. 27, 2008; Application No. 02768010.7-1249.

European Search Report based on EP09150905.9-1249 (dated Mar. 20, 2009).

European Search Report issued Mar. 20, 2009 based on EP09150904.2-1249.

Notice of Reasons for Rejection dated Mar. 30, 2010 received in corresponding Japanese Patent Application No. 2007-281017.

Summons to Attend Oral Proceedings dated Aug. 5, 2010 received in corresponding EP Patent Appln. No. 09150906.7-1249/2051554.

M. Nilsson et al.; "Avoiding Over-Estimation in Bandwidth Extension of Telephony Speech"; 2001 IEEE International Conference on Acoustics, Speech, and Signal Processing Proceedings; May 7-11, 2001; vol. 2, pp. 869-872; XP010803743.

Extended European Search Report corresponding to EP Application No. 08002888.9-2225 dated Jul. 4, 2008.

Non-Final Office Action dated Sep. 28, 2010 received in U.S. Appl. No. 12/003,283.

Final Office Action dated Mar. 18, 2011 received in U.S. Appl. No. 12/003,283.

Restriction Requirement dated Jun. 25, 2010 received in U.S. Appl. No. 12/003,283.

Non-Final Office Action dated Oct. 13, 2011 received in U.S. Appl. No. 12/003,283.

Non-Final Office Action dated Dec. 20, 2011 received in U.S. Appl. No. 13/207,080.

Final Office Action dated Mar. 20, 2012 recieved in U.S. Appl. No. 12/003,283.

Non-Final Office Action dated Jun. 28, 2012 recieved in U.S. Appl. No. 13/207,080.

* cited by examiner

FIG. 13(a) CASE OF NO IN-TRANSFER
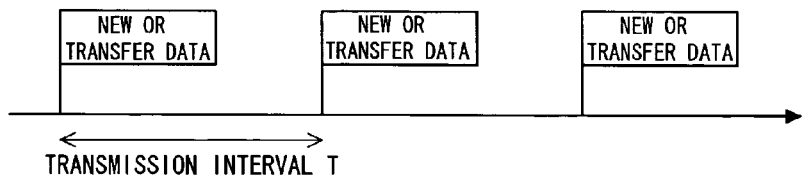
FIG. 13(b) CASE OF IN-TRANSFER
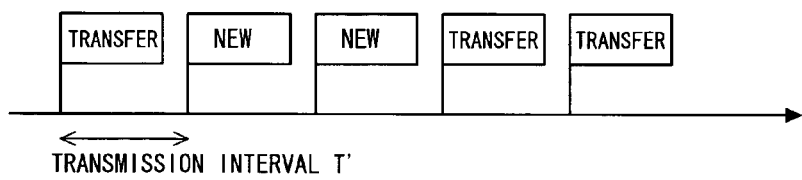
FIG. 14(a) CASE OF NO IN-TRANSFER
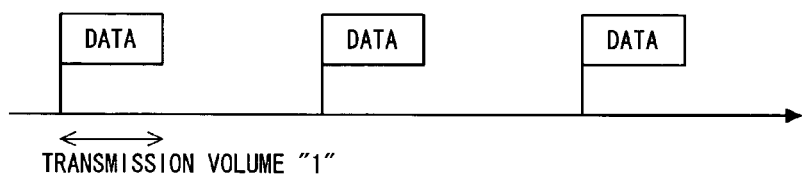
FIG. 14(b) CASE OF IN-TRANSFER
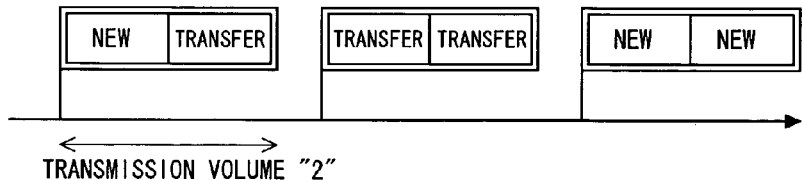

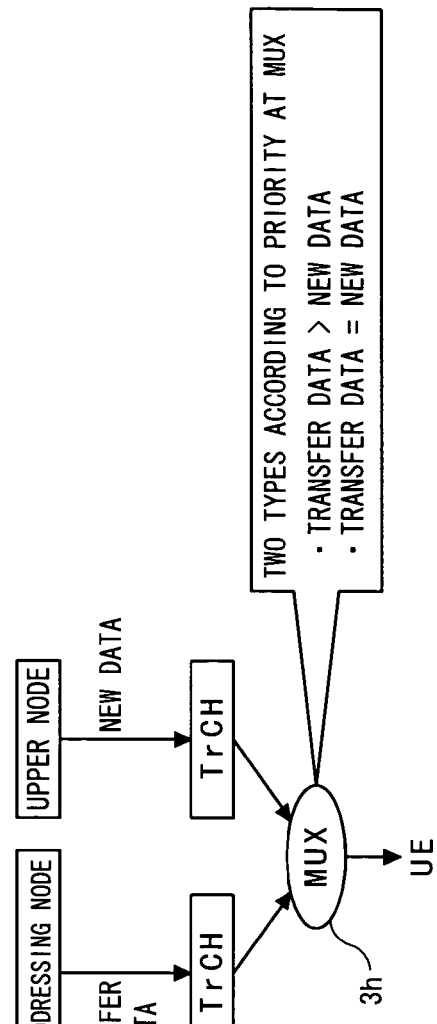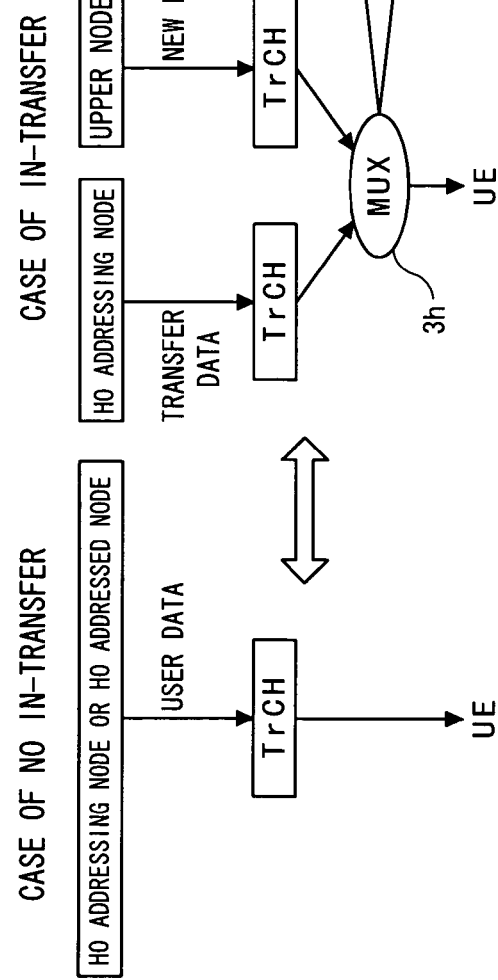

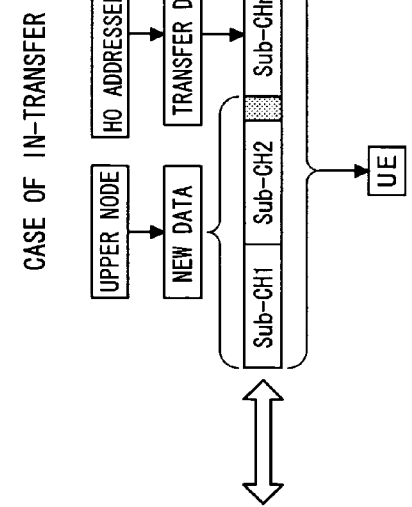
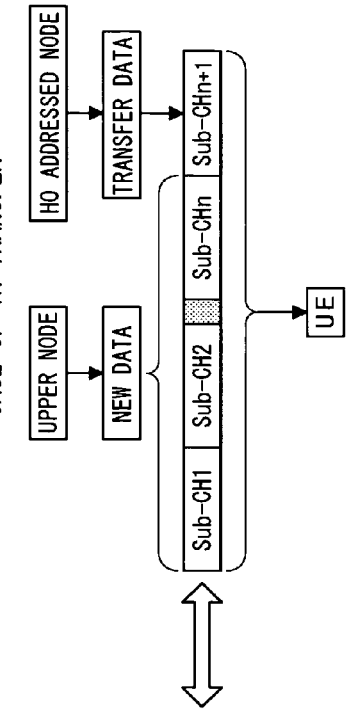
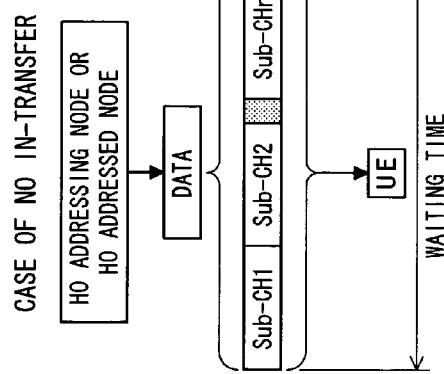
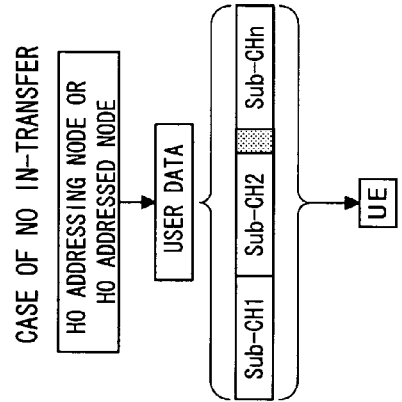

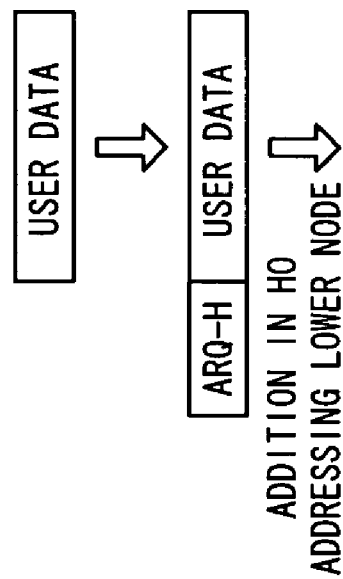
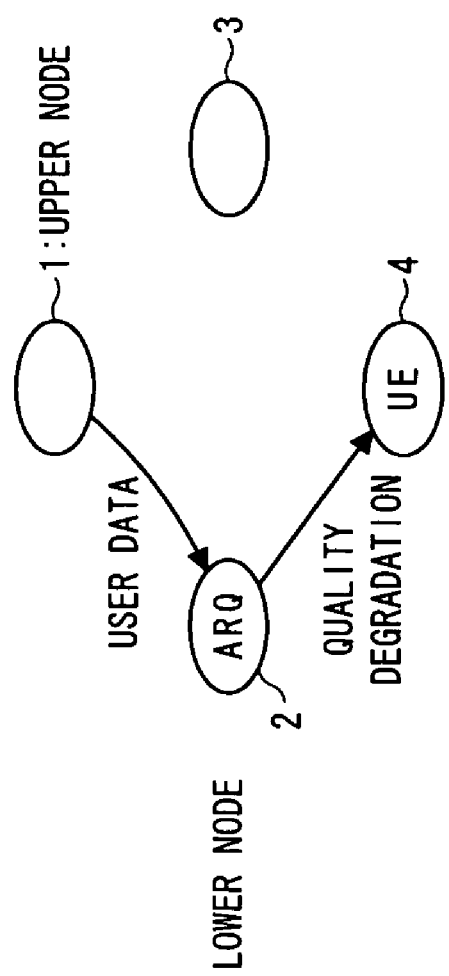

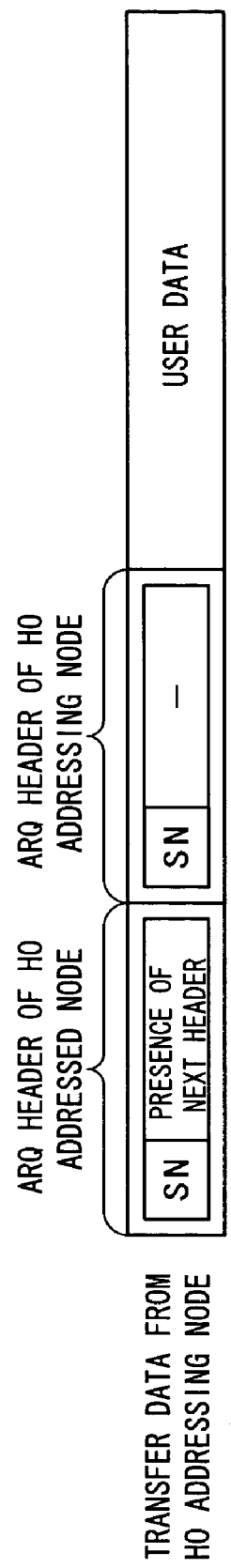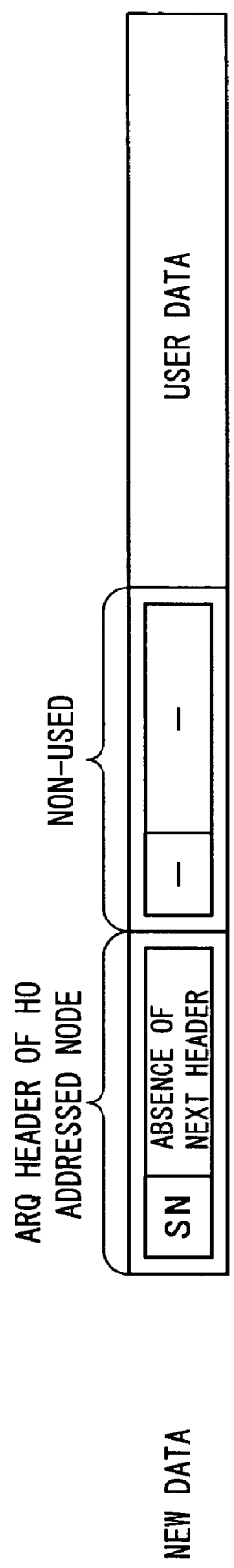

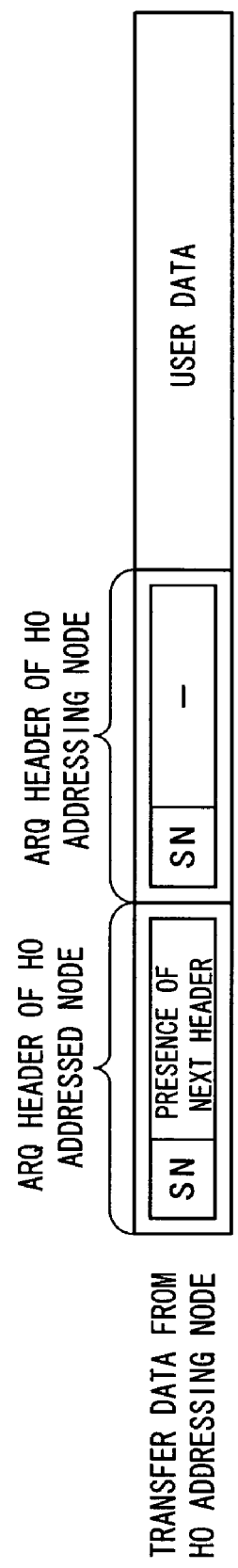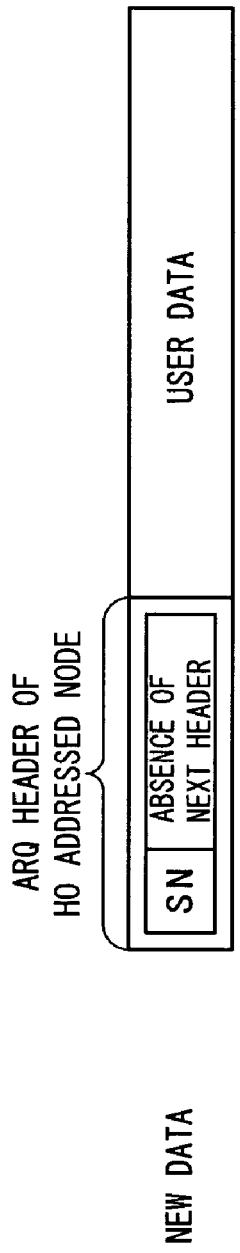
FIG. 26(a)
FIG. 26(b)

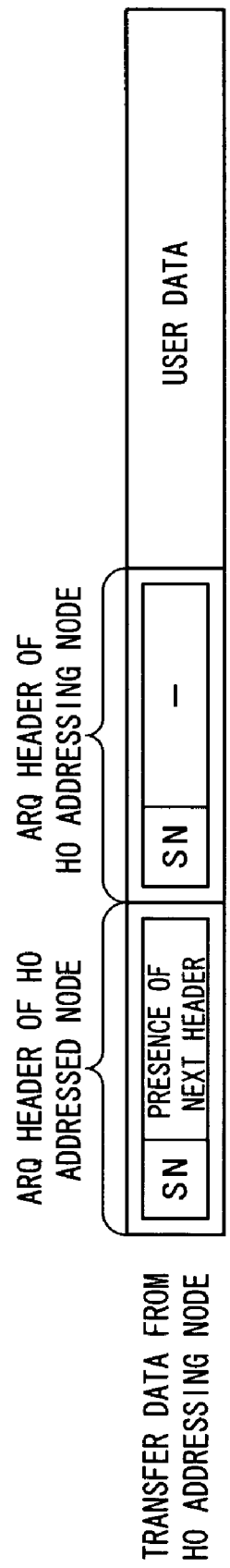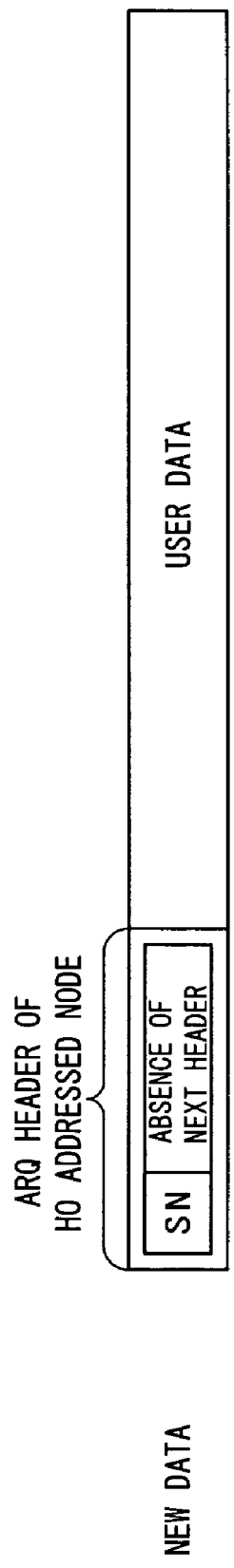

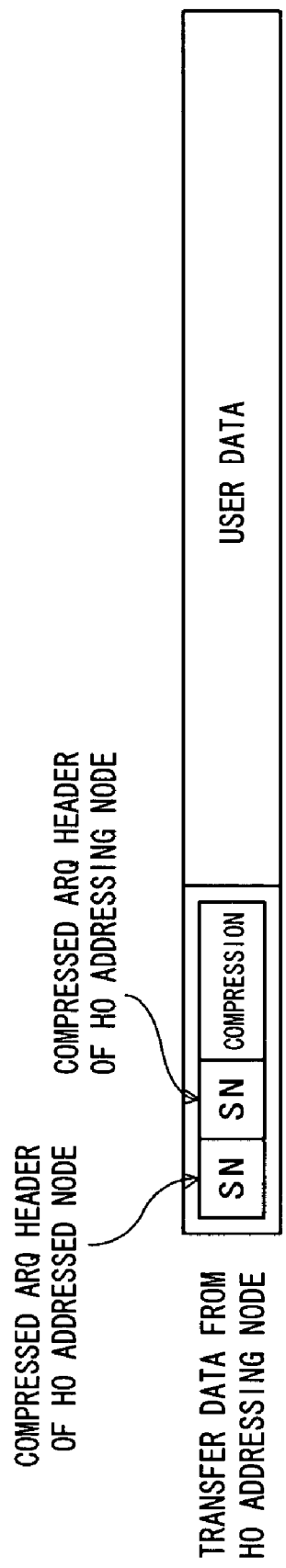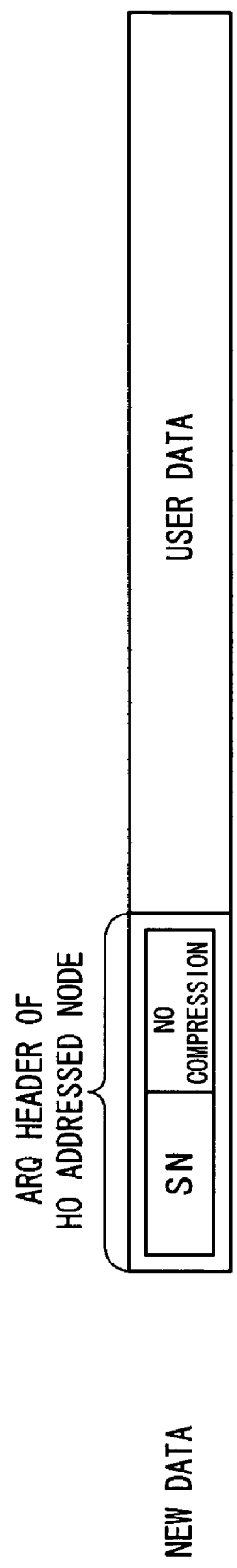

ADDITION IN HO ADDRESSED LOWER NODE

PACKET TRANSFERRING/TRANSMITTING METHOD AND MOBILE COMMUNICATION SYSTEM

CROSS-REFRENCE TO RELATED APPLICATION

This application is continuation of International Application Number PCT/JP2002/009763 which was filed on Sep. 24, 2002, now pending, the content of which are herein wholly incorporated by reference.

TECHNICAL FIELD

The present invention relates to soft handover at high-speed large-capacity communications in a W-CDMA (Wideband-Code Division Multiple Access : Wideband CDMA) system, and more particularly to a packet transferring/transmitting method and mobile communication system suitable for DSCH (Downlink Shared Channel) and HS-DSCH (High Speed Downlink Shared Channel).

BACKGROUND ART

In recent years, the development of a CDMA mobile communication system has been in a prompt advance. Moreover, a commercial service based on the W-CDMA system has started, which enables the transmission/reception of large-capacity data such as moving images along with voices and still images included in the current main services. In this situation, as a group for the standardization of a third-generation mobile communication system, 3GPP/3GPP2 (3rd Generation Partnership Project/3rd Generation Partnership Project 2) has been organized, which is oriented to a system capable of realizing a higher-quality service and prepares diverse specifications according to a W-CDMA mode and others.

FIG. 38 is a schematic illustration of a configuration of a W-CDMA. The W-CDMA system shown in FIG. 38 is made up of nodes including a core network (CN) 100 including an exchange 101, radio network controllers (RNC) 102-0, 102-1, base stations (BTS: Base Transmitting Station) 103-0 to 103-5, and a mobile unit (UE: User Equipment). In this case, unless otherwise specified particularly, the node signifies a unit made to carry out functions of switching, transmission and transfer of a packet. Moreover, the nodes 101, 102-0, 102-1, 103-0 to 103-5 and 104 are physically connected through an ATM (Asynchronous Transfer Mode) transmission line.

The handover prescribed in 3GPP is for switching a radio resource (radio channel, radio carrier) such as transport channel while maintaining non-instantaneous chopping and quality in a case in which the mobile unit 104 separates from the base station 103-1 which has been in communication relation thereto before the handover and shits to a communication area of a different base station 103-2, and this switching is realized by soft handover.

FIG. 39(a) is an illustration of a state before the handover, and the mobile unit 104 shown in FIG. 39 (a) sets one branch (physical radio line or radio link) with respect to each of the base stations 103-1, 103-2 of the base stations 103-0 to 103-5 for transmission/reception of a radio frame. Moreover, the mobile unit 104 transmits the same data simultaneously to the respective base stations 103-1 and 103-2. The base stations 103-1 and 103-2 transmit the received data through an ATM transmission line to the RNC 102-0. The RNC 102-0 processes these data and transmits them through the ATM transmission line to the exchange 101 side or the other base station 103-0 to 103-5.

In addition, for the handover, the mobile unit 104 monitors the quality and others of the received data to monitor the radio situation (radio wave state) at all times for selecting and demodulating the data with a high quality. Thus, the mobile unit 104, when receiving a radio frame (radio signal) with a large electric field strength in conjunction with its movement, adds a new branch with respect to the base station 103-0 to 103-5 transmitting this radio frame.

FIG. 39(b) is an illustration of a state after the handover, and when the quality of the branch of the set base station 103-2 degrades with the movement of the mobile unit 104, the mobile unit 104 releases and deletes this branch and makes a communication with the base station 103-1.

Through this soft handover procedure in the mobile unit 104, the radio link is continuously switched without instantaneous chopping.

However, the number of channels needed for when the mobile unit 104 conducts the soft handover is at least two channels for the handover addressing node and the handover addressed node. The band needed for the transmission/reception of a radio frame becomes twice the normal band. In addition, since the band needed per channel increases with an increase in the communication data transmission rate (communication rate), in a case in which the mobile unit 104 transmits the same signal through a plurality of channels in a handover state, the bandwidth to be used per user extremely increases. This increased bandwidth enhances the interference in a radio zone, thereby causing the degradation of the communication quality and decreasing the number of users to be accommodated.

For solving the increase of the bandwidth and the decrease of the number of users through the use of a conventional technique, there is a need to improve the throughput required in each node and each transmission line and to increase the number of facilities, which leads to a considerable demerit in view of cost performance. Moreover, there are the following problems (S1) to (S5).

(S1) Since, in a high-speed data communication in the future, the bandwidth needed for signal transmission/reception will becomes extremely large and the introduction of the metered charge will advance, as the connection method, a method of setting a line at all times irrespective of the presence or absence of data will become a mainstream approach. From the viewpoint of efficiency, in the W-CDMA system, as a preferable method, only one shared channel (shared line) having a sufficiently wide band as compared with a method of a wide-band radio resource being allocated to each mobile unit 104 is prepared so that the respective mobile units 104 share and use the channel when needed. On the other hand, difficulty is experienced in simultaneously transmitting the same data to a plurality of channels at all times like the soft handover.

(S2) In this case, the mobile unit 104 is required to make the switching from the shared channel for the handover addressing node to the shared channel for the handover addressed node, and the instantaneous chopping occur in data communication while the mobile unit 104 makes the switching. Moreover, in consideration of the introduction of IP (Internet Protocol) for an transmission line and the speed-up of data communication, in comparison with a method of a large volume of data being divided into a large number of small packets and transmitted, it is preferable to employ a method in which data is transmitted to a lower node in the form of one packet and the lower node divides this data in accordance with the communication rate in a radio zone so that the divided data are transmitted to the mobile unit 104. This provides a higher transmission line service efficiency.

Therefore, in light of this efficiency and the above-mentioned instantaneous chopping, there is a possibility that, in a handover state, the data collectively received and held by a handover addressing node is left without being all transmitted.

(S3) For preventing data loss, a conventional method is designed such that an upper layer of a handover addressing node abandons the residual data of the handover addressing node itself and retransmits it according to a host communication protocol. However, an increase of this retransmission causes the degradation of the communication rate.

(S4) Likewise, the increase of the retransmission leads to an increase in unnecessary traffic, which presses the throughput (for example, the capability of protocol processing, signal transmission/reception, charge processing and others) of each node and each transmission line. That is, the cost performance of the facility deteriorates.

(S5) the real-time performance on communications degrades, which leads to the degradation of quality of service.

The present invention has been developed in consideration of these problems, and it is an object of the invention to provide a packet transferring/transmitting method and mobile communication system capable of maintaining the number of users to be accommodated while securing a wide bandwidth, sharing a line efficiently at soft handover, avoiding data residual at the employment of variable communication rate and preventing an increase in retransmission.

DISCLOSURE OF THE INVENTION

Thus, according to the present invention, a packet transferring/transmitting method for use in a mobile communication system including an upper node for transmitting a plurality of packets addressed to a mobile unit, a handover addressing node for transmitting a plurality of packets addressed to the mobile unit and a handover addressed node for transmitting a plurality of packets addressed to the mobile unit, characterized by comprising a determination step in which the upper node determines the implementation of handover and a transfer/transmission step in which the handover addressing node transfers, of the plurality of packets, a non-transmitted residual packet to the handover addressed node and the upper node transmits a packet to the handover addressed node.

This eliminates the need for the handover addressed node to transmit the same signal through the use of a plurality of channels to the mobile unit at handover, which enables an increase in number of users and an improvement of communication quality and achieves the effective utilization of transmission lines and radio resources.

This transfer/transmission step can employ the following two patterns of a pattern A and a pattern B.

(A) A method in which the handover addressing node or the upper node itself suspends the transmission of a packet from an upper node at transfer of the aforesaid residual packet. This method can achieve the improvement of the service efficiency of the radio resources. Moreover, a new packet and transfer data can be transmitted concurrently.

(B) A method including a channel setting step in which the upper node carries out one of allocation of a separate transfer channel and securement of an added channel between the handover addressed node and the handover addressing node on the basis of a packet volume in a radio zone, a scheduling step in which the handover addressed node carries out scheduling on packet transmission through the use of the separate transfer channel or added channel secured in the channel setting step and a new channel, and a scheduling transmission step in which the handover addressed node transmits a packet and a residual packet to the mobile unit on the basis of the scheduling in the scheduling step. This method can prevent the missing of packet transmission/reception through retransmission control to assure the integrity.

In addition, in the aforesaid each transfer/transmission step, it is also appropriate that the handover addressing node first-encapsulates a residual packet according to an instruction from the upper node or the identification of a received frame, and the handover addressed node second-encapsulates the residual packet and transmits the residual packet to the mobile unit. This can assure the integrity on each of the data communication between the handover addressing node and the handover addressed node and the handover addressing node and the mobile unit.

Still additionally, in the aforesaid each transfer/transmission step, it is also appropriate that the handover addressed node conducts transmission/reception of a frame with respect to the mobile unit on the basis of an association table between a header given by the handover addressing node and a header given by the handover addressed node. In this case, the handover addressed node can insert discrimination information for a discrimination between an encapsulated packet and a normal packet into a frame to be transmitted to the mobile unit. This can assure the integrity of the data communication and enables high-speed processing.

Furthermore, a mobile communication system according to the present invention is characterized in that a handover addressing node comprises a first line receiving unit for receiving a packet from an upper node, a buffer for holding the packet received in the first line receiving unit, a first retransmission control unit for carrying out retransmission control on a packet volume to be transferred on the basis of a resource capacity of a handover addressed node included in the packet received in the first line receiving unit and a residual volume of the packet held in the buffer, and a first line transmitting unit for, on the basis of the packet volume retransmission-controlled in said first retransmission control unit, transmitting the packet held in the buffer to the handover addressed node without interposing the upper node therebetween or by way of the upper node.

This can prevent the loss of user data and improve the quality of various types of services such as the stability of communication rate and the real-time performance.

Still furthermore, a mobile communication system according to the present invention, including an upper node for transmitting a plurality of packets addressed to a mobile unit, a handover addressing node for transmitting a plurality of packets addressed to the mobile unit and a handover addressed node for conducting transmission/reception of a packet with respect to the mobile unit after the handover, is characterized in that said handover addressed node comprises a second line receiving unit for receiving a plurality of packets from the upper node and the handover addressing node, a second retransmission control unit for carrying out retransmission control on a packet received in the second line receiving unit, and a second transmitting unit for giving a retransmission control header undergoing retransmission control in the second retransmission control unit to a plurality of packets received in the second line receiving unit to transmit a radio frame with the header to the mobile unit.

This enables a change of a frame format to be radio-transmitted through the use of an instruction from the upper node and enables a constant buffer capacity of the handover addressed node.

Yet furthermore, a mobile communication system according to the present invention, having a function to switch a transmission path, from an upper apparatus to a mobile unit, from transmission by a handover addressing node to transmission by a handover addressed node, is characterized in that the handover addressing node comprises transferring means for transferring data, addressed to the mobile unit and left in the handover addressing node, to the handover addressed node at the switching and the handover addressed node comprises transmitting means for transmitting, to the mobile unit, the data transferred and received therefrom and the aforesaid data from the upper apparatus.

This can improve the real-time performance of communications and the quality of services. The number of times of retransmission is reducible.

This mobile communication system can also suspend the transmission of data from the aforesaid upper apparatus to the aforesaid handover addressed node in the middle of the transfer by the transferring means, which can contribute to the optimization of radio resources and can improve the cost performance in the system.

BRIEF DESCRIPTION OF THE DRAWINGS

FIGS. 13($a$) and 13($b$) are illustrations for explaining a transferring method of changing a transmission interval according to the first embodiment of the present invention.

FIGS. 14($a$) and 14($b$) are illustrations for explaining a method of changing a unit data volume to be transmitted from a handover addressed node to a mobile unit according to the first embodiment of the present invention.

FIGS. 15($a$) and 15($b$) are illustrations for explaining a method of adding a data transfer transport channel according to the first embodiment of the present invention.

FIGS. 16($a$) to 16($d$) are illustrations for explaining a transferring method of changing a structure of a subchannel according to the first embodiment of the present invention.

FIGS. 20($a$) and 20($b$) are illustrations for explaining a first packet transferring method according to a second embodiment of the present invention.

FIGS. 25($a$) and 25($b$) are illustrations for explaining a first frame format according to the second embodiment of the present invention.

FIGS. 26($a$) and 26($b$) are illustrations for explaining a second frame format according to the second embodiment of the present invention.

FIGS. 27($a$) and 27($b$) are illustrations for explaining a third frame format according to the second embodiment of the present invention.

FIGS. 28($a$) and 28($b$) are illustrations for explaining a fourth frame format according to the second embodiment of the present invention.

BEST MODE FOR CARRYING OUT THE INVENTION

(A) Description of First Embodiment of the Present Invention

An embodiment of the present invention will be described hereinbelow with reference to the drawings.

Figure 1:
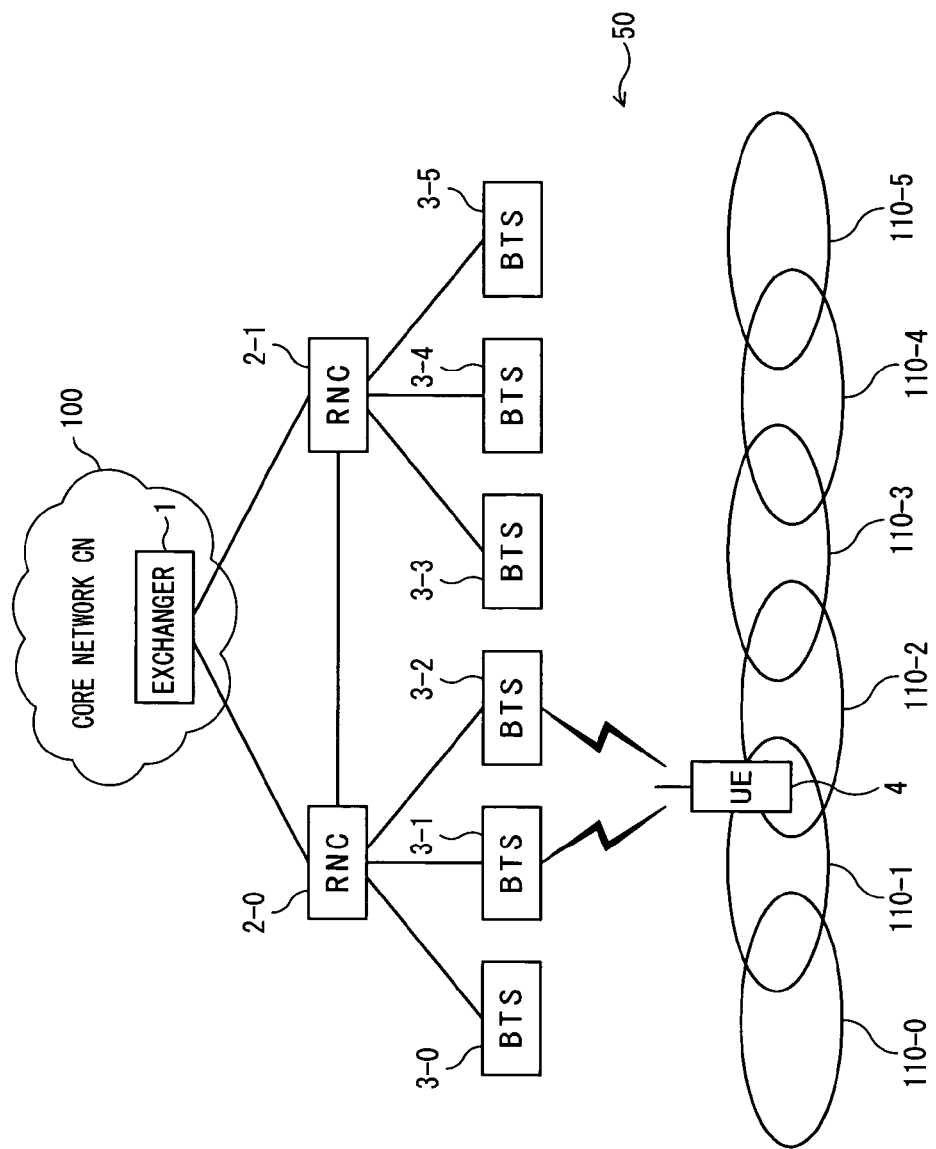
FIG. 1 is an illustration of a configuration of an essential part of a W-CDMA to which the present invention is applied.

FIG. 1 is an illustration of a configuration of an essential part of a W-CDMA system to which the present invention is applied. A W-CDMA system 50 shown in FIG. 1 is a mobile communication system designed to implement a packet transferring/transmitting method according to the present invention for conducting the transmission/reception of large-capacity data such as voice, still image and moving image between a network and a mobile unit, and is made up of a core network (CN) 100, radio network controllers (RNC) 2-0, 2-1, base stations (BTS) 3-0 to 3-5 and a mobile unit (UE) 4. This W-CDMA system 50 includes a large number of nodes which are omitted from the illustration.

(1-1) Core Network 100 and Exchange 1

The core network 100 is a network in which a line exchange, not shown, a packet exchange and a large number of upper nodes are mutually connected to transmit high-speed and large-capacity packets and is equipped with an exchange 1 having a packet switching function.

When transmission/reception data is HS-DSCH data or DSCH data, each of the upper nodes corresponds to the RNC 2-0, 2-1 or the exchange 1, and each lower node corresponds to the base station 3-0 to 3-5 or the RN 2-0, 2-1 (see FIG. 40 mentioned later.

Figure 2:
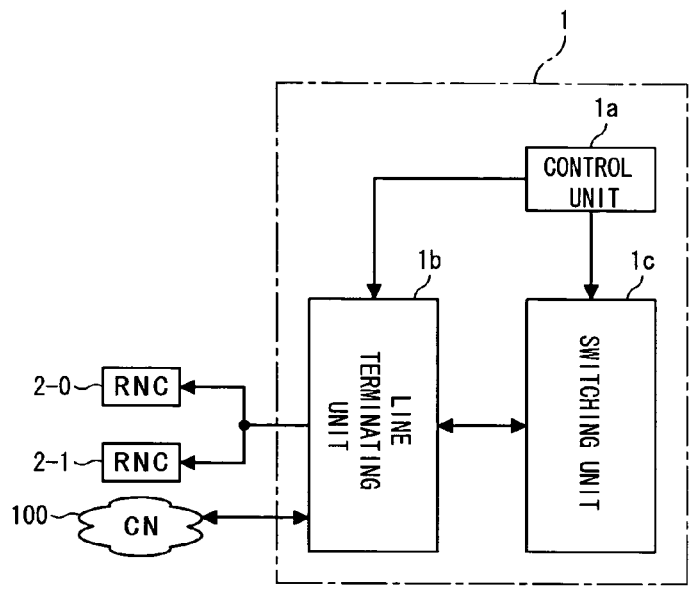
FIG. 2 is a block diagram schematically showing an upper node according to a first embodiment of the present invention.

FIG. 2 is a schematic block diagram showing the exchange 1 according to a first embodiment of the present invention. The exchange 1 shown in FIG. 2 is made to transmit a plurality of new packets to the mobile unit 4 from a different network other than the core network 100 and is composed of a line terminating unit 1b, a control unit 1a and a switching unit 1c.

The line terminating unit 1b is for conducting transmission/reception of data or a packet with respect to a different upper node (for example, the exchange 1 itself or an upper node other than the RNC 2-0, 2-1) or a lower node (for example, the base station 3-0 to 3-5 or the RNC 2-0, 2-1) and terminating it, and further for controlling a flow of data under flow control from a lower node.

Moreover, the switching unit 1c is for switching a line with respect to an upper node or a lower node.

Still moreover, the control unit 1a is for controlling the switching unit 1c on the basis of a control signal from an upper node or a lower node.

Thus, the exchange 1 transfers a header-added packet, received from a different network other than the core network 100 or from the mobile unit 4, to the RNC 2-0, 2-1 or the core network 100 on the basis of its address.

(1-2) RNC 2-0, 2-1

Each of the RNCs 2-0 and 2-1 has a function to terminate a radio protocol prescribed in 3GPP or the like and a function to conduct packet transfer, control of the base stations 3-0 to 3-5, channel allocation, handover, origination/destination connection and others. Moreover, each of the RNCs 2-0 and 2-1 also has a function to control the transmission of DSCH data and HS-DSCH data according to a transmission suspension (transmission suspending message) or a start request (start requesting message) from the base stations 3-0 to 3-5.

In the following description, unless otherwise specified particularly, the handover signifies switching a transport channel (TrCH) from, for example, the base station 3-1, with which the mobile unit 4 makes a communication before the handover, to, for example, the base station 3-2 with which the mobile unit 4 makes a connection after the handover.

(1-3) Base Station 3-0 to 3-5

(1-3-1) About Handover Addressing Node and Handover Addressed Node

Each of the base stations 3-0 to 3-5 is capable of terminating a radio protocol prescribed in 3GPP or the like and functions as a logical node (Node B) for a radio link of the mobile unit 4 existing within cells 110-0 to 110-5. Each of the base stations 3-0 to 3-5 has a data transferring function to transfer buffered DSCH data or HS-DSCH data from a handover addressing node to a handover addressed node under control of the exchange 1.

For convenience of the following description only, unless otherwise specified particularly, the base stations 3-1 and 3-2 function as a handover addressing node and a handover addressed node for the mobile unit 4, respectively. In this case, the handover addressing node is for conducting the transmission/reception of a packet with respect to the mobile unit 4 before the handover, while the handover addressed node is for transmitting a plurality of new packets, directed from the exchange 1 to the mobile unit 4, to the mobile unit 4 before the handover. Incidentally, each of the base stations 3-3 to 3-5 can also function as a handover addressing node or a handover addressed node.

For suspending new packet transmission from the exchange 1 at the buffering of data to be transmitted from the exchange 1 to the mobile unit 4, the base station 3-1 functioning as a handover addressing node transmits a transmission suspending request to the exchange 1 until the data to be transmitted falls into a vacated condition. Moreover, in the base station 3-1, when the data to be transmitted falls into a vacated condition, a transmission start request for the notification on the buffer vacated condition is transmitted to the exchange 1.

In addition, when the data to be transmitted from the exchange 1 to the mobile unit 4 is buffered, the base station 3-1 transfers the buffered data to the base station 3-2 functioning as a handover addressed node. On the other hand, the base station 3-2 has an arbitration function to receive the transferred data and data newly transmitted from the exchange 1 side and transmit these received data to the mobile unit 4 while arbitrating them.

(1-3-2) Configuration of Base Stations 3-0 to 3-5

Each of the base stations 3-0 to 3-5 has a radio transmission function (modulation, code spread, radio frame transmission and others) on a packet transmitted from the RNCs 2-0 and 2-1, a radio reception function (radio frame reception, despread, demodulation and others) and a normal monitoring function for using situations of a plurality of radio resources.

Figure 3:
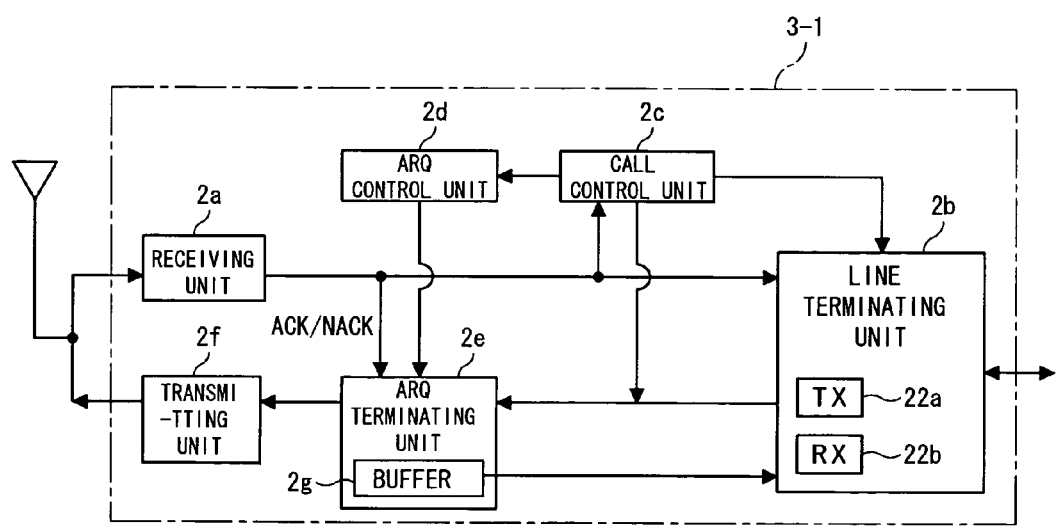
FIG. 3 is a block diagram showing a base station according to the first embodiment of the present invention.

FIG. 3 is a block diagram showing the base station 3-1 according to the first embodiment of the present invention. The base station 3-1 shown in FIG. 3 is composed of a receiving unit (first receiving unit) 2a, a line terminating unit (first line terminating unit) 2b, a call control unit (first call control unit) 2c, an ARQ control unit (first retransmission control unit) 2*d*, an ARQ terminating unit (first ARQ terminating unit) 2*e* and a transmitting unit (first transmitting unit) 2*f*.

In this configuration, the receiving unit 2*a* is for receiving a radio frame from the mobile unit 4 to carry out the demodulation and decode processing thereon. The transmitting unit 2*f* carries out the encoding and modulation processing on transmission data and transmits it to the mobile unit 4. Moreover, the transmitting unit 2*f* is capable of giving, to the transmission data, a priority which will be mentioned later in a pattern B.

The line terminating unit 2*b* is for terminating data with respect to the exchange 1 side or the base station 3-2, and is made to transmit or transfer, to the exchange 1 side or the base station 3-2, the data transferred from a data holding buffer 2*g* provided in the ARQ terminating unit 2*e*. It is composed of a first line receiving unit 22*a* and a first line transmitting unit 22*b*.

The first line receiving unit 22*a* is for receiving a packet from the exchange 1 side or the base station 3-2. A buffer 2*g* holds the packet received by this first line receiving unit 22*a*.

The first line transmitting unit 22*b* is made to, on the basis of a packet volume retransmission-controlled by the ARQ control unit 2*d* which will be mentioned later, transmit the packet held in the buffer 2*g* to the base station 3-2 serving as a handover addressed node without interposing the exchange 1 or the RNC 2-0, 2-1, or to transmit it to the base station 3-2 through the upper node (base station 3-2 or the exchange 1). This terminates the transmission/reception of data with respect to the exchange 1 side or the mobile unit 4 side.

Moreover, the call control unit 2*c* is for carrying out the handover control on the basis of a call control signal received from the mobile unit 4.

Still moreover, the ARQ control unit 2*d* is made to carry out retransmission control on a packet volume to be transferred on the basis of a resource capacity of the base station 3-2 included in the packet received by the first line receiving unit 22*a* (line terminating unit 2*b*) and a packet residual value held in the buffer 2*g*. Yet moreover, the ARQ control unit 2*d* is made to conduct operations for the start, change and termination of an H-ARQ (Hybrid-Auto Repeat Request) protocol. This H-ARQ is a name of the ARQ protocol prescribed in HS-DSCH.

As well known, the ARQ signifies a method of retransmitting data, lost due to error in a radio zone or the like, under retransmission control for assuring the integrity of data, and H-ARQ depicts ARQ operating at a high speed. The transmission-waiting data held in the buffer 2*g* becomes transferable to the line terminating unit 2*b* according to an instruction outputted from the ARQ control unit 2*d* to the ARQ terminating unit 2*e*. This enables implementing the control on flow of data through the use of flow control.

In addition, the ARQ terminating unit 2*e* is for terminating the ARQ protocol and for receiving new data from the exchange 1 or the RNC 2-0, 2-1 and transferred data from the handover addressing node (base station 3-2) to arbitrate and encapsulate the received data.

The line terminating unit 2*b*, the call control unit 2*c*, the ARQ control unit 2*d* and the ARQ terminating unit 2*e* cooperate with each other, which provides a function as a transmitting means (2*b*, 2*c*, 2*d*, 2*e*).

Thus, owing to the H-ARQ, the information data and the error correction data are independently transmittable and the number of times of retransmission is reducible. Incidentally, the ARQ control unit 2*d* can also employ the normal ARQ.

Figure 4:
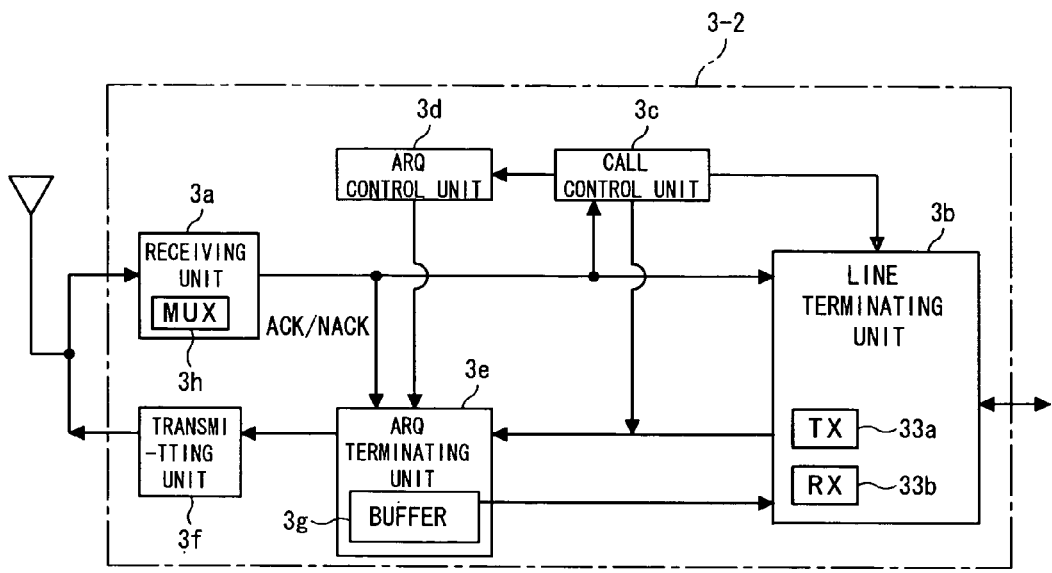
FIG. 4 is a block diagram showing a base station according to the first embodiment of the present invention.

FIG. 4 is a block diagram showing the base station 3-2 according to the first embodiment of the present invention.

The base station 3-2 shown in FIG. 4 is composed of a receiving unit (second receiving unit) 3*a*, a line terminating unit (second line terminating unit) 3*b*, a call control unit (second call control unit) 3*c*, an ARQ control unit (second retransmission control unit) 3*d*, an ARQ terminating unit (second ARQ terminating unit) 3*e* and a transmitting unit (second transmitting unit) 3*f* which have the same functions as those of the receiving unit 2*a*, the line terminating unit 2*b*, the call control unit 2*c*, the ARQ control unit 2*d*, the ARQ terminating unit 2*e* and the transmitting unit 2*f* provided in the base station 3-1, respectively.

The line terminating unit 3*b* is for terminating data between the host side exchange 1 and the lower side base station 3-1, and is composed of a second line receiving unit 33*a* and a second line transmitting unit 33*b*. The second line receiving unit 33*b* is made to receive a plurality of packets from the host side exchange 1 and the lower side base station 3-1. The second line transmitting unit 33*b* is made to implement the retransmission control on the plurality of packets, received in the second line receiving unit 33*b*, in the ARQ control unit 3*d* which will be mentioned later. Moreover, the ARQ control unit 3*d* is made to carry out the retransmission control on the plurality of packets received by the second line receiving unit 33*b*.

The transmitting unit 3*f* is made to give a retransmission control header, undergoing the retransmission control in the ARQ control unit 3*d*, to the plurality of packets received by the second line receiving unit 33*a* and transmit a radio frame with this header to the mobile unit 4. The header giving to the transmitting unit 3*f* will be explained in patterns B and C which will be mentioned later.

The call control unit 3*c*, the ARQ control unit 3*d*, the ARQ terminating unit 3*e* and the transmitting unit 3*f* cooperate with each other, which provides a function as a transmitting means (3*c*, 3*d*, 3*e*, 3*f*).

The description of the functions other than these will be omitted for avoiding repeating explanation. Moreover, the configurations of the base stations 3-0 and 3-3 to 3-5 are the same as that of the base station 3-1, and the description thereof will be omitted for avoiding repeated explanation.

As described above, the W-CDMA system 50 has a function to switch a transmission path of data, which is from the upper node (an upper apparatus) to the mobile unit 3, from the transmission from the handover addressing node 2 to the transmission from the handover addressed node 3. In addition, the handover addressing node 2 is equipped with a transferring means (2*b*, 2*c*, 2*d*, 2*e*) to transfer the data, addressed to the mobile unit 4 and left in the handover addressing node 2, to the handover addressed node 2 at this switching, and the handover addressed node 3 is equipped with a transmitting means (3*c*, 3*d*, 3*e*, 3*f*) to transmit the data received through this transferring and the data from an upper node to the mobile unit 4.

(1-4) Mobile Unit (UE) 4

The mobile unit 4 has a function to make radio communication with the base stations 3-0 to 3-5, a function to make transmission/reception of data on communication, management and control and a function to conduct an H-ARQ operation, and it is a portable telephone or portable radio terminal, a user manipulates.

Figure 5:
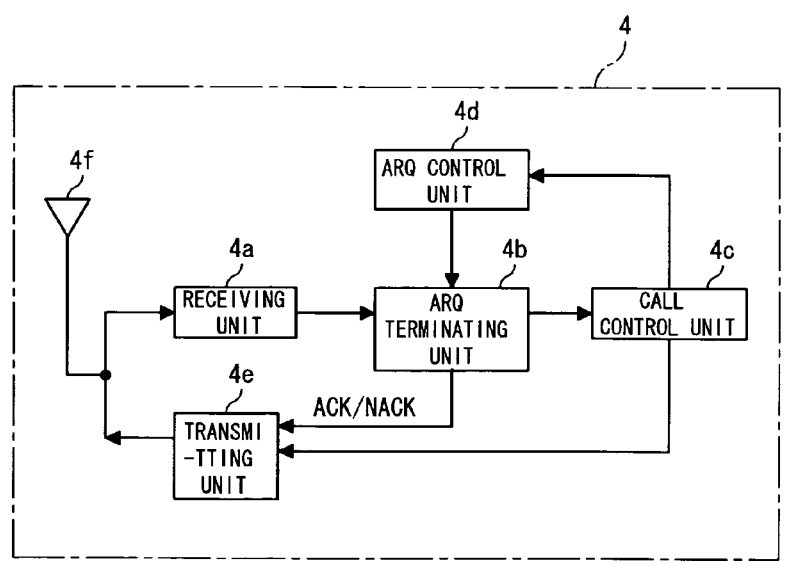
FIG. 5 is a block diagram showing a mobile unit according to the first embodiment of the present invention.

FIG. 5 is a block diagram showing the mobile unit 4 according to the first embodiment of the present invention. The mobile unit 4 shown in FIG. 5 is composed of an antenna 4*f*, a receiving unit 4*a*, an ARQ terminating unit 4*b*, a call control unit 4*c*, an ARQ control unit 4*d* and a transmitting unit 4*e*.

The antenna 4*f* is for making transmission/reception of a radio frame. The receiving unit 4*a* is for receiving a radio frame from the base stations 3-0 to 3-5 to conduct the demodulation and decoding processing thereon. The ARQ terminating unit 4*b* is for terminating the ARQ protocol. The call control unit 4*c* is for conducting the handover processing on the basis of a call control signal received from the base stations 3-0 to 3-5. The ARQ control unit 4*d* is for conducting the start of the ARQ protocol, modulation and termination under control from the call control unit 4*c*. The transmitting unit 4*e* is for conducting the encoding and modulation processing on a call control signal, user data and ACK/NACK of ARQ to transmit them to the base stations 3-0 to 3-5.

(1-5) Cells 110-0 to 110-5 (see FIG. 1)

Each of the cells 110-0 to 110-5 represents, between the mobile unit 4 and the base station 3-0 to 3-5, a schematic range in which a high-quality radio frame is transmittable/receivable, and the range of each of the cells 110-0 to 110-5 almost overlaps with the range of the adjacent cell 110-0 to 110-5. When moving to the overlapping range, the mobile unit 4 makes the transmission/reception of the same data with respect to the adjacent base station 3-0 to 3-5, thereby achieving the soft handover.

(1-6) Transmission Line

The nodes 101, 102-0 to 102-n, 103-0 to 103-n and 104 are physically connected through an ATM transmission line, and an interface between the nodes is prescribed in a specification. Concretely, the interfaces between the RNCs 102-0 to 102-n and the exchanger 1 are an ATM transmission line which is referred to as Iu, and the interfaces between the RNCs 102-0 to 102-n are referred to as Iur. The interfaces between the RNCs 102-0 to 102-n and the base stations 103-0 to 103-n are an ATM transmission line which is referred to as Iub, and the interface between the base stations 103-0 to 103-n and the mobile unit 104 is referred as to Uu.

(1-7) New Packet and Transfer Packet

Each of the exchange 1 and the mobile unit 4 fragments large-capacity audio data, text data, image data and others into a large number of fine data, and transmits the fragmented data without packeting or transmits a large number of packets by means of packeting.

Therefore, with respect to the downlink, the exchange 1 continuously transmits audio data, text data and others to the same mobile unit 4 at a constant time interval while segmenting them, and transmits different kinds of text data and others to a different mobile unit (not shown). This also applies to the uplink.

Concretely, in a user telephone (not shown) in the core network 100, voice and others are encoded at a predetermined time interval, and the encoded audio data is fragmented into, for example, 1000 data and headers having serial numbers counted up from 1 in order are given to the 1000 data, respectively, to produce 1200 packets.

Thus, with respect to the packets with the serial numbers, for example, each of the ARQ control units 2*d*, 3*d* provided in the RNCs 2-0 and 2-1 records the serial numbers of the packets, which has been received normally, and the serial number of the packets, which has not been received normally. Moreover, the ARQ control units 2*d* and 3*d* issue a request for retransmission to the user telephone in the core network 100 and, when receiving the retransmitted two packets, recognize the reception of all the packets. Subsequently, the ARQ unit extracts the data included in the 1200 packets to assemble a voice, a text file or the like within a constant period of time as one unit of user information and hands it over to an upper layer. It is also appropriate that, in place of the layer 2 ARQ unit, an upper layer equal to or higher than layer 3 performs this assembling.

In the following description, audio data, text data or the like is referred to as a new packet as unit of transmission/reception. That is, each new packet represents one unit of user information composed of a large number of packets. Moreover, each packet is once buffered in the RNC 2-0, 2-1 as will be mentioned in detail later before being transmitted to the mobile unit 4. Through the use of the serial number given to each packet, each packet is managed in terms of reception/non-reception in an ARQ (Auto Repeat Request: automatic retransmission control) provided in each node which is made to transmit/receive or repeat the packet. In this case, it is preferable to employ H-ARQ having a processing speed higher than that of the ARQ.

The configuration shown in FIG. 2 is the same as that of a second embodiment which will be described later.

(2) Referring to FIG. 6, a description will be given hereinbelow of a packet transferring/transmitting method according to the present invention.

Figure 6:
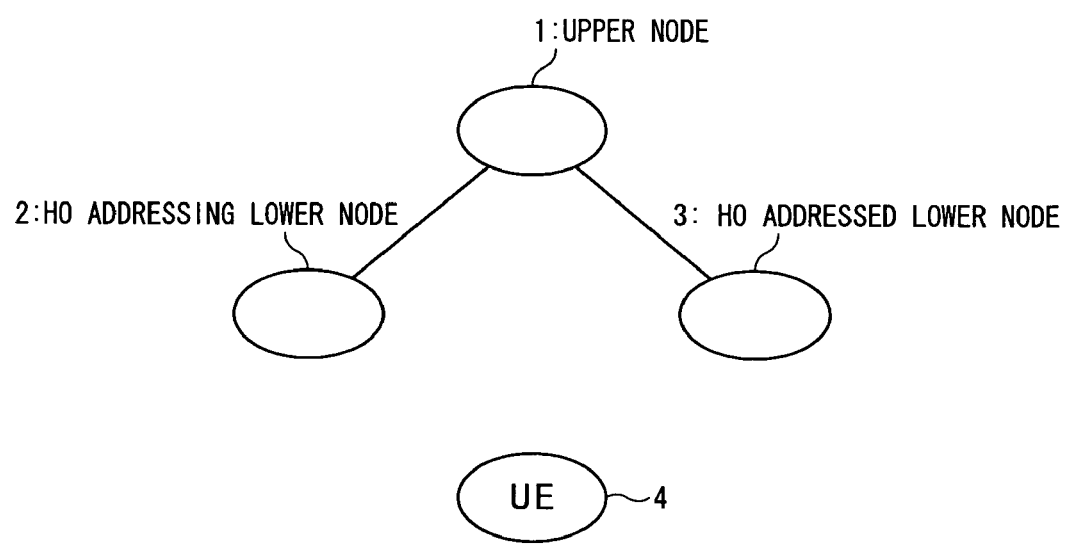
FIG. 6 is an illustration for explaining a packet transferring/transmitting method according to the first embodiment of the present invention.
Figure 7A:
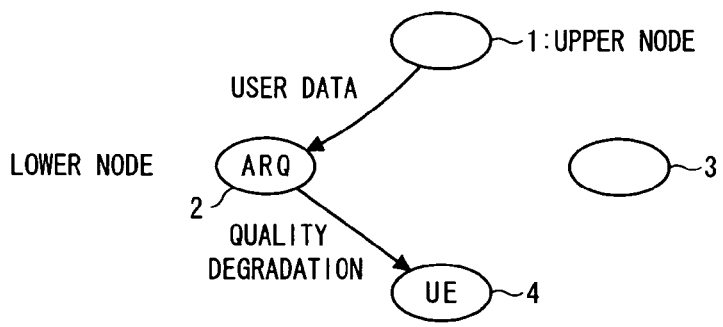
FIGS. 7($a$) to 7($e$) are illustrations for explaining an operation of a pattern A according to the first embodiment of the present invention.
Figure 7B:
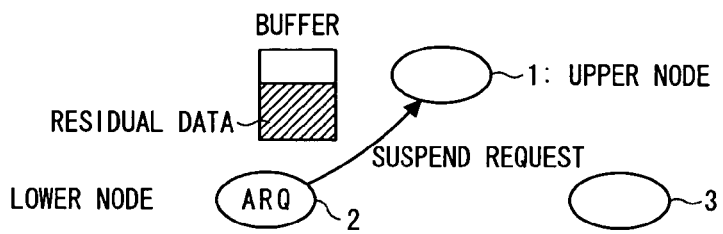
Figure 7C:
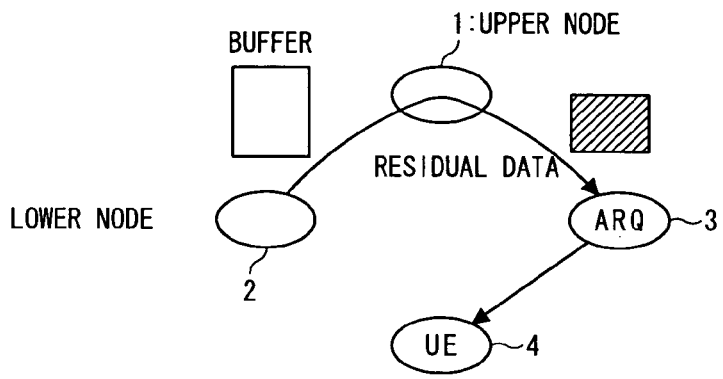
Figure 7D:
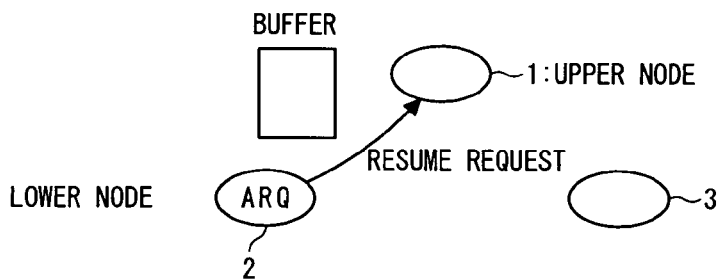
Figure 7E:
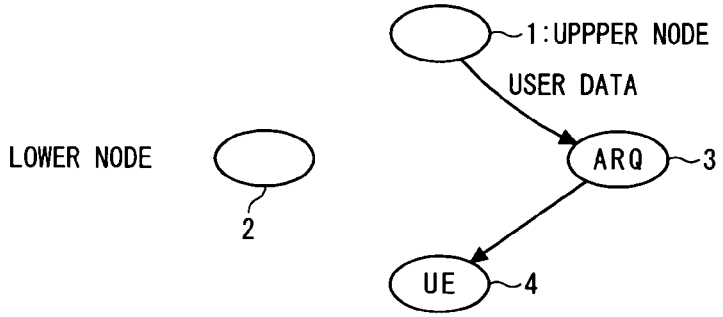

FIG. 6 is an illustration for explaining a packet transferring/transmitting method according to the first embodiment of the present invention, and shows a model which is a simplification of the configuration shown in FIG. 6. An upper node shown in FIG. 6 corresponds to the exchanger 1 in the case of an HS-DSCH channel. Moreover, in the upper node 1, the transmission of user data and the handover control are implemented, and in a handover addressing node 3 (base station 3-1) and a handover addressed node 3 (base station 3-2), an uplink packet and a downlink packet are transmitted/received with respect to the upper node 1, and a radio frame is transmitted with respect to the mobile unit 4 through the use of an ARQ communication protocol. The employment of this ARQ assures the perfect data communication between the handover addressing node 2/the handover addressed node 3 and the mobile unit 4.

In addition, in the handover addressed node 3, a conversion is made on a data format between a transmission zone and a radio zone. In this case, the ARQ protocol in the handover addressing node 2 and the handover addressed node 3 corresponds to an RLC (Radio Link Control) protocol. The mobile unit 4 makes the transmission/reception of a radio frame with respect to the handover addressing node 2 and the handover addressed node 3, and carries out the handover.

In the following, unless otherwise specified particularly, the mobile unit 4 carries out the handover due to walking, vehicle or train in a state where it makes packet transmission/reception with respect to the handover addressing node 2 and carries out the packet transmission/reception with respect to the handover addressed 3.

(2-1) Packet Transferring/Transmitting Method According to the Present Invention.

The packet transferring/transmitting method according to the present invention is for use in the W-CDMA system 50 including the upper node 1 made to transmit a plurality of packets addressed to the mobile unit 4, the handover addressing node 2 made to transmit a plurality of packets addressed to the mobile unit 4 and the handover addressed node 3 made to transmit a plurality of packets addressed to the mobile unit 4, and the upper node 1 determines the implementation of the handover (determination step). Moreover, the handover addressing node 2 transfers, of the plurality of packets, a non-transmitted residual packet(s) to the handover addressed node 3 (transfer/transmission step). Still moreover, preferably, the determination (determination step) of the implementation of the handover is based upon the reception of a handover request transmitted from the mobile unit 4 or a radio situation report from the mobile unit 4.

(2-2) Implementation Patterns A to D

Among the implementation patterns of the packet transferring/transmitting method according to the present invention, there are four types of patterns A to D as will be mentioned hereinbelow, and these patterns A to D are classified into the patterns A, C and the patterns B, D according to modes in which the handover addressing node 2 transfers/transmits packets to the handover addressed node 3.

(2-3) Relationship Between Implementation Patterns A to D and This Packet Transferring/Transmitting Method The first packet transferring/transmitting method (pattern A, C) is a method of suspending the transmission of a new packet from the upper node 1 to the handover addressed node 3. That is, the handover addressing node 2 (or the upper node 1 itself) suspends the transmission of a new packet from the upper node 1 (suspension step) and, while the transmission of the new packet is in a suspended condition, the handover addressing node 2 transfers a residual packet(s) to the handover addressed node 3 (first residual packet transferring step). Moreover, when the residual packet is transferred in the first residual packet transferring step, the handover addressing node 2 (or the upper node 1 itself) resumes the transmission of the new packet from the upper node 1 (resumption step), and the upper node 1 transmits the new packet to the handover addressed node 3 (new packet transmitting step)

The second packet transferring/transmitting method (patterns B and D) is a method of continuing the transmission of a new packet from the upper node 1 to the handover addressed node 3 so that the handover addressed node 3 carries out the arbitration between the packet transferred from the handover addressing node 2 and the new packet transmitted from the upper node 1. That is, the handover addressing node 2 transfers a residual packet to the handover addressed node 3 (second residual packet transferring step), and the upper node 1 transmits a new packet to the handover addressed node 3 (new packet transmitting step). Moreover, the handover addressed node 3 carries out the arbitration between the packet transferred in the second residual packet transferring step and the packet transmitted in the new packet transmitting step (arbitration step).

In addition, the patterns C and D are a method of encapsulating transferred data in each of the patterns A and B. Therefore, the patterns A to D are roughly classified into two patterns×two patterns. In other words, the patterns A and B correspond to cases of suspending/non-suspending the new packet transmission from the upper node 1 while, at the handover, the data left in the handover addressing node 2 without being transmitted is transferred to the handover addressing node 3. The patterns C and D correspond to cases of, when data is transferred, encapsulating/non-encapsulating the transferred data with it being regarded as a portion of the new packet communication.

In this connection, the patterns A to D have two patterns added according to a residual packet transferring method. Concretely, these added two patterns correspond to a case in which it is conducted in a manner such that a direct transferring line is set between the upper node 1 and the handover addressing node or the handover addressed node 3 and a case in which it is conducted by way of the upper node 1. In the following explanation, they will be handled as extension patterns from the aforesaid four patterns.

(2-4) Description of DSCH and HS-DSCH

Figure 40:
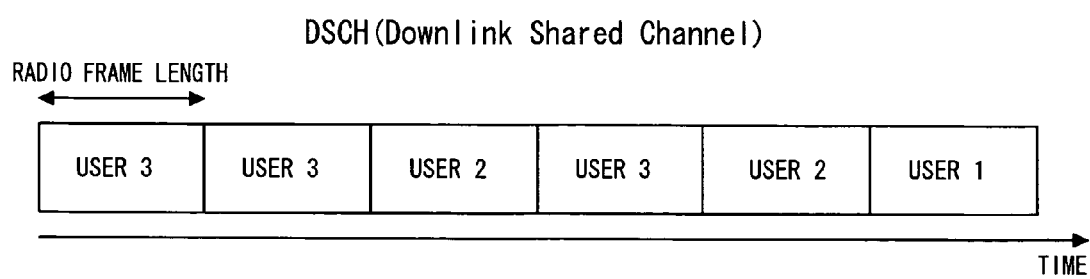
FIG. 40 is an illustration for explaining DSCH.

FIG. 40 is an illustration for explaining DSCH. The DSCH shown in FIG. 40 is a downlink channel a plurality of mobile units 4 (for example, user 1 to user 3) share, which achieves the service efficiency of radio resources. Moreover, the HS-DSCH (not shown) signifies a high-speed data-transmittable DSCH. The specifications of the DSCH and HS-DSCH are prescribed in the described TS25.435/427/425 and the described TR25.835/837/848/855/877/950.

The units for terminating these DSCH data and HS-DSCH data are different from each other. In the W-CDMA system 50, the DSCH data is terminated in the RNC 2-0, 2-1, and an upper node and a lower node correspond to an exchange and an RNC, respectively. Moreover, in a system employing the DSCH, all the functions such as an RLC (Radio Link Control) protocol processing concentrate on the RNC 2-0, 2-1. The principal function of the base stations 3-0 to 3-5 is the switching between a transmission line zone and a radio zone (not shown for simplicity).

On the other hand, the HS-DSCH data is terminated in the base stations 3-0 to 3-5, and an upper node and a lower node correspond to the RNCs 2-0, 2-1 and the base stations 3-0 to 3-5, respectively. In an HS-DSCH system, an ARQ function is provided in the base station 3-0 to 3-5 close to the mobile unit 4. This ARQ function uses an H-ARQ protocol. This H-ARQ is a method of retransmitting data lost due to error in a radio zone under retransmission control for assuring the integrity of data.

A description will be given hereinbelow of a case employing the HS-DSCH where upper nodes and lower nodes are the RNCs 2-0, 2-1 and the base stations 3-0 to 3-5, respectively. The present invention can be carried out even in the case of the employment of DSCH.

(2-5) Description of Outline of Patterns A to D

Furthermore, referring to FIG. 6, a description will be given of a sequence for a control signal and user data between nodes.

The respective patterns will be described in the following order of A to D.

A. The transmission of a new packet is once suspended during the transfer of a residual packet and data to be transferred is not encapsulated.

B. A new packet is transmitted even during the transfer of a residual packet and data to be transmitted is not encapsulated.

C. The transmission of a new packet is once suspended during the transfer of a residual packet and data to be transmitted is encapsulated.

D. A new packet is transmitted even during the transfer of a residual packet and data to be transferred is encapsulated.

A description will be given hereinbelow of each pattern.

(3) Description of Pattern A

FIGS. 7(*a*) to 7(*e*) are illustrations for explaining an operation of the pattern A according to the first embodiment of the present invention.

When the mobile unit 4 shown in FIG. 7(*a*) starts to move, the handover addressing node 2 detects the quality degradation. Moreover, the handover addressing node 2 shown in FIG. 7(*b*), for transferring a residual packet, makes the upper node 1 suspend a new packet transmission. Subsequently, the handover addressing node 2 transfers a residual packet to the handover addressed node 3 (see FIG. 7(*c*)) designated by the upper node 1. When the residual packet transferring reaches completion, the handover addressing node 2 shown in FIG. 7(*d*) transmits a resume request for resuming the new packet transmission to the upper node 1. Following this, the upper node 1 shown in FIG. 7(*e*) transmits a new packet to the handover addressed node 3.

Figure 8:
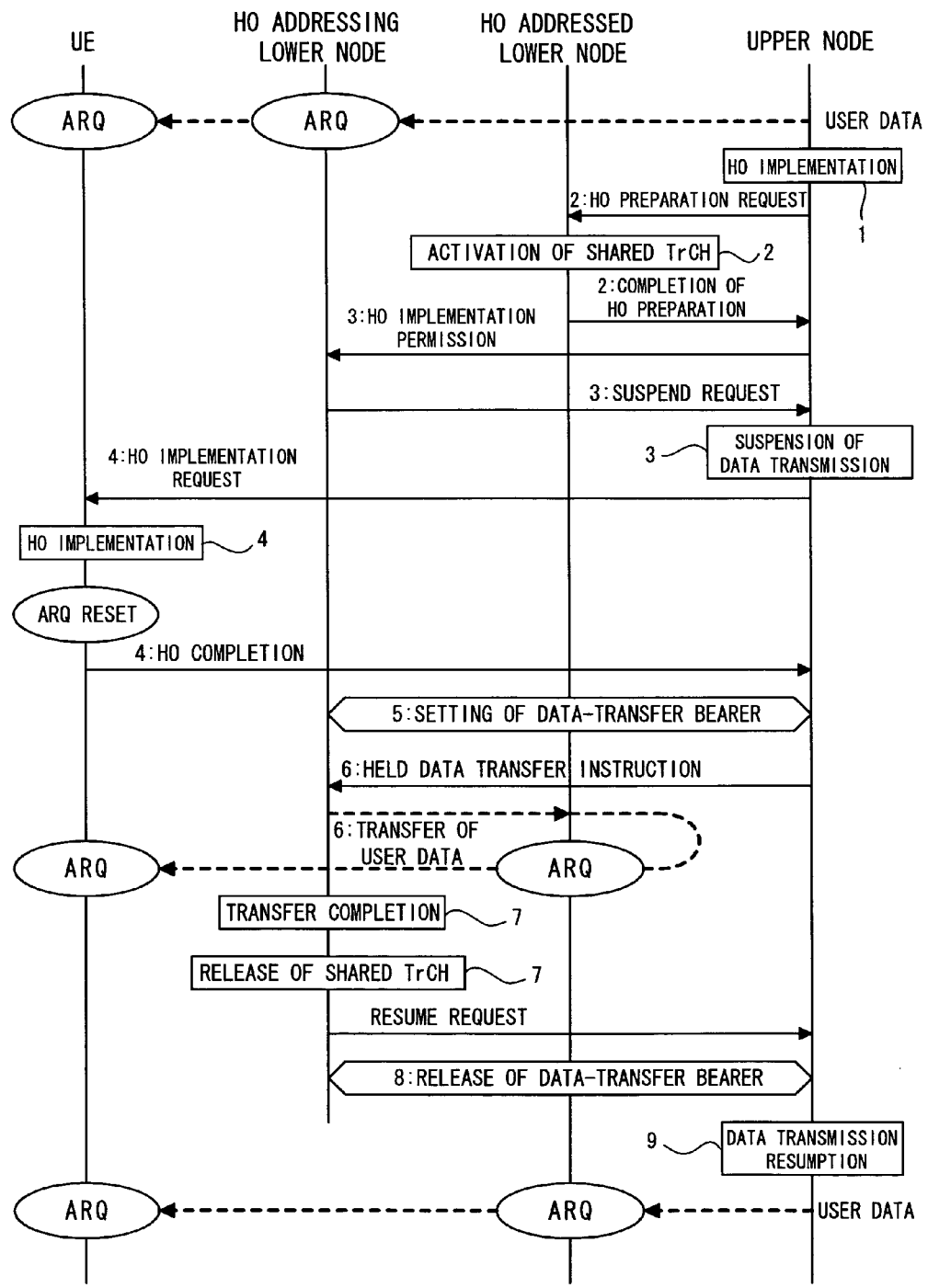
FIG. 8 shows an example of a sequence for explaining an operation of the pattern A according to the first embodiment of the present invention.

Furthermore, referring to an example of a sequence shown in FIG. 8, a description will be given of an operation of the same pattern A. In FIG. 8, HO, HO Addressing Lower Node, HO Addressed Lower Node and Upper Node represent handover, handover addressing node, handover addressed node and the upper node, respectively, and this also applies to the drawings to be referred to for the following description. Moreover, (3-1) to (3-9) correspond to the reference numerals 1 to 9 in FIG. 8, respectively.

(3-1) The upper node 1 shown in FIG. 8 monitors the quality of a signal received from the mobile unit 4, and detects the degradation thereof and starts the implementation of the handover. The start of the handover depends upon, in addition to a handover request from the mobile unit 4, a decision in the upper node 1 based on a radio situation report on the mobile unit 4 itself which is to be transmitted from the mobile unit 4 to the upper node 1.

In this case, the mobile unit 4 measures a radio situation around the position of the mobile unit 4 itself at all times and reports this radio situation to the upper node 1, and the upper node 1 transmits an instruction on the handover to this mobile unit 4. As an example of radio situation report, the upper node 1 receives, at all times, information indicative of whether the actual measurement value is improved or which of radio areas is improved in quality, or information indicative of which of radio areas is degraded in quality. Moreover, the upper node 1 makes a comparison between the information transmitted from the mobile unit 4 and the radio intensity information held therein in advance to make a determination as to whether or not the electric field strength permits the radio communication. Still moreover, the upper node 1 selects an appropriate one of the radio areas around the mobile unit 4 and notifies the selected area to the handover addressing node 2. Thus, the handover addressing node 2 can seize the handover addressed node 3.

(3-2) For requesting a resource securement for a communication with the mobile unit 4 which conducts the handover, the upper node 1 transmits a handover preparation request to the handover addressed node 3 (this also applies to the other drawings). The handover addressed node 3 secures a resource in response to this request. Moreover, in a case in which a channel between the upper node 1 and the handover addressed node 3 is not set yet (in the case of the first message transmission/reception), the handover addressed node 3 newly activates a shared channel (shared TrCH: shared transport channel) with respect to the upper node 1 and prepares the handover through the activation of the shared transport channel and transmits the handover preparation completion to the upper node 1. If there is a channel already activated, it adds a user.

(3-3) The upper node 1 permits the handover addressing node 2 to implement the handover. Upon receipt of this permission (handover implementation permission), the handover addressing node 2 transmits a suspend request to the upper node 1 to suspend the transmission of a new packet.

Incidentally, in place of the transmission of the suspend request from the handover addressing node 2, it is also appropriate that the upper node 1 itself suspends the transmission of a new packet with reference to the time of the handover implementation permission.

(3-4) The upper node 1 transmits a handover instruction (handover implementation request) to the mobile unit 4. In accordance with this instruction, the mobile unit 4 starts the implementation of the handover and resets the held contents of the ARQ control unit 4d (see FIG. 5). Moreover, the mobile unit 4 shifts to the handover addressed node 3 and secures a communication channel.

(3-5) The upper node 1 sets a bearer channel to transfer data left in the handover addressing node 2 to the handover addressed node 3. This bearer channel can be set to make direct communication between the handover addressing node 2 and the handover addressed node 3, and it can also be set through the upper node 1.

(3-6) The upper node 1 makes a request for the transfer of a residual packet to the handover addressing node 2 (expressed as held data transferring instruction). According to this request, the handover addressing node 2 transfers a residual packet (user data) to the handover addressed node 3 through the use of the bearer channel set in (3-5). The handover addressed node 3 transfers the residual packet to the mobile unit 4 in a state where the residual packet from the handover addressing node 2 is monitored by the ARQ control unit 4d.

(3-7) When the transfer of the residual packet reaches completion, the handover addressing node 2 cancels the shared channel and the releases the resource secured by the mobile unit 4 which has conducted the handover, and transmits a resume request to the upper node 1. Although in the sequence shown in FIG. 8 the handover addressing node 2 outputs the resume request, it is also appropriate that the upper node 1 itself monitors the completion of the transfer and performs the resumption when detecting the completion.

(3-8, 3-9) Upon receipt of the resume request, the upper node 1 releases the bearer channel set for transferring the residual packet and resumes the transmission of a new packet to the handover addressed node 3.

Thus, the W-CDMA system 50 suspends the transmission of data from the upper node to the handover addressed node 3 during the transfer by the transferring means (2b, 2c, 2d, 2e).

In addition, since the transmission of a new packet is once suspended during the transfer of a residual packet in this way, the number of users to be accommodated is maintainable while securing a wide bandwidth, and the sharing of a line is efficiently feasible at the handover.

(4) Description of Pattern B

Figure 9A:
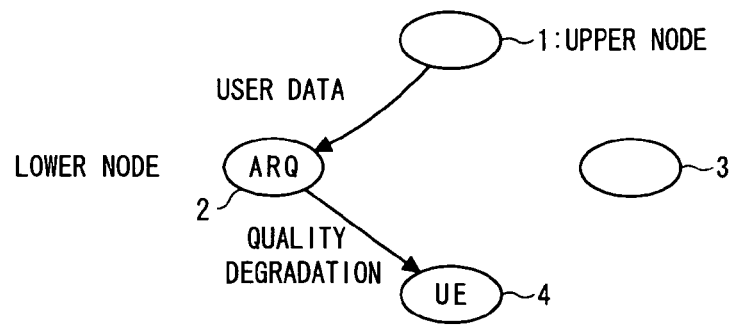
FIGS. 9($a$) to 9($c$) are illustrations for explaining a pattern B according to the first embodiment of the present invention.
Figure 9B:
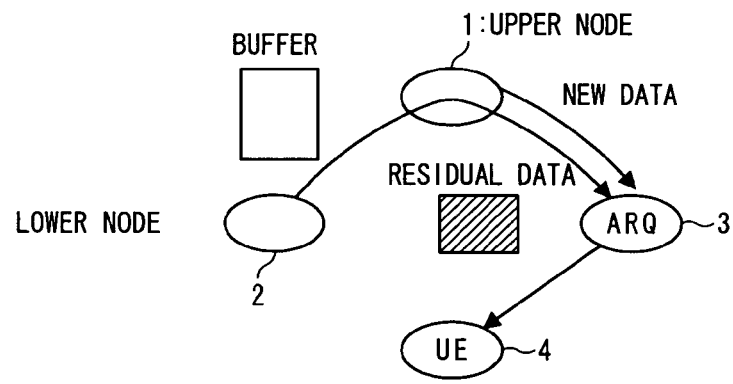
Figure 9C:
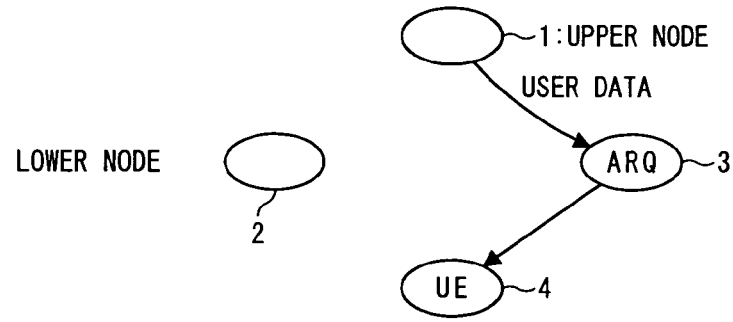

FIGS. 9(a) to 9(c) are illustrations for explaining the pattern B. When the mobile unit 4 shown in FIG. 9(a) starts to move, the handover addressing node 2 detects the quality degradation. The handover addressing node 2 shown in FIG. 9(b) transfers a residual packet through the upper node 1 to the handover addressed node 3. In this case, the upper node 1 continues the transmission of a new packet, and the handover addressed node 3 receives the transferred packet and the new packet. Moreover, after the transfer of the residual packet reaches completion, the transmission of a new packet from the upper node 1 shown in FIG. 9(c) to the handover addressed node 3 continues.

In the packet transferring/transmitting method (transfer/transmission step) according to the pattern B, the handover addressing node 2 or the upper node 1 secures a resource for holding a residual packet in the handover addressed node 3 and transmits a new packet. Concretely, the handover addressing node 2 having the residual packet transmits a resource allocation request to the handover addressed node 3 which forms a transferring destination. At this time, the handover addressing node 2 makes a request to the handover addressed node 3 so as to secure a resource having a capacity sufficient for the transmission of the entire residual packet. In this connection, since the handover addressing node 2 transmits the transferred data with a priority higher than that of a new packet, it is preferable that the transmitting unit 2f (see FIG. 3) allocates a priority and requests a resource.

Thus, the new packet is continuously transmitted even while the residual packet is transferred. Moreover, the transferred data is transferred without being encapsulated.

(4-1) Description of Transferring Method

In (4-1-1) to (4-1-3), a description will be given hereinbelow of the transfer between a handover addressing node and a handover addressed node, and in (4-1-4), a description will be given of the transfer between a handover addressed node and a mobile unit.

The following methods are employable as the transferring method and will be described with reference to FIGS. 10 to 16. Incidentally, a combination of the transferring methods shown in FIGS. 10 to 16 is feasible.

Figure 10:
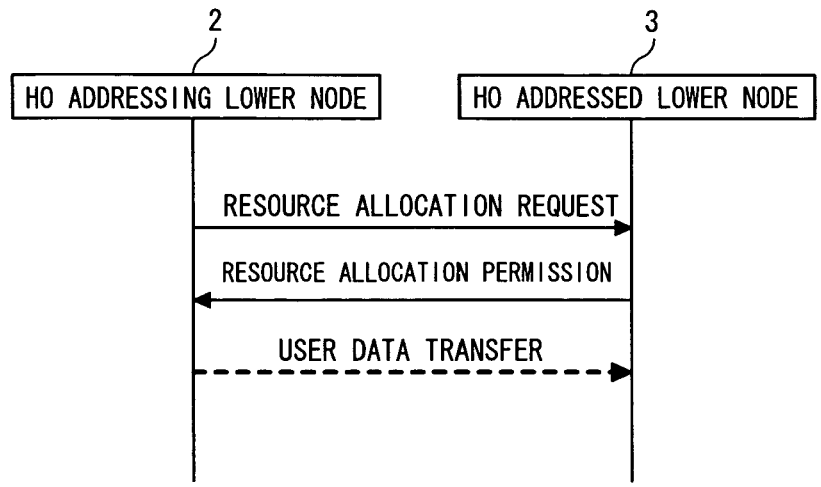
FIG. 10 is an illustration for explaining an arbitration method based on a resource allocation request according to the first embodiment of the present invention.

(4-1-1) FIG. 10 is an illustration for explaining an arbitration method based on a resource allocation request according to the first embodiment of the present invention. In FIG. 10, the handover addressing node 2 makes a request to the handover addressed node 3 for a report on the present resource vacancy situation (resource allocation request). Moreover, the handover addressed node 3 examines the free capacity of the buffer 3g and notifies a free resource allocation (resource allocation permission). The handover addressing node 2 transfers the transferable data of the residual packet, the handover addressing node 2 itself holds, according to the resource vacancy situation (user data transfer). The handover addressing node 2 repeatedly conducts this transfer until the residual packet runs out. This enables the efficient use of the resource.

Figure 11:
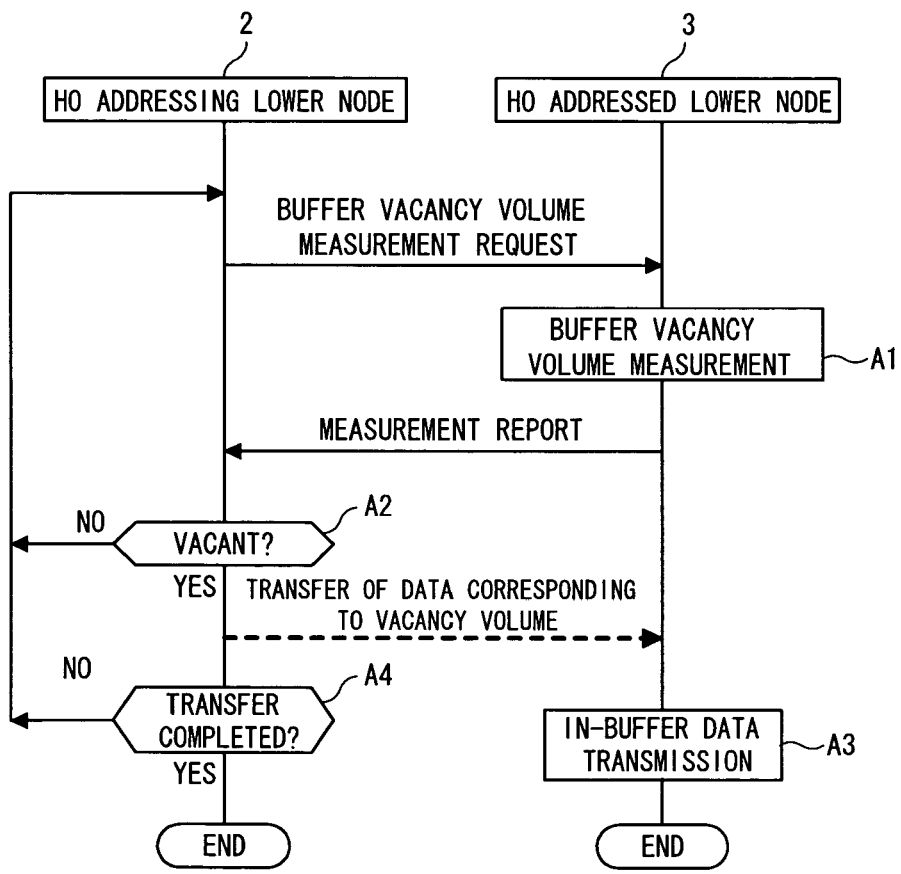
FIG. 11 is a flow chart for explaining a transferring method based on measurement of a free buffer capacity according to the first embodiment of the present invention.

(4-1-2) FIG. 11 is a flow chart for explaining a transferring method based on the measurement of a free buffer capacity according to the first embodiment of the present invention. In the packet transferring/transmitting method shown in FIG. 11, the handover addressing node 2 transmits a "buffer vacancy capacity measurement request" message to the handover addressed node 3, and the handover addressed node 3 measures its own reception buffer vacancy capacity (step A1) and transmits the measurement result as a "measurement report" message to the handover addressing node 2.

Subsequently, when receiving this "measurement report" from the handover addressed node 3, the handover addressing node 2 makes a decision as to whether or not a resource vacancy capacity is left in the handover addressed node 3 (step A2). If the vacancy capacity runs short, the operational flow goes through the NO route to return to the beginning of the processing. On the other hand, if the vacancy capacity is left, the operational flow goes through the YES route, and the handover addressing node 2 makes a decision that the vacancy capacity is sufficient and, hence, determines a pattern of a residual packet transmitting method and transfers the data corresponding to the vacancy capacity to the handover addressed node 3 (vacancy capacity data transfer). At this time, on the basis of a decision instruction from the upper node 1 or the base station (before and after the handover), the handover addressing node 2 determines one of the collective transmission of data after the adjustment on the number of divisions and the division transmission.

In a step A3, the handover addressed node 3 puts the transferred data in a reception buffer area on which a detection has been made as vacancy in the previous measurement, with the data being transferred to the buffer, provided in the interior of the handover addressed node 3 itself, according to stored data volume, storage time and others.

Thus, the handover addressing node 2 according to the present invention transfers a transferable portion of the residual packet(s) on the basis of the resource capacity measured in the measurement step (scheduling step).

(4-1-3) Description of Distribution Transfer

This distribution transfer signifies a method in which the handover addressing node 2 transmits a residual packet to the handover addressed node 3 and the handover addressed node 3 transmits data to the mobile unit 4 in the order of arrival.

Figure 12:
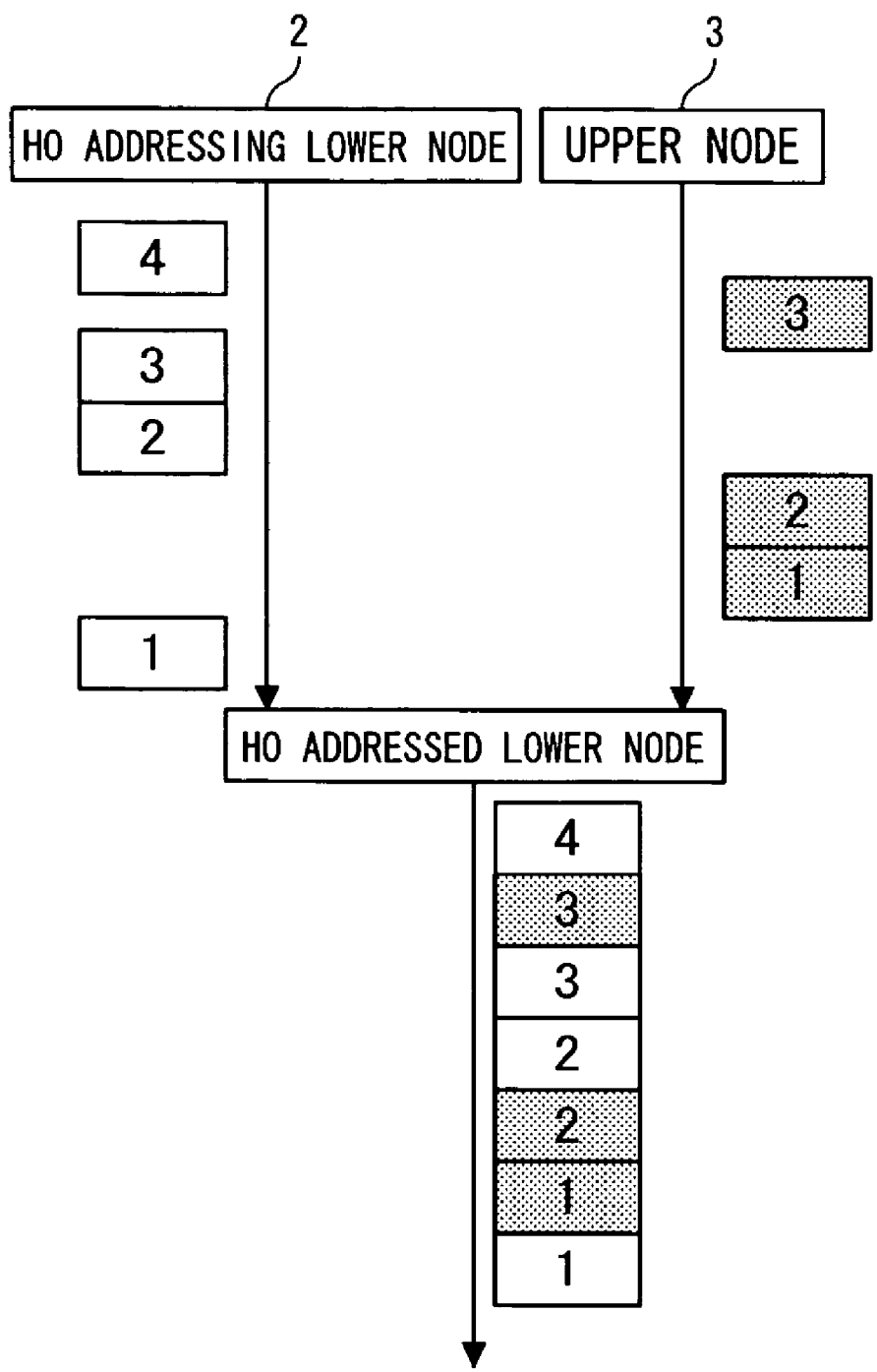
FIG. 12 is an illustration for explaining distribution transfer according to the first embodiment of the present invention.

FIG. 12 is an illustration for explaining the distribution transfer according to the first embodiment of the present invention. In FIG. 12, the handover addressing node 2 is made to, instead of making a request for the notification on the resource situation to the handover addressed node 3, divide (distribute) and transmit a residual packet by a small volume for transmitting the residual packet in the intervals of the transmission of a new packet.

In this pattern transferring/transmitting step, the handover addressing unit 2 divides a residual packet into a plurality of packets having a data volume corresponding to the communication rate in a radio zone (division step) and transmits the plurality of divided packets, obtained by the division in the division step, to the handover addressed node 3 (division transmission step). Moreover, the handover addressed node 3 transmits a plurality of packets including mixedly the plurality of divided packets transmitted in the division transmission step and a plurality of new packets transmitted from the upper node 1 to the mobile unit 4 in the order of reception (order-of-arrival transmission step).

Thus, the handover addressing node 2 transmits a residual packet in a state distributed through the use of regular transmission or random-interval transmission, and the handover addressed node 3 transmits the packet, first received, to the mobile unit 4 irrespective of the new packet or the residual packet.

(4-1-4) Method for Data Transmission Between Handover Addressed Node 3 and Mobile Unit 4

(4-1-4-1) Transferring Method for Changing Radio Transmission Interval (Transmission Interval)

In this transferring method, the handover addressing node 2 changes the transmission interval in the middle of data (packet) transfer when transmitting the plurality of divided packets to the handover addressed node 3.

FIGS. 13(a) and 13(b) are illustrations for explaining a transferring method for changing the transmission interval according to the first embodiment of the present invention. The transmission interval T shown in FIG. 13(a) is a transmission interval to be taken when data (packet) is not transferred from the handover addressing node 2 to the handover addressed node 3, and the data transmission interval from the handover addressed node 3 to the mobile unit 4 is constant. On the other hand, in the middle of transfer, the handover addressed node 3 shown in FIG. 13(b) reduces a new packet and a transfer packet transmission interval to a time interval T' and transmits the packet to the mobile unit 4. In FIG. 13(b) and FIG. 14(b), "new" and "transfer" represent a new packet and a transfer packet, respectively.

The new packet transmission interval is determined by the upper node 1, and the handover addressed node 3 receives a notification on a transmission interval through a transport channel change request from the upper node 1. Moreover, the transfer packet transmission interval is determined by the upper node 1 in the case of HS-DSCH, and it is determined by the handover addressing node 2 in the case of DSCH. This is because, in the case of HS-DSCH, the upper node 1 is the RNC 2-0, 2-1 and carries out the call control on the base station 3-1, 3-2, and because, in the case of DSCH, the lower node is the RNC 2-0, 2-1 and carries out the call control on the exchange 1 forming an upper node.

This transferring method enables efficient transmission of both the transferred residual packet and new packet, which increases the communication rate. Moreover, since the data transmission interval which is a factor of determination of the communication rate is changed in this way, the communication rate is increasable.

Thus, the radio-transmittable information volume is increased or changed in accordance with an instruction from the upper node 1, which makes the capacity of the buffer 3*g* of the handover addressed node 3 constant and contributes to the optimization of the radio resource.

(4-1-4-2) The handover addressed node 3 can also increase the unit data to be transmitted to the mobile unit 4.

FIGS. 14 (*a*) and 14 (*b*) are illustrations for explaining a method of changing a unit data volume to be transmitted from the handover addressed node 3 to the mobile unit 4 according to the first embodiment of the present invention. A transmission volume "1" for new data transmission is set in the non-transferring case shown in FIG. 14(*a*), while a transmission volume "2" is set during the transferring as shown in FIG. 14 (*b*). That is, for making the transmission, the handover addressing node 2 changes the data volume (an increase from the transmission volume "1" to the transmission volume "2") in a unit transmission interval.

In other words, the difference from (4-1-4-1) is that, in the case of (4-1-4-1), the communication rate is increased by changing the transmission interval, whereas in the arbitration method shown in FIG. 14(*b*), the communication rate is increased by enhancing the data volume transmittable at once without changing the transmission interval. Moreover, a combination of the case of (4-1-4-1) and this pattern is feasible.

The handover addressed node 3 receives a notification on the transmission interval through a transport channel change request from the upper node 1. Moreover, the transfer packet transmission interval is determined by the upper node 1 in the case of HS-DSCH, while it is determined by the handover addressing node 2 in the case of DSCH.

This also enables the simultaneous transmission of a residual packet and a new packet, thereby enhancing the communication rate.

(4-1-5) Method of Adding Data Transferring Transport Channel

FIGS. 15(*a*) and 15(*b*) are illustrations for explaining a method of adding a data transferring transport channel according to the first embodiment of the present invention. FIG. 15(*a*) shows a flow of user data in the case of no transfer, and the handover addressing node 2 or the handover addressed node 3 transmits user data through a transport channel to the mobile unit 4.

FIG. 15(*b*) shows a case in the middle of the transfer, and the upper node 1 additionally sets a transport channel, which is for transferring a residual packet from the handover addressing node 2, in a transport channel for transmitting a new packet. An arbitration unit (MUX) 3*h* is for making the arbitration between transferred data from the handover addressing node 2 and new data from the upper node 1. The handover addressed node 3 determines the data to be transmitted through each transport channel, on the basis of an upper limit data rate in the case of a combination of the data rate in each transport channel and both the channels, a priority of each transport channel, or the like.

In the packet transferring/transmitting method according to the present invention, the upper node 1 secures the assignment of a separate transfer channel from a portion of a transfer channel between the handover addressed node 3 and the handover addressing node 2 on the basis of a packet volume in a radio zone (channel setting step).

As one example of channel assignment, as shown in FIG. 15(*b*), the transferred data transport channel and the new data transport channel are secured, and the transferred data and the new data are transferred/transmitted through these two transport channels to the handover addressed node 3. Moreover, the arbitration unit 3*h* of the handover addressed node 3 arbitrates the packets received through these two types of transport channels.

In addition, the handover addressed node 3 carries out the scheduling on packet transmission through the use of a partial separate transfer channel secured in the channel setting step and a new channel (scheduling step), and transmits a new packet and a residual packet to the mobile unit 4 on the basis of the scheduling in the scheduling step (scheduling transmission step).

The handover addressed node 3 adds a residual transfer transport channel in accordance with an instruction from the upper node 1, and carries out the scheduling to a transmission data volume, to be transmitted through radio means to the mobile unit 4, with respect to both the transfer transport channel and the normal transport channel for transmitting the transmitted packet to the mobile unit 4 according to the scheduling.

In addition, the arbitration unit 3*h* shown in FIG. 15(*b*) provides two types of arbitration methods according to priority of a packet and, in the two cases of a case in which the priority of the transfer data is higher than that priority of the new data and a case in which the priority of the transfer data and the priority of the new data are equal to each other, carries out the scheduling transmission or scheduling reception to transmit a packet to the mobile unit 4.

Incidentally, in the W-CDMA system 50, this scheduling is similar to the scheduling and priority control by TFCS (Transport Format Combination Set) in an MAC (Media Access Control) layer.

Moreover, the upper node 1 can also assign a new channel instead of assigning a transfer channel separately from a transfer channel.

(4-1-6) Method of Allocating or Adding ARQ Subchannel for Data Transfer

FIGS. 16(*a*) to 16(*d*) are illustrations for explaining a transferring method for changing a structure of a subchannel according to the first embodiment of the present invention. FIG. 16(*a*) and FIG. 16(*c*) (which is the same as FIG. 16(*a*)) shows a case in which data is not in the middle of transfer, and FIG. 16(*b*) and FIG. 16(*d*) show a case in which data is in the middle of transfer.

In these FIGS. 16(*a*) to 16(*d*), the handover addressed node 3 changes a frame format in a radio zone between it and the mobile unit 4.

The time for all of a subchannel 1 (Sub CH-1) to a subchannel n (Sub CH-n) shown in FIGS. 16(*a*) and 16(*b*) corresponds to a waiting time to be taken from data transmission to arrival confirmation and is a time until the reception of ACK after packet transmission in a node which has transmitted a packet. In the illustrations, n represents a natural number. The subchannel n in the waiting time shown in FIG. 16(*b*) is assigned for transmitted data transmission.

In a regeneration method for an HS-DSCH channel or the like in the W-CDMA system 50, for simplifying are transmission protocol, a packet transmission side does not transmit the following data until receiving an arrival confirmation (ACK) from a receiving node. This regeneration method is such that the upper node 1 divides the aforesaid waiting time into a plurality of subchannels and transmits them separately and concurrently.

The subchannel n+1 of the waiting time shown in FIG. 16(*d*) is assigned for transfer data and the subchannel n thereof is assigned for new data, but it is different from the waiting time shown in FIG. 16(*b*). For example, the data transmitted through the subchannel 1 arrives at the mobile unit 4 and this data undergoes the ARQ processing in the mobile unit 4. Therefore, a base station receives ACK from the mobile unit 4 at a time after the subchannel n.

For this reason, in the packet transmitting/transferring method according to the present invention, the time from when a base station transmits the subchannel 1 until receiving the corresponding ACK is divided into the subchannel 2 to the subchannel n as shown in FIG. 16(d).

Accordingly, in the case of the use of a plurality of subchannels, the handover addressed node 3 assigns a portion of subchannels for only transfer data from the handover addressing node 2 or adds a subchannel, thereby transmitting a new packet and transfer data concurrently.

Thus, a retransmission considering type frame format to be radio-transmitted is changed according to an instruction from the upper node 1, which can make the capacity of the buffer 3g of the handover addressed node 3 constant and contribute to the optimization of the radio resource.

(5) Description of Example of Operational Sequence of Pattern B

Figure 17:
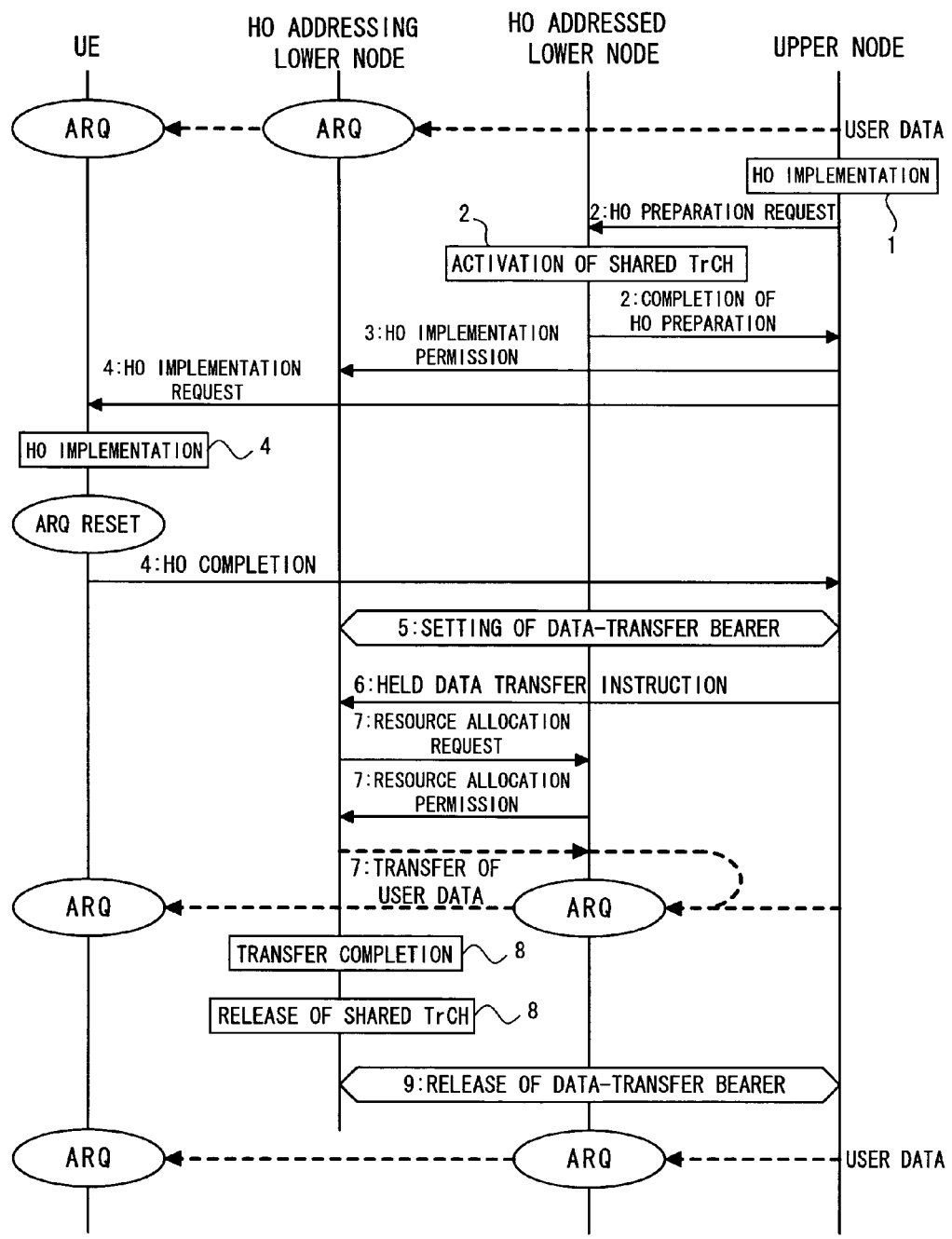
FIG. 17 shows an example of a sequence for explaining a transferring method based on resource allocation request according to the first embodiment of the present invention.
Figure 18:
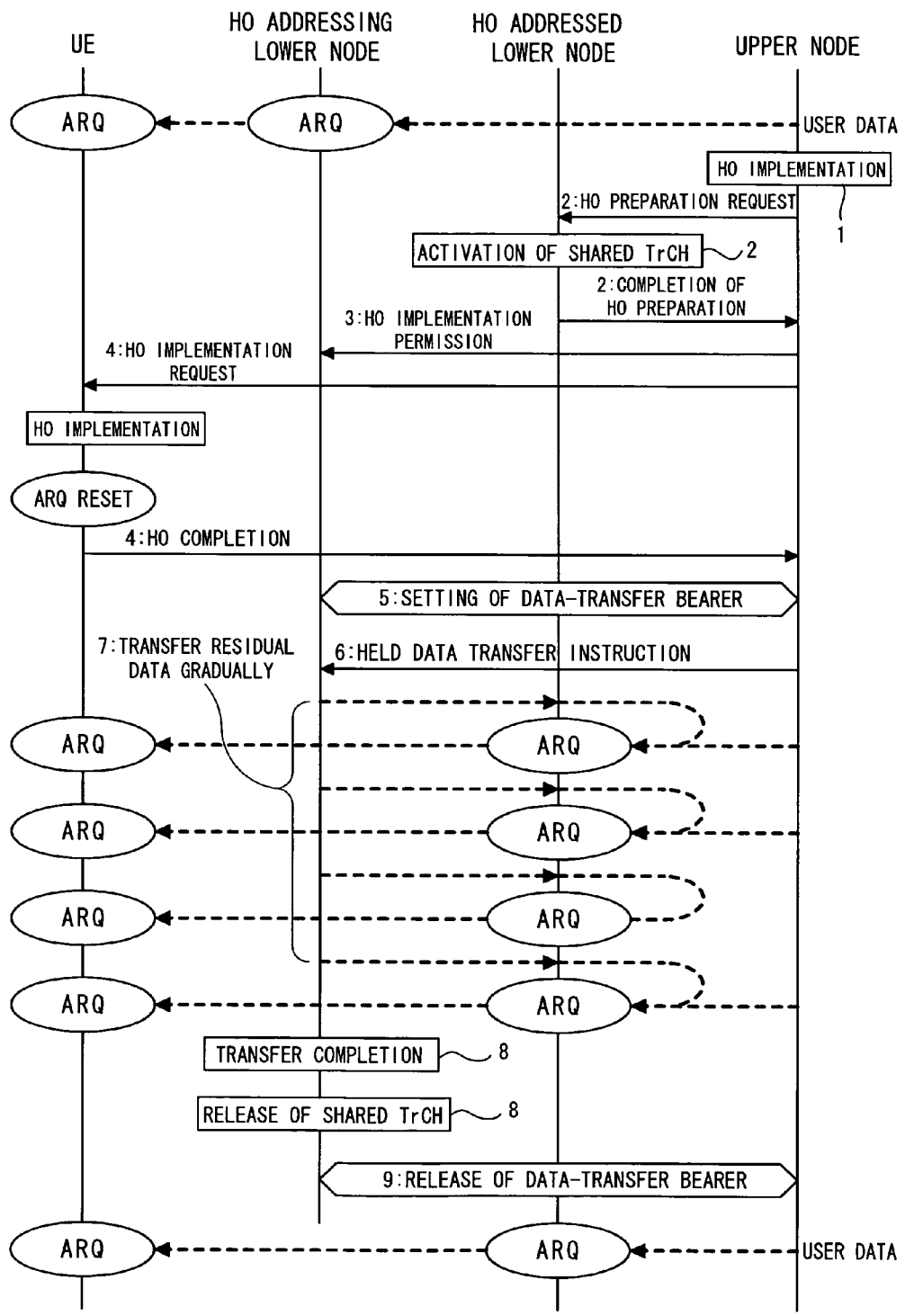
FIG. 18 shows an example of a sequence for explaining a transferring method based on distribution transfer according to the first embodiment of the present invention.
Figure 19:
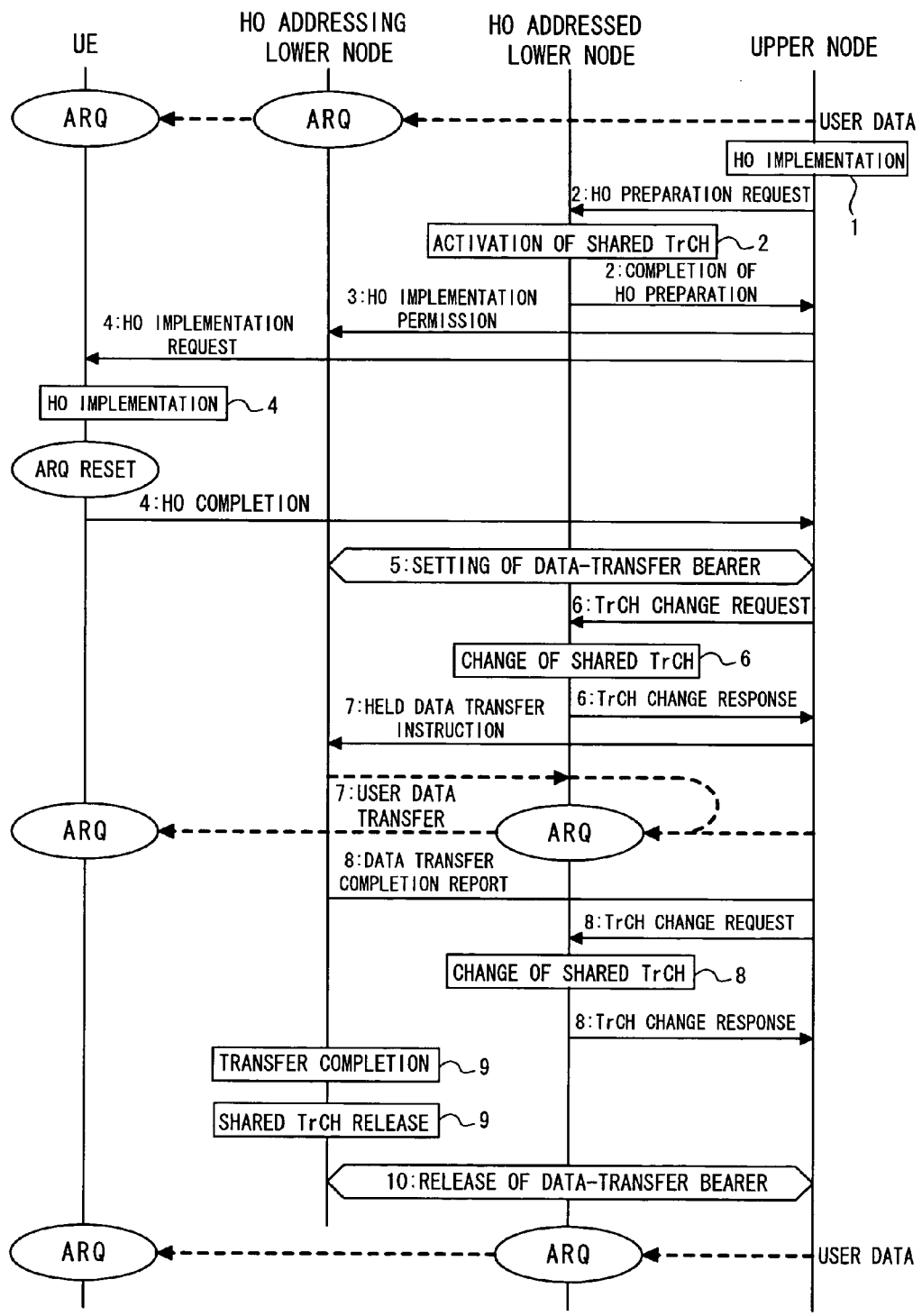
FIG. 19 shows an example of a sequence for explaining a method of changing a transmission interval/information volume, adding a transport channel and changing a structure of a subchannel according to the first embodiment of the present invention.

In this configuration, referring to FIGS. 17 to 19, a description will be given hereinbelow of an example of a sequence for a transfer packet transmitting/transmitting method in which a new packet is transmitted even during the transfer of a residual packet and the encapsulation is not conducted. In FIGS. 17 to 19, the names which are the same as the names used above have the same or similar functions, and the description will be omitted for avoiding repeating.

(5-1) Transferring Method Based on Resource Allocation Request

FIG. 17 shows an example of a sequence for explaining a transferring method based on a resource allocation request according to the first embodiment of the present invention, and (5-1-1) to (5-1-9) correspond to the reference numerals 1 to 9 in FIG. 17, respectively.

(5-1-1) The mobile unit 4 starts the handover due to the degradation of quality of a signal received. The handover occurs according to a decision in the upper node 1 made on the basis of a request from the mobile unit 4 or a radio situation report from the mobile unit 4. In this case, the upper node 1 determines the handover implementation (HO implementation), and for starting the handover, the mobile unit 4 transmits a handover preparation request to the handover addressed node 3.

(5-1-2) The upper node 1 makes a request to the handover addressed node 3 for the securement of a resource accommodating the mobile unit 4 which carries out the handover. Concretely, upon receipt of this request, in the case of a first message transmission/reception between the upper node 1 and the handover addressed node 3, the handover addressed node 3 newly activates a shared channel and activates a shared transport channel for the preparation of the handover and further transmits a handover preparation completion to the upper node 1. If there is a channel already activated, it adds a user.

As this handover preparation, the handover addressed node 3 is made to secure, as a resource, a shared channel for accommodating the mobile unit 4 which carries out the handover.

In addition, when receiving this completion, the upper node 1 notifies a handover implementation permission to the handover addressing node 2 and transmits a handover implementation request to the mobile unit 4.

(5-1-3) The upper node 1 permits the handover addressing node 2 to implement the handover.

(5-1-4) The upper node 1 transmits a handover instruction (handover implementation request) to the mobile unit 4. The mobile unit 4 secures the handover addressed node 3 and a communication channel in accordance with this instruction.

(5-1-5) A bearer channel is set to transfer the data, left in the handover addressing node 2, to the handover addressed node 3. This bearer channel can be set to make a direct connection between the handover addressing node 2 and the handover addressed node 3 or it can also be set to pass through the upper node 1.

(5-1-6) Moreover, the handover addressing node 2 transmits, to the handover addressed node 3, a request for allocation of a resource needed for the transmission of a residual packet. Upon receipt of this request, the handover addressed node 3 secures a resource corresponding to the request and notifies the resource securement to the handover addressing node 2.

(5-1-7) When receiving this resource securement notification, the handover addressing node 2 starts to transfer the residual packet. The handover addressed node 3 transmits the transmitted residual packet and a new packet to the mobile unit 4 according to the assigned resource.

(5-1-8) When the transfer of the residual packet reaches completion, the handover addressing node 2 releases the resource secured by the mobile unit 4 which has carried out the handover.

(5-1-9) The upper node 1 releases the bearer channel set for the residual packet transfer.

Thus, the data residual is avoidable even in the case of the employment of the variable communication rate and an increase in retransmission is preventable.

(5-2) Arbitration Method Based on Distribution Transfer

FIG. 18 shows an example of a sequence for explaining a transferring method based on distribution transfer according to the first embodiment of the present invention, and (5-2-1) to (5-2-9) correspond to the reference numerals 1 to 9 in FIG. 18.

(5-2-1) The handover starts in response to the degradation of quality of a signal the mobile unit 4 receives. The handover is conducted according to a decision in the upper node 1 made on the basis of a request from the mobile unit 4 or a radio situation report from the mobile unit 4.

(5-2-2) The upper node 1 makes a request to the handover addressed node 3 for securing a resource accommodating the mobile unit 4 which carries out the handover. In accordance with this request, the handover addressed node 3 secures the resource. In the case of a first message transmission/reception between the upper node 1 and the handover addressed node 3, the handover addressed node 3 newly activates a shared channel and activates a shared transport channel for the preparation of the handover and further transmits a handover preparation completion to the upper node 1. If there is a channel already activated, it adds a user.

(5-2-3) The upper node 1 permits the handover addressing node 2 to implement the handover.

(5-2-4) The upper node 1 transmits a handover instruction to the mobile unit 4. The mobile unit 4 secures the handover addressed node 3 and a communication channel in accordance with this instruction.

(5-2-5) A bearer channel is set to transfer the data, left in the handover addressing node 2, to the handover addressed node 3. This bearer channel can be set to make a direct connection between the handover addressing node 2 and the handover addressed node 3 or it can also be set to pass through the upper node 1.

(5-2-6) The upper node 1 makes a request for the transfer of a residual packet to the handover addressing node 2.

(5-2-7) The handover addressing node 2 distributively transfers a residual packet by a small volume to the handover addressed node 3. The handover addressed node 3 transmits the transferred residual packet and a new packet to the mobile unit 4 in the order of arrival.

(5-2-8) When the transfer of the residual packet reaches completion, the handover addressing node 2 releases the resource secured by the mobile unit 4 which has carried out the handover.

(5-2-9) The upper node 1 releases the bearer channel set for the residual packet transfer.

Thus, the residual packet is transferred in the intervals of the transmission of a new packet, which enables efficient transfer.

(5-3) Change of Transmission Interval/Information Volume, Addition of Transport Channel and Change of Subchannel Structure FIG. 19 shows an example of a sequence for explaining a method for a change of transmission interval/information volume, an addition of transport channel and a change of subchannel structure according to the first embodiment of the present invention, and (5-3-1) to (5-3-10) correspond to the reference numerals 1 to 10 in FIG. 19, respectively.

(5-3-1) The handover starts in response to the degradation of quality of a signal the mobile unit 4 receives. The handover is conducted according to a decision in the upper node 1 made on the basis of a request from the mobile unit 4 or a radio situation report from the mobile unit 4.

(5-3-2) The upper node 1 makes a request to the handover addressed node 3 for securing a resource accommodating the mobile unit 4 which carries out the handover. In accordance with this request, the handover addressed node 3 secures the resource. In the case of a first message transmission/reception between the upper node 1 and the handover addressed node 3, the handover addressed node 3 newly activates a shared channel and activates a shared transport channel for the preparation of the handover and further transmits a handover preparation completion to the upper node 1. If there is a channel already activated, it adds a user.

(5-3-3) The upper node 1 permits the handover addressing node 2 to implement the handover.

(5-3-4) The upper node 1 transmits a handover instruction to the mobile unit 4. The mobile unit 4 secures the handover addressed node 3 and a communication channel in accordance with this instruction.

(5-3-5) A bearer channel is set to transfer the data, left in the handover addressing node 2, to the handover addressed node 3. This bearer channel can be set to make a direct connection between the handover addressing node 2 and the handover addressed node 3 or it can also be set to pass through the upper node 1.

(5-3-6) After the setting of the bearer channel for transfer, the upper node 1 makes a request to the handover addressed node 3 for a change of a transport channel such as an addition of a transfer transport channel, a change of transport channel transmission interval or an increase in transport channel transmission information volume so as to enable concurrent transmission of transfer data and new packet. The handover addressed node 3 changes the transport channel in accordance with the request from the upper node 1.

(5-3-7) The upper node 1 makes a request to the handover addressing node 2 for transferring a residual packet. Upon receipt of the request, the handover addressing node 2 starts to transmit the residual packet to the handover addressed node 3.

(5-3-8) After the completion of transfer of the residual packet, the handover addressing node 2 notifies the transfer completion to the upper node 1. Upon receipt of the transfer completion notification, the upper node 1 again transmits a transport channel change request to the handover addressed node 3 to return the transport channel, added or changed before the transfer, to the initial state before the change. The handover addressed node 3 returns the transport channel setting to the state before the handover in accordance with the request from the upper node 1.

(5-3-9) When the transfer of the residual packet reaches completion, the handover addressing node 2 releases the resource secured by the mobile unit 4 which has carried out the handover.

(5-3-10) The upper node 1 releases the bearer channel set for the residual packet transfer.

This enables maintaining the number of users to be accommodated while securing the wide bandwidth, sharing a line with high efficiency at the soft handover, avoiding the data residual even in the case of the employment of variable communication rate, and preventing an increase in retransmission.

(B) Description of Second Embodiment of the Present Invention

Because of the use of wire transmission line when the handover addressing node 2 transmits a residual packet(s) to the handover addressed node 3, a signal loss or signal error seldom occurs. For this reason, in the pattern A and the pattern B, a residual packet is transferred in a state where an overhead for assuring the integrity of data communication in a retransmission protocol or the like is not affixed thereto.

On the other hand, in the pattern C and the pattern D which will be described in the second embodiment, when a residual packet is transferred from the handover addressing node 2 to the handover addressed node 3, an overhead is affixed thereto and encapsulated. This assures the integrity of data communication from the handover addressing node 2 to the handover addressed node 3 and assures the integrity of data communication from the handover addressing node 2 to the mobile unit 4.

A W-CDMA system according to the second embodiment is the same as the W-CDMA system 50.

(6) Description of Encapsulation of Transfer Data According to the Second Embodiment An object of the encapsulation is a residual packet frame to be transmitted from the handover addressing node 2 when the handover addressing node 2 transmits buffered data to the handover addressed node 3. Employed is a method (tunneling method) in which the handover addressing node 2 does not carry out the disassembling and assembling on a frame header of a residual packet while the handover addressed node 3 encapsulates the residual packet on the basis of an instruction from the upper node 1 or identification information included in the received residual packet. Moreover, when all the residual packets buffered in the handover addressing node 2 are transmitted to the mobile unit 4 and the residual packet to be transmitted to the mobile unit 4 disappears, the handover addressed node 23 terminates the encapsulation processing.

This encapsulation assures the integrity of data communication and enables high-speed processing.

For the encapsulation, the retransmission protocol used when the handover addressing node 2 has made the transmission/reception with respect to the mobile unit 4 before the handover is made to be used at the data transfer among the handover addressing node 2, the handover addressed node 3 and the mobile unit 4.

The retransmission protocol used at the transmission/reception between the handover addressed node 3 and the mobile unit 4 also exists in the data communication between the handover addressed node 3 and the mobile unit 4. Therefore, two types of protocol headers of a protocol header to be affixed in the handover addressing node 2 and a protocol header to be affixed in the handover addressed node 3 are affixed to the same transfer data.

(7) About Method of Affixing Two types of Headers

Methods for the transmission to the mobile unit 4 in a state where two types of headers are affixed to transfer data are roughly classified into two types of methods (M1) and (M2).

(M1) A protocol header of the handover addressing node 2 and user data transferred are encapsulated as one, and a protocol header of the handover addressed node 3 is further affixed to this encapsulated data.

(M2) When receiving the transfer data, the handover addressed node 3 removes the protocol header affixed in the handover addressing node 2 and reaffixes a protocol header, given by the handover addressed node 3, to the transfer data.

A detailed description will be given of the above-mentioned two types of methods, and a description will be given of a sequence of a control signal and user data with respect to each node.

(7-1) Mode of Encapsulation

FIGS. 20(*a*), 20(*b*) to 24 are illustrations for explaining a packet transferring method according to the second embodiment of the present invention. In these illustrations, the parts which are the same as those mentioned above have the same or similar functions. In FIG. 20, ARQ-H represents an ARQ header and, in the case of HS-DSCH, ARQ-H signifies a "header" of "H-ARQ".

When the mobile unit 4 shown in FIG. 20(*a*) starts the handover, the handover addressing node 2 detects the degradation of quality. The handover addressed node 3 affixes a header for H-ARQ (expressed as ARQ-H) to user data from the upper node 1 with this detection as a turning-point (see FIG. 20(*b*)). Moreover, the upper node 1 detects the degradation of quality and notifies the turning-point of the header affixation to the handover addressing node 2.

Figure 21:
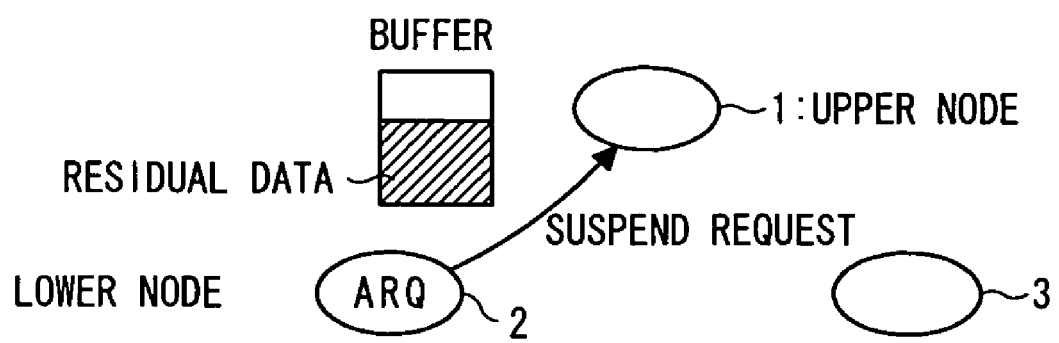
FIG. 21 is an illustration for explaining a second packet transferring method according to the second embodiment of the present invention.

Furthermore, the handover addressing node 2 shown in FIG. 21 transmits a suspend request to the upper node 1 to suspend a new packet transmission for the residual packet transfer.

Figure 22B:
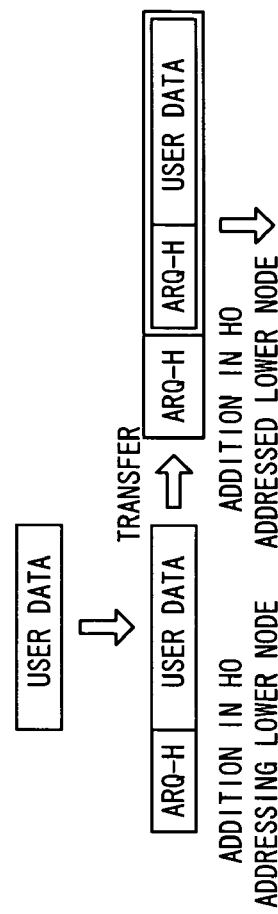
FIGS. 22($a$) and 22($b$) are illustrations for explaining a third packet transferring method according to the second embodiment of the present invention.
Figure 22A:
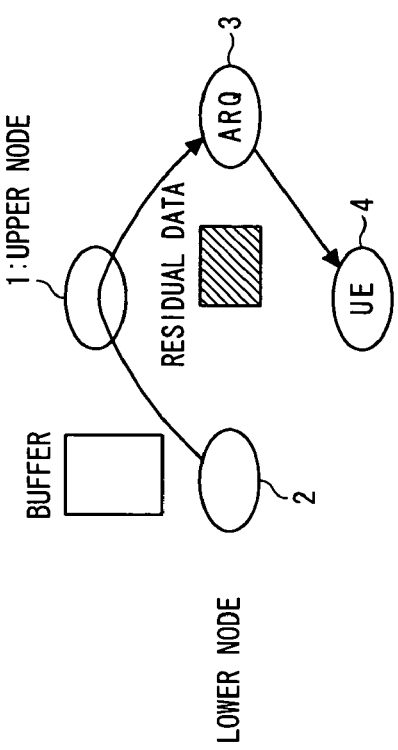

The handover addressing node 2 shown in FIG. 22(*a*) transfers a residual packet through the upper node 1 to the handover addressed node 3, and the handover addressed node 3 transmits this residual packet to the mobile unit 4. At this time, the handover addressed node 3 further affixes a header for H-ARQ to a packet with a header from the handover addressing node 2 (see FIG. 22(*b*)).

Figure 23:
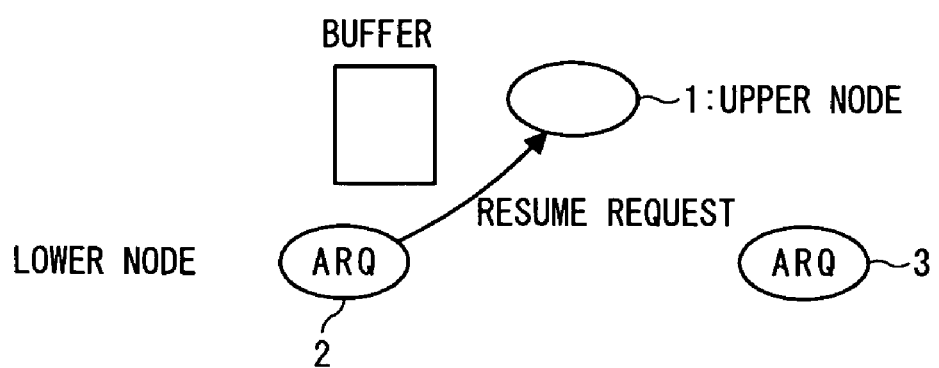
FIG. 23 is an illustration for explaining a fourth packet transferring method according to the second embodiment of the present invention.

After the completion of the residual packet transfer, the handover addressing node 2 shown in FIG. 23 transmits a resume request to the upper node 1 for resuming new packet transmission.

Figure 24B:
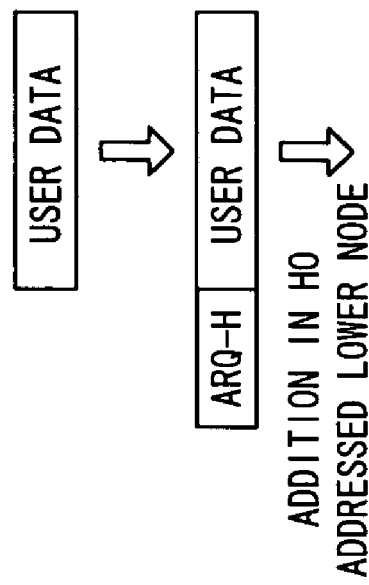
FIGS. 24($a$) and 24($b$) are illustrations for explaining a fifth packet transferring method according to the second embodiment of the present invention.
Figure 24A:
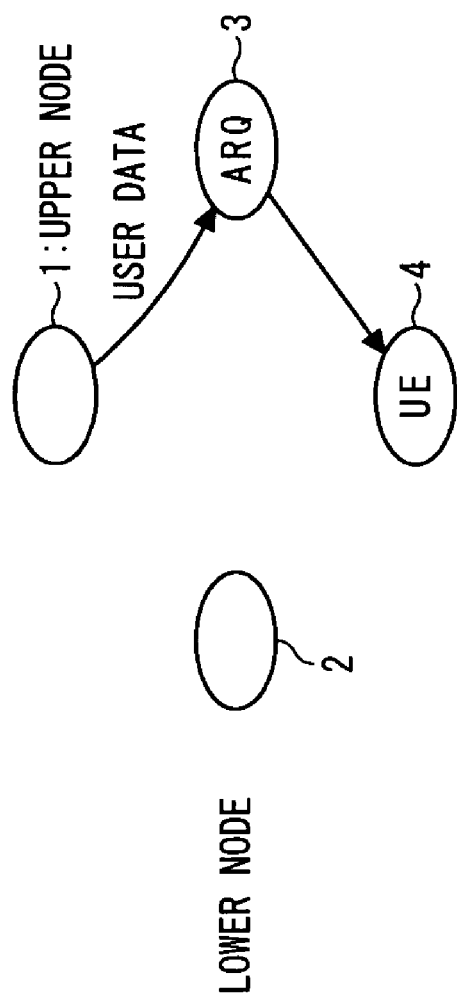

In addition, the upper node 1 shown in FIG. 24(*a*) transmits a new packet to the handover addressed node 3, and the handover addressed node 3 transmits the new packet to the mobile unit 4. At this time, the handover addressed node 3 affixes a header for H-ARQ to the new packet (see FIG. 24 (*b*)).

Therefore, for the transfer/transmission, the handover addressing node 2 encapsulates the residual packet according to an instruction from the upper node 1 or the discrimination of the received frame (first encapsulation), and the handover node 3 encapsulates the residual packet (second encapsulation) and transmits the residual packet to the mobile unit 4.

Thus, the protocol header of the handover addressing node 2 and the transferred user data are encapsulated into one and, in the handover addressed 3, the protocol header of the handover addressed node 3 is separately affixed to this encapsulated data.

In the following description, the affixation of the protocol header, given in the handover addressing node 2, to the protocol header given in the handover addressed node 3 is referred to as "share-ride".

(7-2) Description of Share-Ride

In the case of the implementation of the share-ride, for the transfer/transmission, discrimination information (information element) for the discrimination between an encapsulated packet and a normal packet is inserted into a frame to be transmitted from the handover addressed node 3 to the mobile unit 4. That is, the discrimination information is inserted into the packet so that the ARQ of the mobile unit 4 can normally monitor two types of ARQs. As this insertion method, the following four patterns are employable.

(7-2-1) A pattern in which an area for indicating the share-ride is provided in a packet and transfer data and a new packet are identical in header and data length to each other.

FIGS. 25 (*a*) and 25 (*b*) are illustrations for explaining a first frame format according to the second embodiment of the present invention. The frame shown in FIG. 25(*a*) is made in a manner such that the handover addressed node 3 encapsulates transfer data from the handover addressing node 2 and has three types of areas of a header given by the hand-over addressed node 3, a header given by the handover addressing node 2 and user data. The header given by the handover addressed node 3 includes a sequence number (SN) indicative of an identification number affixed to each data or each radio frame and identification information indicative of whether the share-ride is implemented or not (whether a protocol header is again affixed next).

The frame shown in FIG. 25(*b*) is made by encapsulating new data from the upper node 1. Although the share-ride is not implemented with respect to this new packet, the handover addressed node 3 affixes, as a normal non-used area, an area having a size needed for the insertion of the protocol header of the handover addressing node 2 to the new packet so that a data length of the new packet including a header portion and a data portion becomes equal to a data length of a transfer packet.

Therefore, for the transfer/transmission, a header area for a residual packet is always secured in a frame to be transmitted from the handover addressed node 3 to the mobile unit 4. This eliminates the need for the mobile unit 4 to make the discrimination between the encapsulated data and the normal non-encapsulated information.

In addition, the handover addressed node 3 can also transmit a retransmission request due to conversion and a retransmission protocol or a response signal such as reception completion to the handover addressing node 2 by storing the handover addressing node 2 which has transmitted a sequence number.

Still additionally, the mobile unit 4 recognizes the presence or absence of a next header on the basis of this discrimination information and, if the next header exists (receiving an indication on the affixation of the next header), reads out the next protocol header to acquire the share-ride protocol information. On the other hand, if there is no next header (no indication on the affixation of the next header), the mobile unit 4 handles the area for the next protocol header as an invalid area, and it does not the contents thereof.

Thus, the handover addressed node 3 can recognize the presence or absence of the next header as a portion of a protocol header. Moreover, the transfer data and the new packet are set at the same header and data length and, hence, the header recognition processing procedure is simplified in the mobile unit 4.

(7-2-2) A pattern in which there is an area for indication on share-ride and transfer data and a new packet are different in header length from each other.

FIGS. 26(*a*) and 26(*b*) are illustrations for explaining a second frame format according to the second embodiment of the present invention. The frame shown in FIG. 26(*a*) is a frame which is transferred from a handover addressing node and to which an ARQ header is affixed by the handover addressed node 3. The ARQ header affixed in the handover addressed node 3 has an area indicative of the presence of a next header area. Accordingly, the handover addressed node 3 puts, in a portion of the header, identification information indicative of whether or not the share-ride is conducted as a portion of the protocol header, that is, whether the protocol header is reaffixed next. This achieves the share-ride of the protocol header affixed in the handover addressing node 2 on the protocol header affixed in the handover addressed node 3.

On the other hand, since the protocol header of the handover addressing node 2 is not affixed to a new packet (see FIG. 26(*b*)) which is not involved in the share-ride, the data length of the transfer data and the data length of the new packet are different from each other. Therefore, each of the transmission side handover addressed node 3 and the reception side mobile unit 4 is equipped with two or more types of means (not shown) for identifying the data length.

(7-2-3) A pattern in which there is an area for indicating the share-ride and the transfer data and the new packet are different in data length and header length from each other.

FIGS. 27 (*a*) and 27 (*b*) are illustrations for explaining a third frame format according to the second embodiment of the present invention. The handover addressed node 3 places, as a portion of the protocol header shown in FIG. 27(*a*), identification information indicative of whether or not the share-ride is conducted, that is, whether the protocol header is reaffixed next.

Moreover, since the protocol header of the handover addressing node 2 is not affixed to a new packet (see FIG. 27 (*b*)) which is not involved in the share-ride, the handover addressed node 3 changes the length of the data portion to compensate for the difference in header length and combines both the data portion and the header portion so that the transmission data length becomes equal to that of the transfer data. Therefore, when the identification information indicates the affixation of the next header, the reception side mobile unit 4 again reads out the protocol header to acquire the information on the share-ride protocol. Moreover, if there is no indication thereon, the mobile unit 4 conducts the processing as the user data still continues.

(7-2-4) Header Compression

FIGS. 28 (*a*) and 28 (*b*) are illustrations for explaining a fourth frame format according to the second embodiment of the present invention. In the frame shown in FIG. 28(*a*), identification information indicative of the "existence of header compression" is affixed, and transfer data and a new packet are set to be equal in header length to each other and set to be equal in data length to each other. Each of the handover addressing node 2 and the handover addressed node 3 compresses the protocol header to shorten the header length and compensates for an increase in transmission data length due to the share-ride of the protocol header so that the transmission data length becomes equal to that of the new packet.

Therefore, through the identification information included as a portion of the protocol header, the mobile unit 4 can recognize whether the header compression is conducted or not. When the identification information indicates the header compression, the mobile unit 4 separates the read protocol header into the share-riding protocol header and the share-ridden protocol header.

On the other hand, for example, like the frame as shown in FIG. 28(*b*), if there is no indication on the share-ride, the mobile unit 4 reads the header and the data intact.

(7-3) Description of Operation When Encapsulated

The residual data encapsulated is transferred with this arrangement.

Figure 29:
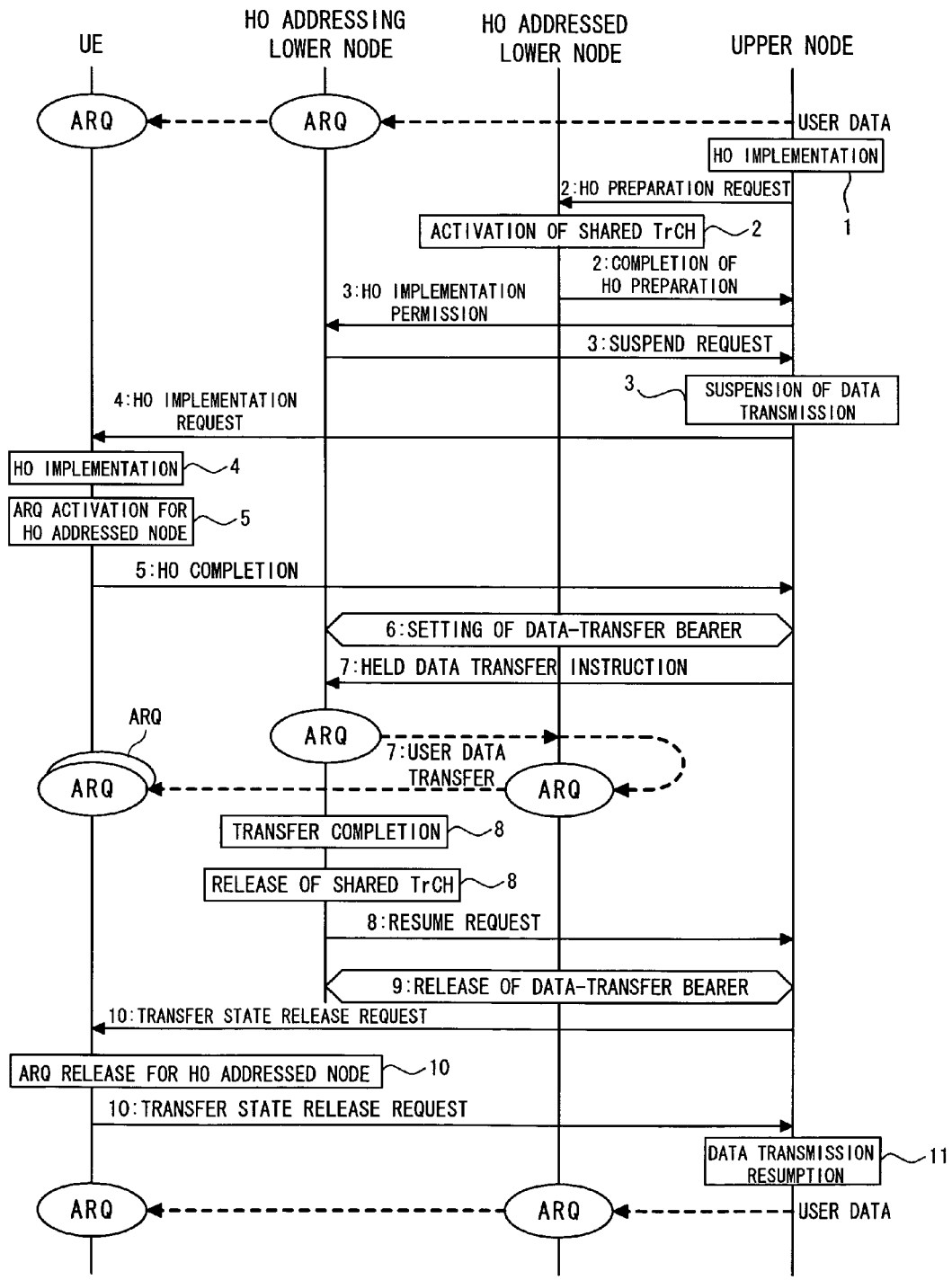
FIG. 29 shows an example of a sequence for explaining a residual packet transferring method based on encapsulation according to the second embodiment of the present invention.

FIG. 29 shows an example of a sequence for explaining a residual packet transferring method based on encapsulation according to the second embodiment of the present invention. In FIG. 29, "ARQ" expressed in each of the mobile unit (UE) 4, a handover addressing node and a handover addressed node denotes an ARQ control unit 4*d* (see FIG. 5), an ARQ control unit 2*d* (see FIG. 3) and an ARQ control unit 3*d* (see FIG. 4), and this also applies to the other drawings. The parts other than theses have the same or similar functions as or to those of the above-mentioned parts. Moreover, (7-3-1) to (7-3-11) correspond to the reference numerals 1 to 11 in FIG. 29.

(7-3-1) The handover starts in response to the degradation of quality of a signal the mobile unit 4 receives. The handover is conducted according to a decision in the upper node 1 made on the basis of a request from the mobile unit 4 or a radio situation report from the mobile unit 4.

(7-3-2) The upper node 1 makes a request to the handover addressed node 3 for securing a resource accommodating the mobile unit 4 which carries out the handover. In accordance with this request, the handover addressed node 3 secures the resource. In the case of a first message transmission/reception between the upper node 1 and the handover addressed node 3, the handover addressed node 3 newly activates a shared channel. If there is a channel already activated, the handover addressed node 3 adds a user.

(7-3-3) The upper node 1 permits the handover addressing node 2 to implement the handover. Upon receipt of the permission, the handover addressing node 2 transmits a suspend request to the upper node 1 for suspending the new packet transmission. Incidentally, in this sequence, in place of a suspend request being transmitted from the handover addressing node 2, it is also appropriate that the upper node 1 itself suspends the new packet transmission.

(7-3-4) The upper node 1 transmits a handover instruction to the mobile unit 4. The mobile unit 4 secures the handover addressed node 3 and a communication channel in accordance with this instruction.

(7-3-5) In this handover, the mobile unit 4 activates, in addition to a retransmission protocol entity activated for the handover addressing node 2 (provided in opposed relation to the handover addressing node 2), a retransmission protocol entity for the handover addressed node 3.

(7-3-6) A bearer channel for transfer is set between the handover addressing node 2 and the upper node 1, and a path is set to transfer the data, left in the handover addressing node 2, to the handover addressed node 3 by the upper node 1. This bearer channel can also be set to make a direct connection between the handover addressing node 2 and the handover addressed node 3.

(7-3-7) The upper node 1 makes a request for the transfer of a residual packet to the handover addressing node 2. The handover addressing node 2 transfers the residual packet to the handover addressed node 3 through the bearer channel set in (7-3-6).

The handover addressed node 3 receives the residual packet from the handover addressing node 2 and transmits it to the mobile unit 4. At this time, continuing before the handover, the handover addressing node 2 affixes the protocol header to the transfer data and transfers it. The handover addressed node 3 conducts the share-ride of its own protocol header on this transfer data and transfers it to the mobile unit 4.

(7-3-8) When the transfer of the residual packet reaches completion, the handover addressing node 2 releases the resource secured by the mobile unit 4 which has carried out the handover and outputs a resume request to the upper node 1 for making a request for the resumption of transmission of the new packet. Incidentally, in the sequence, although the handover addressing node 2 outputs the resume request, it is also appropriate that the upper node 1 itself conducts it.

(7-3-9) When receiving the resume request, the upper node 1 releases the bearer channel set for the residual packet transfer.

(7-3-10) The upper node 1 gives an instruction to the mobile unit 4 for releasing the retransmission protocol entity on the handover addressing node 2. The mobile unit 4 releases the retransmission entity on the handover addressing node 2 in accordance with this instruction.

(7-3-11) The transmission of a new packet is resumed.

Thus, the protocol header of the handover addressing node 2 and the transferred data are encapsulated and the protocol header of the handover addressed node 3 is affixed to this encapsulated data.

This enables assuring the integrity of data communication from the handover addressing node 2 to the handover addressed node 3 and further assuring the integrity of data communication from the handover addressing node 2 to the mobile unit 4.

(7-4) About Method of Re-Affixing Protocol Header

Upon receipt of transfer data, the handover addressed node 3 removes the protocol header affixed in the handover addressing node 2 and newly affixes a protocol header thereto. In the (M1) method, the protocol headers affixed by the handover addressing node 2 and the handover addressed node 3 are used, while in the (M2) method, the protocol header is reaffixed without affixing the two types of protocol headers. This retransmission control can employ the following two patterns, which enables the retransmission control similar to (M1).

(7-4-1) A method of setting an association table between a header affixed in the handover addressing node 2 and a header affixed in the handover addressed node 3.

Figure 30:
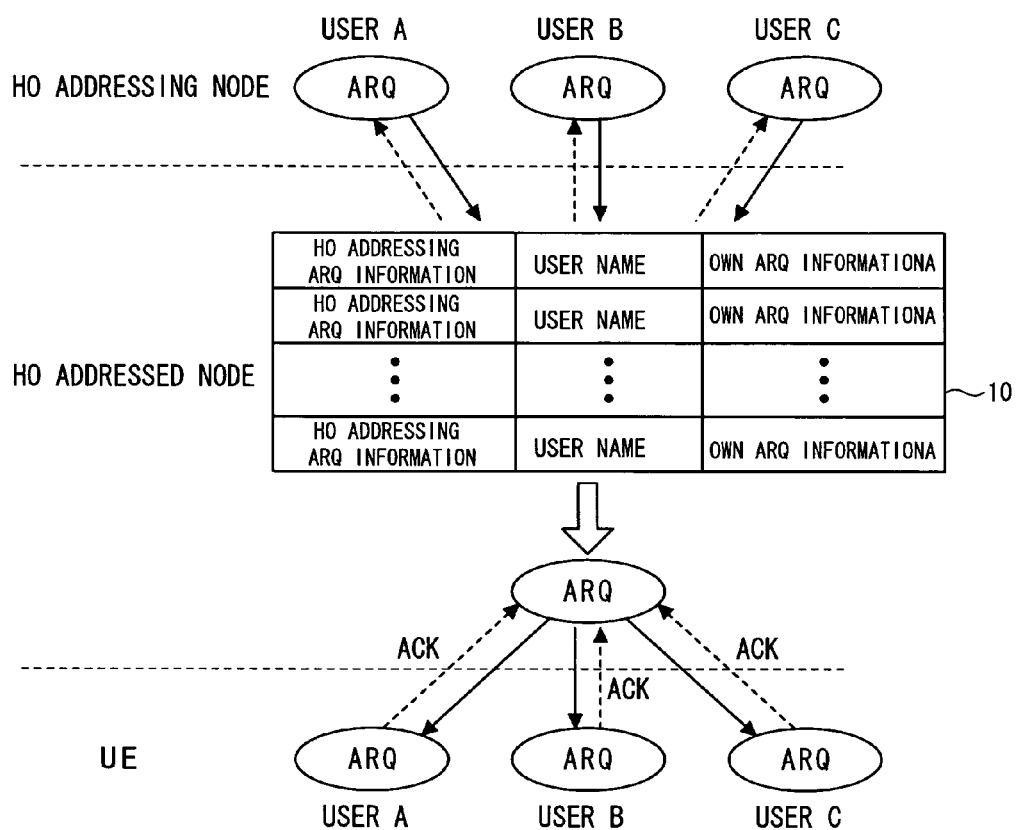
FIG. 30 is an illustration for explaining a method of giving header information to transfer data through the use of an association table according to the second embodiment of the present invention.

FIG. 30 is an illustration for explaining a method of affixing header information to transfer data through the use of an association table according to the second embodiment of the present invention. The handover addressed node 3 shown in FIG. 30 has an association table between a header affixed in the handover addressing node 2 and a header affixed in the handover addressed node 3. For example, with respect to of a user A of the handover addressing node 2, ARQ information in the handover addressing node 2, a user name and ARQ information (its own ARQ information) in the handover addressed node 3 are associated with each other and recorded in the association table 10. In this case, the ARQ information in the handover addressing node 2 signifies, for example, SNR (Signal Noise Ratio) information given in the handover addressing node 2 and included in the protocol header, or the like. Moreover, the ARQ information in the handover addressed node 3 signifies protocol header information given in the handover addressed node 3, or the like.

When these information are recorded in the association table 10 in a state associated with each other, the change in affixation from the protocol header of the handover addressing node 2 to the protocol header of the handover addressed node 3 becomes feasible. Thus, with respect to the packet to be transmitted from the handover addressed node 3 to the mobile unit 4, the retransmission protocol can be managed through the use of one type of protocol header.

In FIG. 30, the parts marked with the same reference numerals as those used above have the same or similar functions, and the repeated description thereof will be omitted.

In this case, since the handover addressed node 3 receives new packets from a plurality of users or packets are transferred thereto from a plurality of handover addressing nodes 2, the association table 10 records information (for example, user identification information, line identification information, or the like) for identifying entities in the handover addressing nodes 2, thus identifying a plurality of users and a plurality of handover addressing nodes 2.

As the processing in the handover addressed node 3, in a processing method in the case of the data transmission in the direction from the handover addressing node 2 through the handover addressed node 3 to the mobile unit 4, the handover addressed node 3 records a user name of data received from the handover addressing node 2 and the ARQ information thereon. Subsequently, the line terminating unit 2*b* (see FIG. 3) of the handover addressed node 3 transmits the data excluding the ARQ header to the ARQ control unit 3*d* (see FIG. 3). Moreover, the own ARQ information assigned by the ARQ control unit 3*d* and the recorded ARQ information of the handover addressing node 2 are paired and written in the association table 10.

On the other hand, in the case of the directions from the mobile unit 4 through the handover addressed node 3 to the handover addressing node 2, the receiving unit 2*a* (see FIG. 3) of the handover addressed node 3 receives ACK from the mobile unit 4 to the ARQ control unit 3*d* of the hand-over addressed node 3. Subsequently, it retrieves the handover addressed node 3 (ARQ information), included in the ACK, from the association table 10 to extract the user name of the handover addressing node 2 and the ARQ information of the handover addressing node 2. Moreover, it transmits the ACK, produced on the basis of the ARQ information of the handover addressing node 2 extracted, to the extracted user (handover addressing node 2).

In addition, the handover addressed node 3 makes a comparison between its own entity information found on the basis of the acknowledge (ACK) and the non-acknowledge (NACK), received from the mobile unit 4, and the association table 10 and, through this comparison, the handover addressed node 3 identifies the handover addressing node 2 which has transferred that data, and converts the ACK/NACK information for transmitting the converted ACK/NACK information to the handover addressing node 2.

Thus, for the transfer/transmission, the handover addressed node 3 carries out the transmission/reception on a frame with respect to the mobile unit 4 on the basis of the association table 10, i.e., the header affixed in the handover addressing node 2 and the header affixed in the handover addressed node 3.

(7-4-2) A method of terminating a header, affixed in the handover addressing node 2, in the handover addressed node 3.

Figure 31:
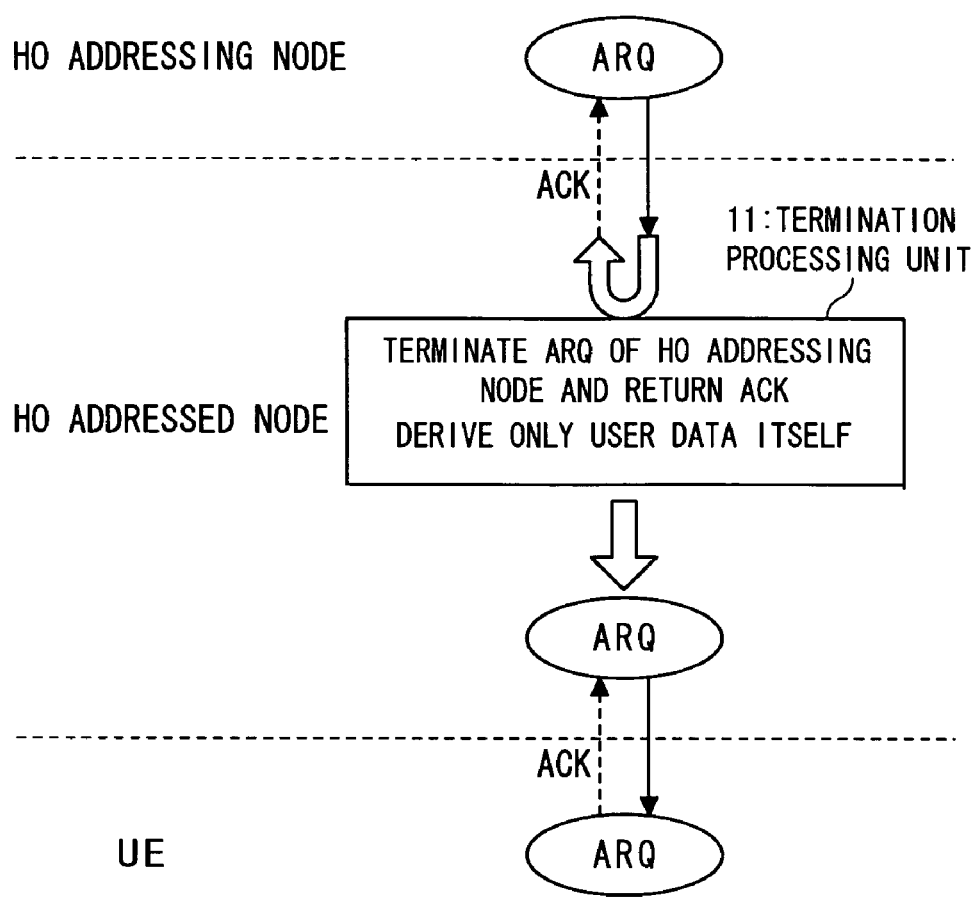
FIG. 31 is an illustration for explaining a method of terminating a header, given in a handover addressing node, in a handover addressed node according to the second embodiment of the present invention.

FIG. 31 is an illustration for explaining a method of terminating a header, affixed in the handover addressing node 2, in the handover addressed node 3. The handover addressed node 3 shown in FIG. 31 has a termination processing unit 11. This termination processing unit 11 terminates the ARQ, affixed in the handover addressing node 2 and included in transfer data (transfer packet), and acquires only user data and returns ACK to the handover addressing node 2.

In addition, a protocol header is affixed to a transfer packet in the handover addressing node 2 and the transfer packet is transmitted to the handover addressed node 3 and terminated in the termination processing unit 11 of the handover addressed node 3 and re-carried. The handover addressed node 3 confirms the transfer data received from the handover addressing node 2 and returns an acknowledge (ACK) signal to that handover addressing node 2. The handover addressed node 3 removes the protocol header, affixed in the handover addressing node 2, from the transfer data, and affixes the protocol header of its own entity thereto and transmits it to the mobile unit 4.

In FIG. 31, the parts marked with the same reference numerals as those used above have the same or similar functions.

(7-5) Description of Operation for Removal of Header

Figure 32:
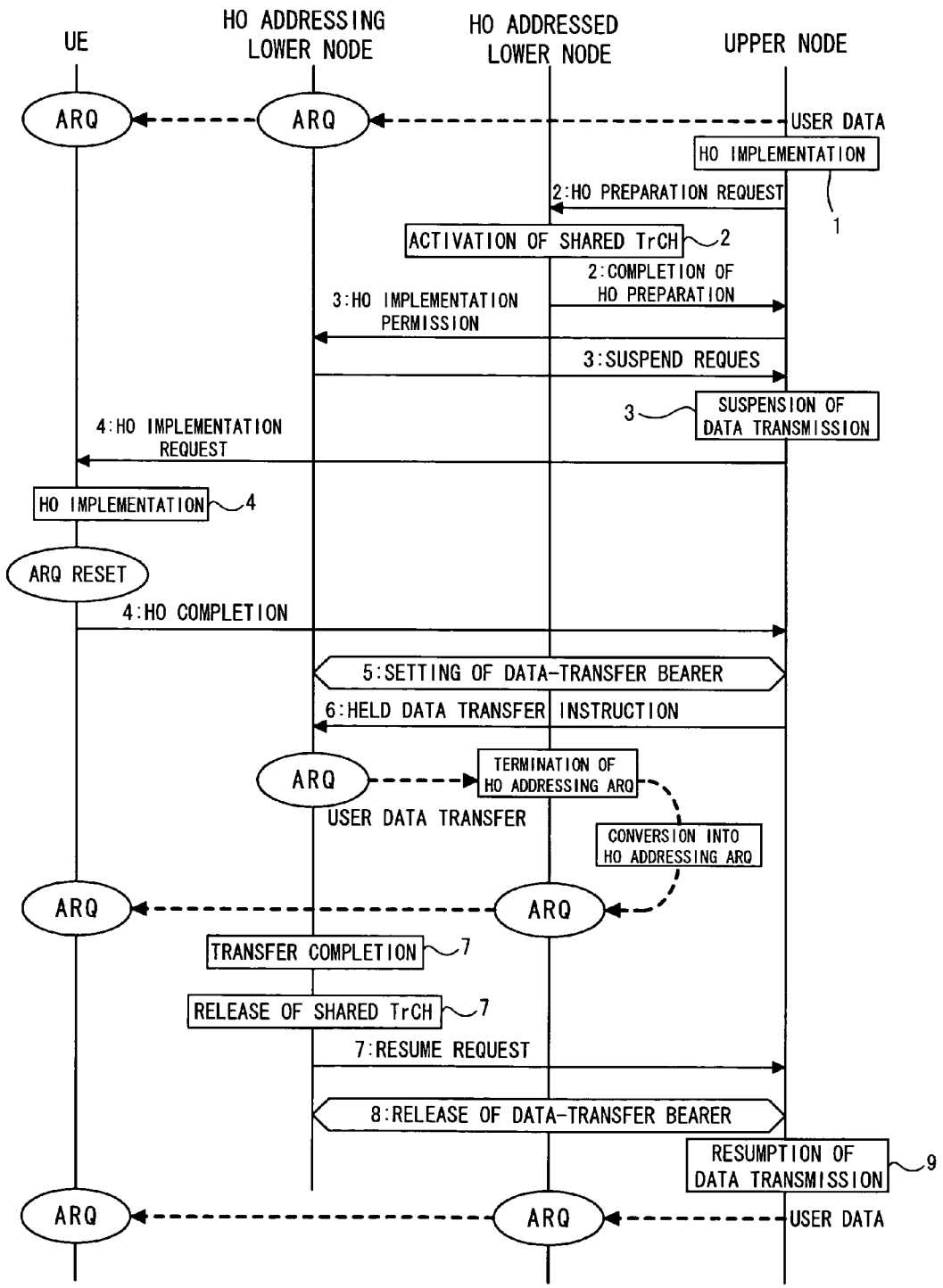
FIG. 32 is an illustration of an example of a sequence for explaining a residual packet transferring method based on re-affixation of a protocol header according to the second embodiment of the present invention.

FIG. 32 shows an example of a sequence for explaining a residual packet transferring method based on re-affixation of a protocol header according to the second embodiment of the present invention, and (7-5-1) to (7-5-9) correspond to the reference numerals 1 to 9 in FIG. 32, respectively.

(7-5-1) The handover starts in response to the degradation of quality of a signal the mobile unit 4 receives. The handover is conducted according to a decision in the upper node 1 made on the basis of a request from the mobile unit 4 or a radio situation report from the mobile unit 4.

(7-5-2) The upper node 1 makes a request to the handover addressed node 3 for securing a resource accommodating the mobile unit 4 which carries out the handover. In accordance with this request, the handover addressed node 3 secures the resource. In the case of a first message transmission/reception between the upper node 1 and the handover addressed node 3, the handover addressed node 3 newly activates a shared channel and activates a shared transport channel for the preparation of the handover, and transmits the handover preparation completion to the upper node 1. If there is a channel already activated, it adds a user.

(7-5-3) The upper node 1 permits the handover addressing node 2 to implement the handover. Upon receipt of the permission, the handover addressing node 2 transmits a suspend request to the upper node 1 for suspending the new packet transmission. Incidentally, in this sequence, in place of a suspend request being transmitted from the handover addressing node 2, it is also appropriate that the upper node 1 itself conducts this.

(7-5-4) The upper node 1 transmits a handover instruction to the mobile unit 4. The mobile unit 4 secures the handover addressed node 3 and a communication channel in accordance with this instruction.

(7-5-5) A bearer channel is set to transfer the data, left in the handover addressing node 2, to the handover addressed node 3. This bearer channel can be set to make a direct connection between the handover addressing node 2 and the handover addressed node 3, or it can also be set by way of the upper node 1.

(7-5-6) The upper node 1 makes a request for the transfer of a residual packet to the handover addressing node 2. The handover addressing node 2 transfers the residual packet to the handover addressed node 3 through the bearer channel set in the previous paragraph. The handover addressed node 3 receives the residual packet from the handover addressing node 2 and transmits it to the mobile unit 4. At this time, continuing before the handover, the handover addressing node 2 affixes the protocol header to the transfer data and transfers it. The handover addressed node 3 terminates the protocol header affixed in the handover addressing node 2 and re-affixes it own protocol header and transmits it to the mobile unit 4.

(7-5-7) When the transfer of the residual packet reaches completion, the handover addressing node 2 releases the resource secured by the mobile unit 4 which has carried out the handover and outputs a resume request to the upper node 1 for making a request for the resumption of transmission of the new packet. Incidentally, in the sequence, although the handover addressing node 2 outputs the resume request, it is also appropriate that the upper node 1 itself conducts it.

(7-5-8) When receiving the resume request, the upper node 1 releases the bearer channel set for the residual packet transfer.

(7-5-9) The transmission of a new packet is resumed.

Thus, since the handover addressed node 3 re-affixes the protocol header, it is possible to maintain the number of users to be accommodated while securing the wide bandwidth, and to share the line with high efficiency at the soft handover.

(8) Description of Pattern D

The pattern D is a method of transmitting a new packet even in the middle of the transfer of a residual packet and encapsulating transfer data.

(8-1) In the handover addressed node 3, this pattern D is made so as to transmit the transfer data left in the handover addressing node 2 and a new packet transmitted from the upper node 1 to the mobile unit 4 while carrying out the arbitration therebetween. The arbitration method can be the same as that described in the pattern B.

Moreover, although the encapsulation and re-affixation of the protocol header affixed in the handover addressing node 2 are made at the residual packet transfer, this method can be the same in contents as that described in the pattern C.

Figure 33B:
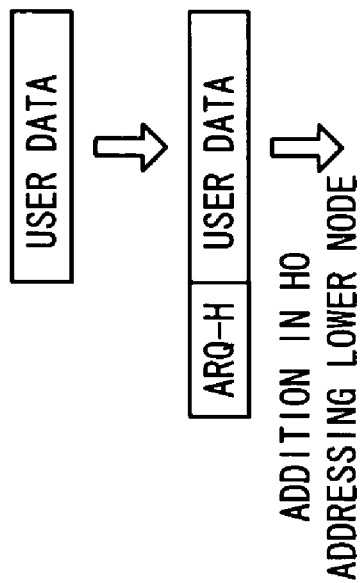
FIGS. 33($a$) and 33($b$) are illustrations for explaining a different packet transferring method according to the second embodiment of the present invention.
Figure 33A:
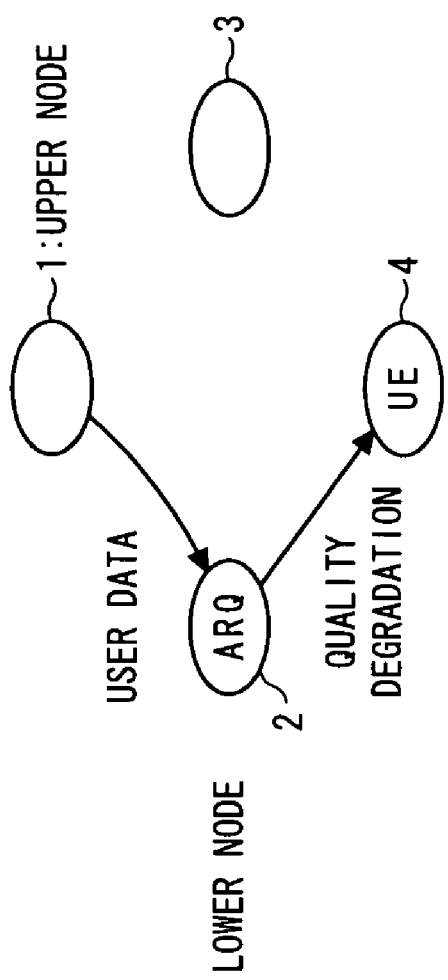

FIGS. 33(*a*), 33(*b*) to 35(*a*), 35(*b*) are illustrations for explaining another packet transferring method according to the second embodiment of the present invention. In these illustrations, the same parts as those mentioned above have the same or similar functions.

When the mobile unit 4 shown in FIG. 33(*a*) starts the handover, the handover addressing node 2 detects the quality degradation. On the basis of this detection, the handover addressed node 3 affixes a header for H-ARQ to user data from the upper node 1 (see FIG. 33(*b*)). This header affixation is notified to the handover addressing node 2 when the upper node 1 detects the quality degradation.

Figure 34B:
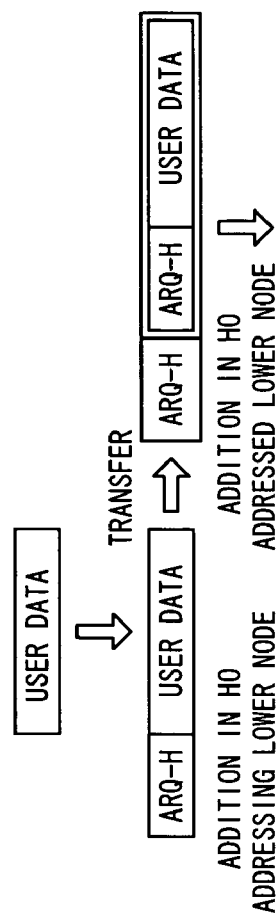
FIGS. 34($a$) and 34($b$) are illustrations for explaining a different packet transferring method according to the second embodiment of the present invention.
Figure 34A:
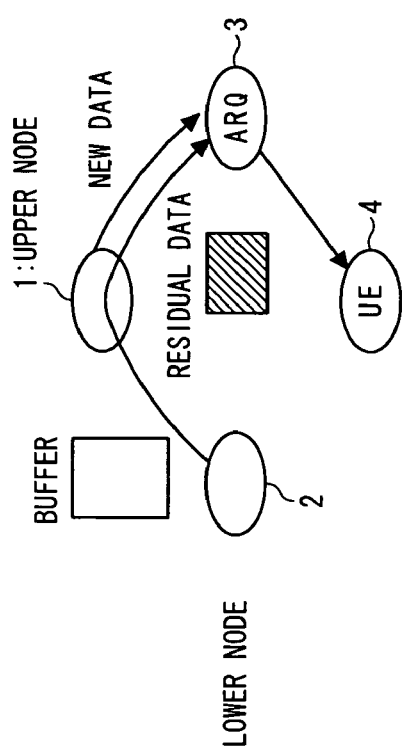

In addition, the handover addressing node 2 shown in FIG. 34(*a*) transfers a residual packet to the upper node 1, with the residual packet and a new packet being transmitted from the upper node 1 to the handover addressed node 3 while being arbitrated therebetween. Still additionally, the handover addressed node 3 transmits the residual packet and the new packet to the mobile unit 4.

Moreover, to the user data shown in FIG. 34(*b*), H-ARQ is affixed when it is transferred from the handover addressing node 2 to the upper node 1. Still moreover, H-ARQ is further affixed thereto for the share-ride when the handover addressed node 3 transmits a packet, transferred from the upper node 1, to the mobile unit 4.

Figure 35A:
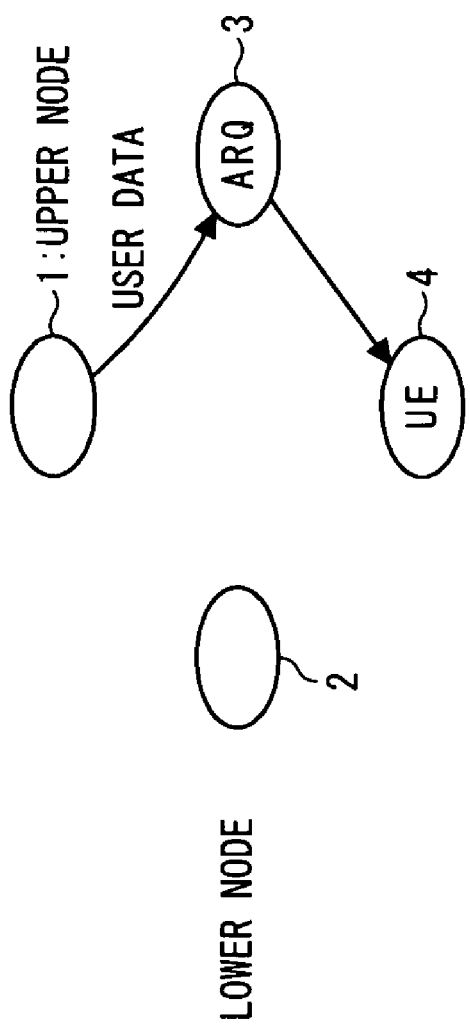
FIGS. 35($a$) and 35($b$) are illustrations for explaining a different packet transferring method according to the second embodiment of the present invention.
Figure 35B:
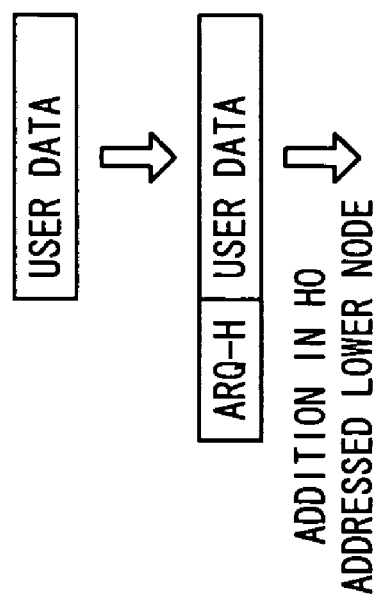

When the handover addressing node 2 shown in FIG. 35(*a*) completes the transfer of the residual packet, the upper node 1 transmits a new packet to the handover addressed node 3. At this time, the handover addressed node 3 affixes a header for H-ARQ to the new packet shown in FIG. 35(*b*).

(8-2) Align

A description will be given of a length adjusting method of preventing a radio frame length to becomes long due to the share-ride in the case of the encapsulation. A share-ride header is an H-ARQ header inserted into a transfer packet in the handover addressing node 2 and the handover addressed node 3, and the radio frame length can exceed a predetermined format length due to the addition of this share-ride header and others.

When this situation occurs, for aligning to the radio frame format, the handover addressed node 3 adjusts the radio frame length to a predetermined format length through the use of shortening of the residual packet side data length, data division or header compression. In this connection, it is preferable that the handover addressed node 3 stores the base station which has transmitted the sequence number and carries out the transmission/reception of a retransmission request according to conversion and retransmission protocol or a response signal such as reception completion with respect to the handover addressing node 2.

On the other hand, the handover addressed node 3 can notify this situation to the upper node 1, and the upper node 1 can output an instruction to each node for lengthening the radio frame format.

That is, for the transfer/transmission, the handover addressed node 3 monitors the capacity of a share-ride frame including a protocol header affixed in the handover addressing node 2 and a protocol header affixed to a frame transmitted to the mobile unit 4 (monitor step) and, when the capacity of the share-ride frame in the monitor step exceeds a predetermined value, the handover addressed node 3 aligns the share-ride frame by shortening the share-ride frame or by increasing the radio frame format (align step).

For example, the case in which the capacity of the share-ride frame exceeds a predetermined prescribed capacity corresponds to, in addition to the case (see FIGS. 13(*a*) and 13(*b*)) in which an excessive transfer packet or new packet is received when the information volume to be transmitted from the handover addressed node 3 to the mobile unit 4 is decreased, a case (see FIGS. 25(*a*), 25(*b*) to FIGS. 28(*a*), 28(*b*)) in which the total length of the header portion and the data portion exceeds a prescribed length due to the share-ride, or other cases.

Moreover, when a situation exceeding the radio frame format occurs at the share-ride, for the alignment, the handover addressed node 3 shortens the packet length of the residual packet. Concretely, it carries out the shortening of the data portion of the residual packet, the compression of the header portion and the division of the data portion of the residual packet.

Still moreover, in place of the shortening of the transmission packet length, it is also possible to increase the frame format in a radio zone. That is, for the alignment, the handover addressed node 3 can set a radio frame format with a capacity larger than the capacity of the share-ride frame which exceeds the predetermined capacity. Concretely, when a situation exceeding the radio frame format occurs at the share-ride, the handover addressed node 3 notifies this information to the upper node 1 and receives an instruction from the upper node 1 to lengthen the radio frame format length so that the transmission is made in a state where the radio frame length coincides with the data length on the residual data side.

(8-3) Activation Time (Time of Activation)

After the completion of the handover, the mobile unit 4 receives the encapsulated data and the normal non-encapsulated data in a mixed condition from the handover addressed node 3. Accordingly, the mobile unit 4 requires a segmentation for the discrimination between both the data. For this reason, the handover addressing node 2 is made to notify, as activation time, the timings of the first and last segments of the data transfer time period to the handover addressed node 3.

That is, for the transfer/transmission, the activation time recognizable by both the handover addressed node 3 itself and the mobile unit 4 is used for the frame to be transmitted from the handover addressed node 3 to the mobile unit 4, thereby enabling the discrimination between the encapsulated packet and the normal packet.

In this case, when time is used as the activation time, the segment timing is expressed by a radio frame timing. Moreover, for example, the mobile unit 4 makes a discrimination with reference to the leading bit of the radio frame such that the time zone before the leading bit is taken as the non-encapsulation and the time zone after it is taken as the encapsulation.

In addition, in a case in which a sequence number is used as the activation time, the segment timing is expressed as "a given number and numbers subsequent thereto" of the user data. As the activation time, for example, if the sequence number is "10", the mobile unit 4 makes a discrimination such that the data with the sequence numbers "0" to "10" are not encapsulated while the data with the sequence numbers subsequent to "10" are encapsulated.

Incidentally, it is preferable that the upper node 1 determines the activation time. Moreover, when determining this activation time, the upper node 1 notifies an instruction to both the handover addressed node 3 and the mobile unit 4. These utilizes the activation time recognized in common.

(8-4) Moreover, when the handover addressed node 3 confirms the transmission/arrival with respect to the mobile unit 4 through the use of the sequence numbers, with respect to the data using a first H-ARQ affixed in the handover addressing node 2, the handover addressed node 3 can also transmit a response signal on the retransmission or reception completion. Thus, the handover addressing node 2 releases the buffer 2*g* for the data to be transmitted to the mobile unit 4. Following this, the handover addressed node 3 transmits the data, transmitted from the handover addressing node 2, through H-ARQ to the mobile unit 4.

Therefore, for the transfer/transmission, the handover addressed node 3 converts the H-ARQ information, used between the handover addressing node 2 and the mobile unit 4, into the H-ARQ information used between the handover addressed node 3 and the mobile unit 4.

In addition, for the transfer/transmission, it is also possible that, with respect to the data using the first H-ARQ transmitted from the handover addressing node 2, the handover addressed node 3 transmits a response signal on the retransmission or reception completion and the handover addressing node 2 releases the buffer for holding a packet to the mobile unit 4 (release step) and the handover addressed node 3 transmits the data, transmitted from the handover addressing node 2, through a second H-ARQ to the mobile unit 4 (transmission step).

(9) Description of Operation of Pattern D (9-1) A description will be given of an example of a sequence employing the header share-ride based on encapsulation and the arbitration based on a resource allocation request.

As the sequence example, a description will be given of a case of employing a protocol header share-ride method based on encapsulation and an arbitration method based on a resource allocation request and a case of employing a protocol header re-affixation and an arbitration method using a resource allocation request. It is also possible to employ a method using a different arbitration method and a method using protocol header encapsulation or re-affixation method.

Figure 36:
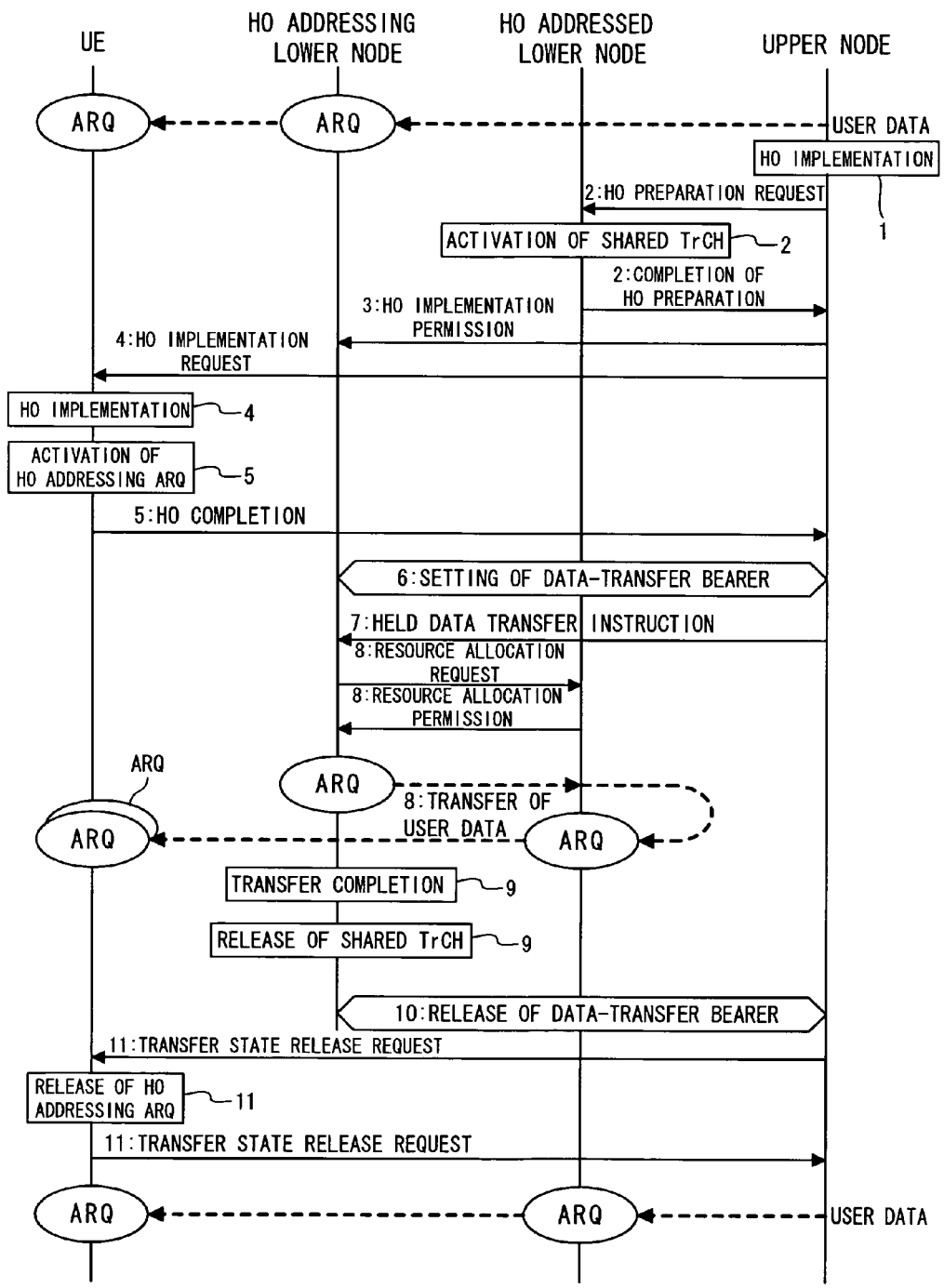
FIG. 36 shows an example of a sequence for explaining a pattern D according to the second embodiment of the present invention.

FIG. 36 shows an example of a sequence for explaining the pattern D according to the second embodiment of the present invention, and (9-1-1) to (9-1-11) correspond to the reference numerals 1 to 11 in FIG. 36, respectively.

(9-1-1) The handover starts in response to the degradation of quality of a signal the mobile unit 4 receives. The handover is conducted according to a decision in the upper node 1 made on the basis of a request from the mobile unit 4 or a radio situation report from the mobile unit 4.

(9-1-2) The upper node 1 makes a request to the handover addressed node 3 for securing a resource accommodating the mobile unit 4 which carries out the handover. In accordance with this request, the handover addressed node 3 secures the resource. In the case of a first message transmission/reception between the upper node 1 and the handover addressed node 3, the handover addressed node 3 newly activates a shared channel and activates a shared transport channel for the preparation of the handover and transmits the handover preparation completion to the upper node 1. If there is a channel already activated, it adds a user.

(9-1-3) The upper node 1 permits the handover addressing node 2 to implement the handover.

(9-1-4) The upper node 1 transmits a handover instruction to the mobile unit 4. The mobile unit 4 secures the handover addressed node 3 and a communication channel in accordance with this instruction.

(9-1-5) In this handover, the mobile unit 4 activates, in addition to a retransmission protocol entity for the handover addressing node 2, a retransmission protocol entity for the handover addressed node 3.

(9-1-6) A bearer channel is set to transfer the data, left in the handover addressing node 2, to the handover addressed node 3. This bearer channel can be set to make a direct connection between the handover addressing node 2 and the handover addressed node 3, or it can also be set by ways of the upper node 1.

(9-1-7) The upper node 1 makes a request for the transfer of a residual packet to the handover addressing node 2.

(9-1-8) The handover addressing node 2 transmits a request to the handover addressed node 3 for allocating resources needed for transmitting the residual packet. After the reception of this request, the handover addressed node 3 secures a resource corresponding to the request and notifies the resource securement to the handover addressing node 2. Upon receipt of the notification on the resource securement, the handover addressing node 2 starts to transfer the residual packet.

The handover addressed node 3 transmits the transferred residual packet and a new packet to the mobile unit 4 according to the resource assigned. At this time, continuing before the handover, the handover addressing node 2 affixes the protocol header to the transfer data and transfers it. The handover addressed node 3 conducts the share-ride of its own protocol header on this transfer data and transfers it to the mobile unit 4.

(9-1-9) When the transfer of the residual packet reaches completion, the handover addressing node 2 releases the resource secured by the mobile unit 4 which has carried out the handover.

(9-1-10) The upper node 1 releases the bearer channel set for the residual packet transfer.

(9-1-11) The upper node 1 gives an instruction to the mobile unit 4 for releasing the retransmission protocol entity confronting the handover addressing node 2. The mobile unit 4 releases the retransmission protocol entity for the handover addressing node 2 in accordance with this instruction.

Thus, the arbitration becomes feasible through the use of the header share-ride based on the encapsulation and the resource allocation request, which assures the integrity of the data communication.

Figure 37:
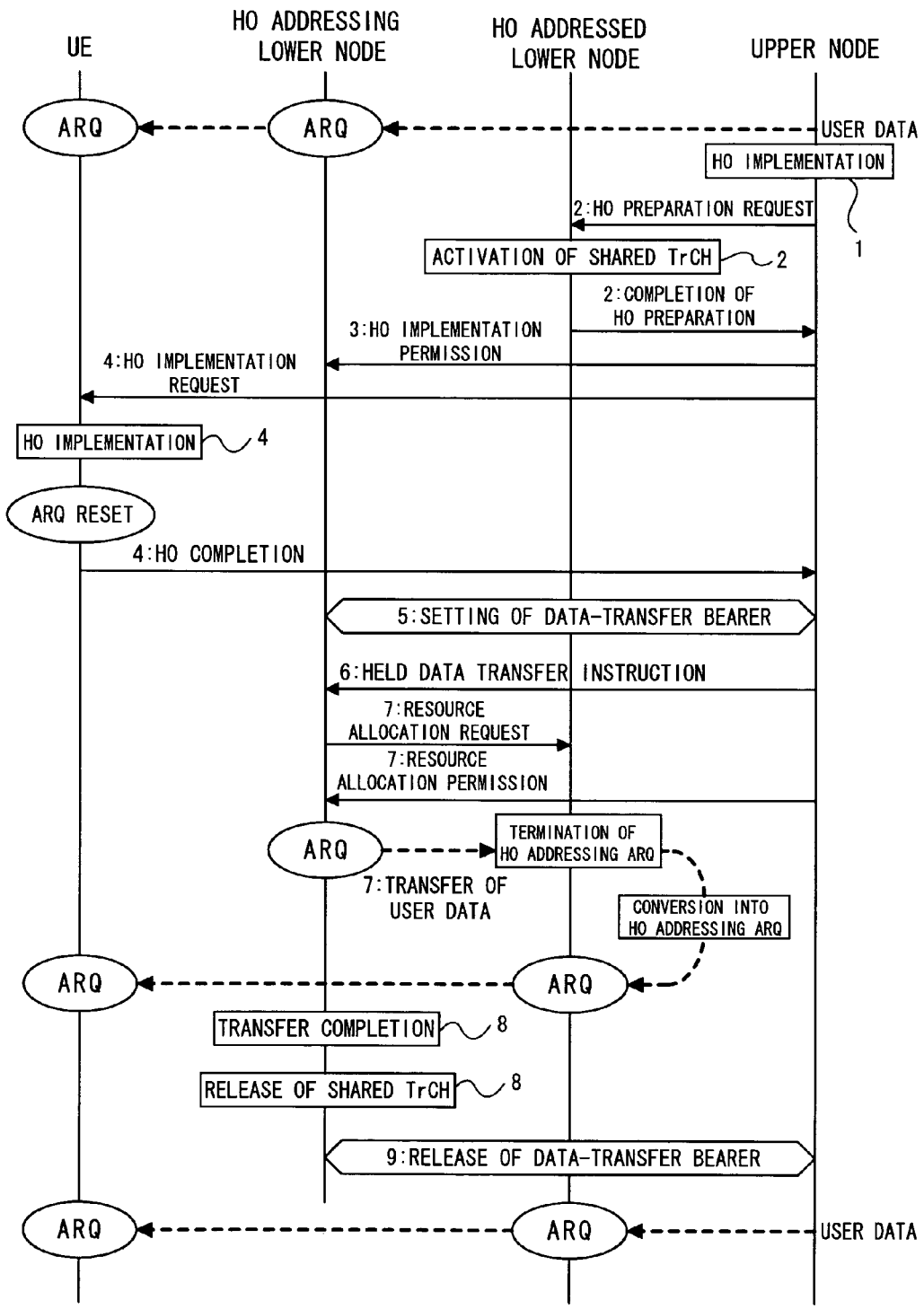
FIG. 37 shows an example of a sequence for explaining an arbitration method using a header re-affixation and a resource allocation request according to the second embodiment of the present invention.
Figure 38:
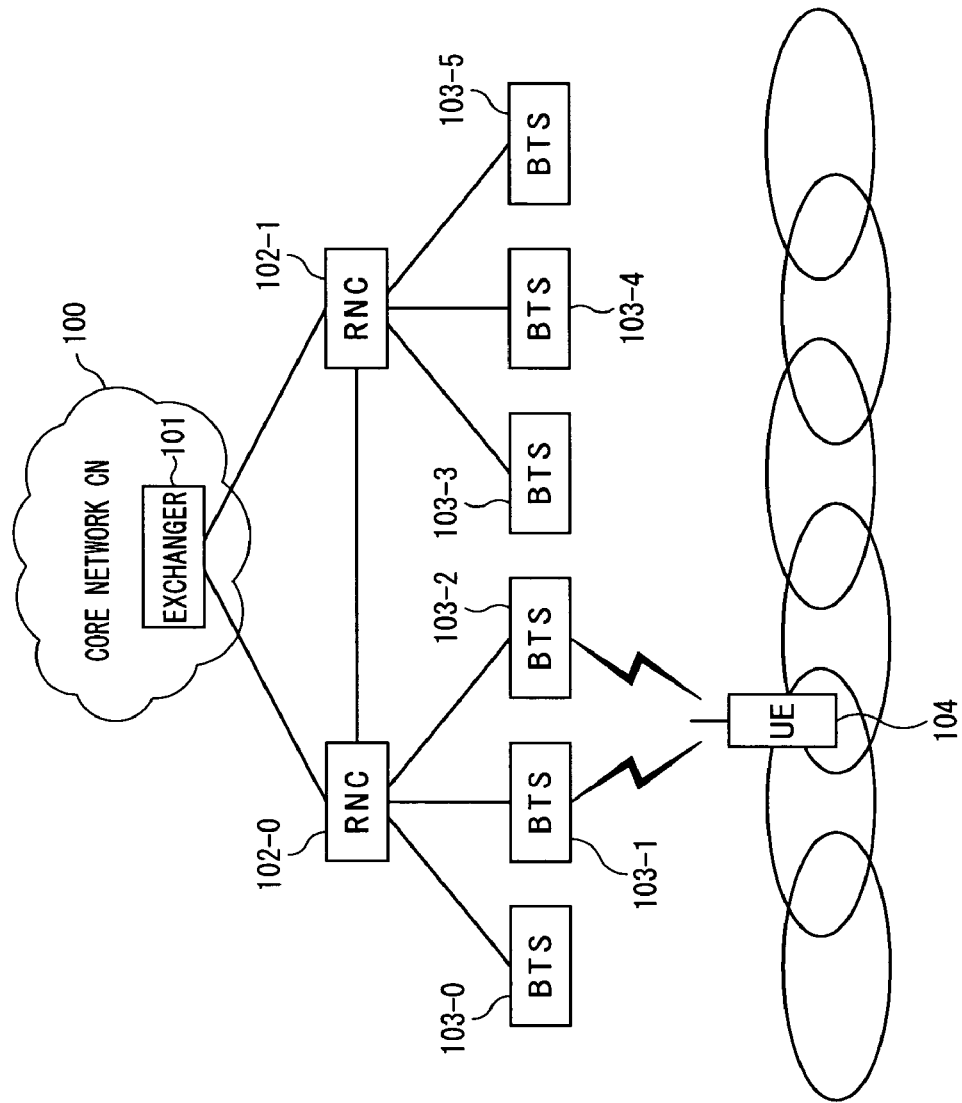
FIG. 38 is a schematic illustration of a configuration of a W-CDMA system.
Figure 39B:
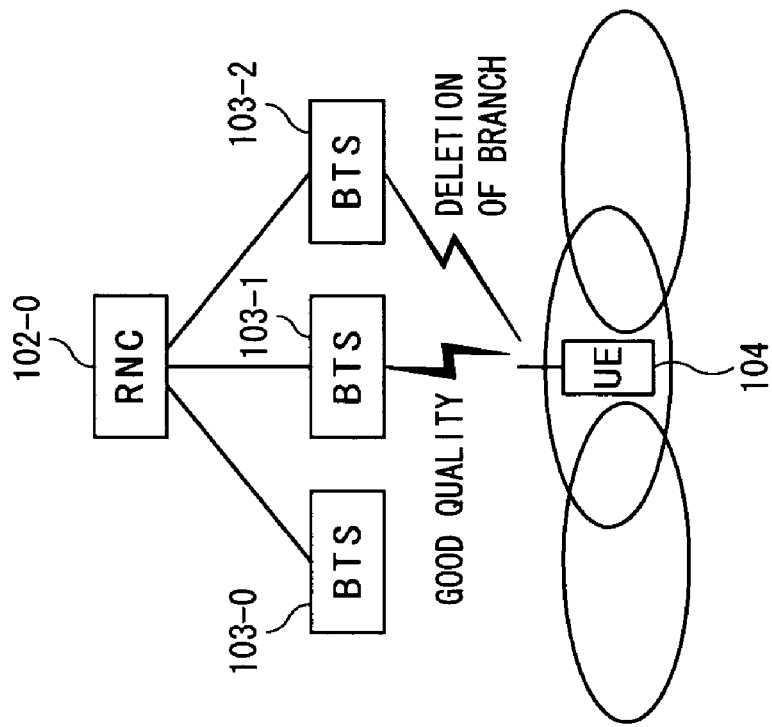
FIG. 39(b) is an illustration of a state after handover.
Figure 39A:
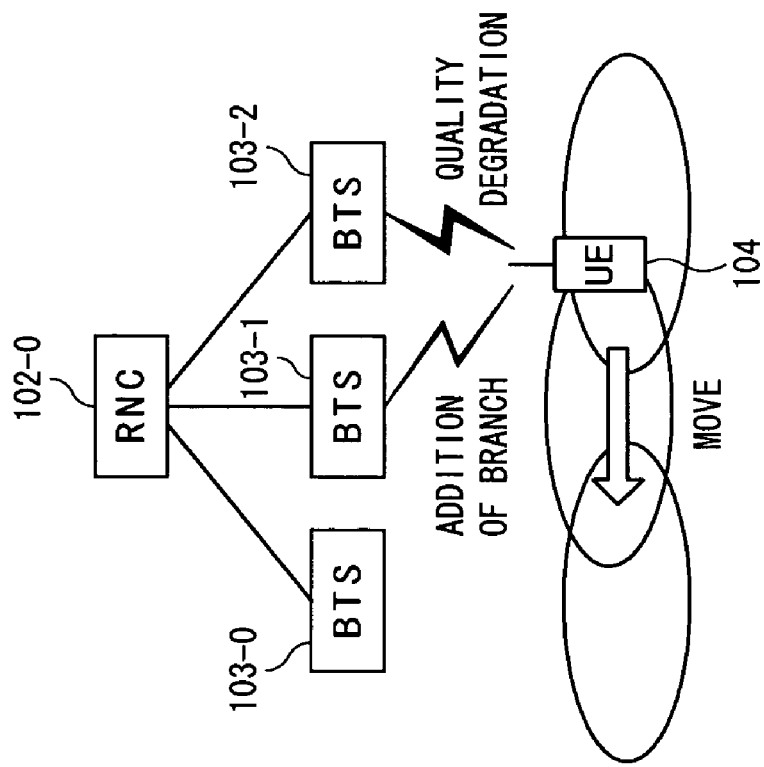
FIG. 39(a) is an illustration of a state before handover.

(9-2) Description of Operation in the Case of Employment of Header Re-Affixation and Resource Allocation Request FIG. 37 shows an example of a sequence for explaining an arbitration method using header re-affixation and resource allocation request according to the second embodiment of the present invention, and (9-2-1) to (9-2-9) correspond to the reference numerals 1 to 9 in FIG. 37, respectively.

(9-2-1) The handover starts in response to the degradation of quality of a signal the mobile unit 4 receives. The handover is conducted according to a decision in the upper node 1 made on the basis of a request from the mobile unit 4 or a radio situation report from the mobile unit 4.

(9-2-2) The upper node 1 makes a request to the handover addressed node 3 for securing a resource accommodating the mobile unit 4 which carries out the handover. In accordance with this request, the handover addressed node 3 secures the resource. In the case of a first message transmission/reception between the upper node 1 and the handover addressed node 3, the handover addressed node 3 newly activates a shared channel and activates a shared transport channel for the preparation of the handover and transmits the handover preparation completion to the upper node 1. If there is a channel already activated, it adds a user.

(9-2-3) The upper node 1 permits the handover addressing node 2 to implement the handover.

(9-2-4) The upper node 1 transmits a handover instruction to the mobile unit 4. The mobile unit 4 secures the handover addressed node 3 and a communication channel in accordance with this instruction.

(9-2-5) A bearer channel is set to transfer the data, left in the handover addressing node 2, to the handover addressed node 3. This bearer channel can be set to make a direct connection between the handover addressing node 2 and the handover addressed node 3, or it can also be set by ways of the upper node 1.

(9-2-6) The upper node 1 makes a request for the transfer of a residual packet to the handover addressing node 2.

(9-2-7) The handover addressing node 2 transmits a request to the handover addressed node 3 for allocating resources needed for transmitting the residual packet. After the reception of this request, the handover addressed node 3 secures a resource corresponding to the request and notifies the resource securement to the handover addressing node 2. Upon receipt of the notification on the resource securement, the handover addressing node 2 starts to transfer the residual packet. The handover addressed node 3 transmits the transferred residual packet and a new packet to the mobile unit 4 according to the resource assigned.

At this time, continuing before the handover, the handover addressing node 2 affixes the protocol header to the transfer data and transfers it. The handover addressed node 3 terminates the protocol header affixed in the handover addressing node 2 and re-affixes its own protocol header thereto and transfers it to the mobile unit 4.

(9-2-8) When the transfer of the residual packet reaches completion, the handover addressing node 2 releases the resource secured by the mobile unit 4 which has carried out the handover.

(9-2-9) The upper node 1 releases the bearer channel set for the residual packet transfer.

Thus, the arbitration using the header re-affixation and the resource allocation request is employed, which enables transferring the data completely.

The present invention is not limited to the above-described embodiments, and it covers all changes of the embodiments of the invention herein which do not constitute departures from the spirit and scope of the invention.

In FIG. 1, in a case in which, for example, the mobile unit 4 shifts from the base station 3-0 to the base station 3-3, the handover is feasible by conducting the switching from the HS-DSCH for controlling the base station 3-0 to the HS-DSCH for controlling the base station 3-3. Also in this case, the base station 3-0 can transmit/receive a message, similar to that mentioned above, to/from the base station 3-3, the RNC 2-0 or the exchanger 1 and transfer the residual data, left in the base station 3-0 itself, to the base station 3-3. Also in the case of the employment of DSCH, the switching between the DSCHs is feasible.

(C) Others (1) In the aforesaid transfer/transmission step, it is also possible that at least one of the handover addressing node 2 and the upper node 1 secures a resource for holding a residual packet and conducts the arbitration to transmit a new packet to the handover addressed node 3.

(2) It is also appropriate that the aforesaid transfer/transmission step includes a measurement step in which at least one node of the handover addressing node 2 and the upper node 1 measures the capacity of a resource provided in the handover addressed node 3 for holding a residual packet and an arbitration step in which the handover addressing node 2 transfers a transferable portion of a residual packet for the arbitration on the basis of the capacity of the resource measured in the measurement step.

(3) It is also appropriate that, in the aforesaid transfer/transmission step, anyone of the handover addressed node 3, the handover addressing node 2 and the upper node 1 adjusts the number of divisions of a residual packet for the arbitration on the basis of the capacity of a resource for holding a new packet.

(4) It is also appropriate that the aforesaid transfer/transmission step includes a division step in which the handover addressing node 2 divides a residual packet into a plurality of packets having a data volume corresponding to a communication rate in a radio zone, a division transmission step in which the handover addressing node 2 transmits the plurality of divided packets in the division step to the handover addressed node 3, and an order-of-arrival transmission step in which the handover addressed node 3 transmits a plurality of packets including the plurality of divided packets transmitted in the division transmission step and a plurality of new packets in a mixed condition to the mobile unit 4 on the basis of the order of reception.

(5) It is also appropriate that, in the aforesaid transfer/transmission step, the handover addressed node 3 is made to change a transmission interval in a radio zone.

(6) It is also appropriate that, in the aforesaid division transmission step, the handover addressed node 3 is made to change a radio transmission interval when transferring a packet.

(7) It is also appropriate that, in the aforesaid division transmission step, the handover addressing node 2 makes the transmission while changing a data volume in a unit transmission interval.

(8) It is also appropriate that, in the aforesaid transfer/transmission step, the handover addressed node 3 is made to change a frame format in a radio zone.

(9) It is also appropriate that, in the aforesaid transfer/transmission step, the handover addressed node 3 is made to terminates information on retransmission control affixed in the handover addressing node 2 and included in a transfer packet and acquires user data for retransmission control.

(10) It is also appropriate that, in the aforesaid transfer/transmission step, the handover addressed node 3 is made to always secure a header area for a residual packet in a frame to be transmitted to the mobile unit 4.

(11) It is also appropriate that the aforesaid transfer/transmission step includes a monitor step in which the handover addressed node 3 monitors a capacity of a share-ride frame including a protocol header affixed in the handover addressing node 2 and a protocol header affixed to a frame to be transmitted to the mobile unit 4 and an align step in which, when the capacity of the share-ride frame in the monitor step exceeds a predetermined value, the handover addressed node 3 aligns the share-ride frame through the use of one of shortening of the share-ride frame and increase of a radio frame format.

(12) It is also appropriate that, in the aforesaid align step, the handover addressed node 3 shortens a packet length of a residual packet.

(13) It is also appropriate that, in the aforesaid align step, the handover addressed node 3 sets a radio frame format having a capacity larger than a capacity of the share-ride frame exceeding a predetermined capacity.

(14) It is also appropriate that, in the aforesaid transfer/transmission step, the handover addressed node 3 is made to employ an activation time, recognizable by both the handover addressed node 3 itself and the mobile unit 4, in a frame to be transmitted to the mobile unit 4 for making a discrimination between an encapsulated packet and a normal packet.

(15) It is also appropriate that, in the aforesaid transfer/transmission step, the handover addressed node 3 is made to store a lower node, which has transmitted a sequence number, and transmit a retransmission request according to conversion/retransmission protocol or a response signal such as reception completion to the handover addressing node 2.

(16) It is also appropriate that the aforesaid transfer/transmission step includes a release step in which the handover addressed node 3 transmits a response signal on retransmission or reception completion with respect to data under first hybrid retransmission control transmitted from the handover addressing node 2 so that handover addressing node 2 releases a buffer holding a packet addressed to the mobile unit 4, and a transmission step of transmitting data transmitted from the handover addressing node 2 to the mobile unit 4 through the use of second hybrid retransmission control.

(17) It is also appropriate that the aforesaid second transmitting unit affixes a retransmission control header on the basis of identification information indicative of the presence or absence of a share-ride frame including a first header affixed to a radio frame to be transmitted to the mobile unit 4 and a second header affixed in the handover addressing node 2 and a packet length.

INDUSTRIAL APPLICABILITY

As described above, in a W-CDMA system, the present invention eliminates the need for transmitting the same signal through the use of a plurality of channels from a base station to a mobile unit at handover, thus increasing the number of users and improving the communication quality, and achieving effective utilization of transmission lines and radio resources.

In addition, the loss of user data is preventable, and the qualities of various types of services such as the stability of communication rate and real-time performance are improvable. Still additionally, the cost performance in the W-CDMA is improvable.

The invention claimed is:

1. A packet transferring/transmitting method for use in a mobile communication system including an upper node for transmitting a plurality of packets addressed to a mobile unit, a handover addressing node for transmitting a plurality of packets addressed to said mobile unit and a handover addressed node for transmitting a plurality of packets addressed to said mobile unit, said method comprising:
- a determination step in which said upper node determines implementation of handover; and
- a transfer/transmission step in which said handover addressing node transfers, of said plurality of packets, a non-transmitted residual packet to said handover addressed node and said upper node transmits a packet to said handover addressed node, and wherein in said transfer/transmission step,
- said handover addressed node converts a first header affixed in said handover addressed node into a second header to be affixed in said handover addressing node and conducts a transmission of the packet to said mobile unit;
- records association between the first header and the second header;
- converts a third header of response signals received from said mobile unit to a fourth header based on the association; and
- transmits the converted response signals to said handover addressing node.

2. The packet transferring/transmitting method according to claim 1, wherein said transfer/transmission step includes a channel setting step in which said upper node carries out one of allocation of a separate transfer channel and securement of an added channel between said handover addressed node and said handover addressing node based on a packet volume in a radio zone;
- a scheduling step in which said handover addressed node carries out scheduling on packet transmission through the use of said separate transfer channel or said added channel secured in said channel setting step; and
- a scheduling transmission step in which said handover addressed node transmits said packet and said residual packet to said mobile unit based on the scheduling in said scheduling step.

3. The packet transferring/transmitting method according to claim 2, wherein
- in said transfer/transmission step, said handover addressing node first-encapsulates said residual packet according to an instruction from said upper node or identification on a received frame, and
- said handover addressed node second-encapsulates said residual packet and transmits said residual packet to said mobile unit, and wherein, in said transfer/transmission step, said handover addressed node inserts discrimination information for a discrimination between an encapsulated packet and a normal packet into a frame to be transmitted to said mobile unit.

4. The packet transferring/transmitting method according to claim 2, wherein,
- in said transfer/transmission step, said handover addressing node first-encapsulates said residual packet according to an instruction from said upper node or identification on a received frame, and
- said handover addressed node second-encapsulates said residual packet and transmits said residual packet to said mobile unit, and
- wherein, in said transfer/transmission step, said handover addressed node converts first hybrid retransmission control information used between said handover addressing node and said mobile unit into second hybrid retransmission control information used between said handover addressed node, and said mobile unit.

5. The packet transferring/transmitting method according to claim 1, wherein, in said transfer/transmission step, said handover addressing node first-encapsulates said residual packet according to an instruction from said upper node or identification on a received frame, and
- said handover addressed node second-encapsulates said residual packet and transmits said residual packet to said mobile unit.

6. The packet transferring/transmitting method according to claim 5, wherein
- in said transfer/transmission step, said handover addressing node or said upper node itself suspends the transmission of a packet from said upper node at the transfer of said residual packet,
- wherein, in said transfer/transmission step, said handover addressed node inserts discrimination information for a discrimination between an encapsulated packet and a normal packet into a frame to be transmitted to said mobile unit.

7. The packet transferring/transmitting method according to claim 5, wherein
- in said transfer/transmission step, said handover addressing node or said upper node itself suspends the transmission of a packet from said upper node at the transfer of said residual packet,
- and wherein, in said transfer/transmission step, said handover addressed node converts first hybrid retransmission control information used between said handover addressing node and said mobile unit into second hybrid retransmission control information used between said handover addressed node and said mobile unit.

8. The packet transferring/transmitting method according to claim 1, wherein, in said transfer transmission step, said handover addressing node or said upper node itself suspends the transmission of a packet from said upper node at the transfer of said residual packet.

9. A mobile communication system equipped with an upper node for transmitting a plurality of packets addressed to a mobile unit, a handover addressing node for transmitting a plurality of packets addressed to said mobile unit and a handover addressed node for making transmission/reception of a packet with respect to said mobile unit after the handover,
wherein said handover addressing node comprises:
- a first line receiving unit for receiving a packet from said upper node;
- a buffer for holding said packet received in said first line receiving unit;
- a first retransmission control unit for carrying out retransmission control on a packet volume to be transferred, based on a resource capacity of said handover addressed node included in said packet received in said first line receiving unit and a residual volume of said packet held in said buffer; and
- a first line transmitting unit for, based on said packet volume retransmission-controlled in said first retransmission control unit, transmitting said packet held in said buffer to said handover addressed node without interposing said upper node therebetween or by way of said upper node.

* * * * *